United States Patent
Kumar et al.

(10) Patent No.: US 12,089,077 B2
(45) Date of Patent: Sep. 10, 2024

(54) CARRIER AGGREGATION FOR MIXED FREQUENCY RANGES

(71) Applicant: QUALCOMM Incorporated, San Diego, CA (US)

(72) Inventors: Akshay Kumar, San Diego, CA (US); Arnaud Meylan, San Diego, CA (US); Arun Prasanth Balasubramanian, San Diego, CA (US); Karthik Thirukannan, San Diego, CA (US); Shailesh Maheshwari, San Diego, CA (US); Vanitha Aravamudhan Kumar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 197 days.

(21) Appl. No.: 17/452,985

(22) Filed: Oct. 29, 2021

(65) Prior Publication Data
US 2023/0133908 A1    May 4, 2023

(51) Int. Cl.
*H04L 1/1812* (2023.01)
*H04L 1/00* (2006.01)
*H04W 24/08* (2009.01)

(52) U.S. Cl.
CPC .......... *H04W 24/08* (2013.01); *H04L 1/0061* (2013.01); *H04L 1/1812* (2013.01)

(58) Field of Classification Search
CPC .... H04W 24/08; H04L 1/0061; H04L 1/1812; H04L 1/1685; H04L 1/1893; H04L 1/1848
See application file for complete search history.

(56) References Cited

U.S. PATENT DOCUMENTS

| | | | |
|---|---|---|---|
| 2013/0028096 A1* | 1/2013 | Cheng | H04L 1/1848 370/241 |
| 2016/0127939 A1* | 5/2016 | Bathwal | H04W 24/10 370/252 |
| 2016/0248554 A1* | 8/2016 | Uchino | H04L 1/1621 |
| 2021/0028909 A1 | 1/2021 | Gaal et al. | |
| 2021/0028969 A1* | 1/2021 | Li | H04L 67/10 |

(Continued)

FOREIGN PATENT DOCUMENTS

WO    WO-2017156763 A1 *  9/2017  ........... H04L 1/1825

OTHER PUBLICATIONS

Partial International Search Report—PCT/US2022/077056—ISA/EPO—Dec. 19, 2022.

(Continued)

*Primary Examiner* — Edan Orgad
*Assistant Examiner* — Malick A Sohrab
(74) *Attorney, Agent, or Firm* — Harrity & Harrity, LLP

(57) ABSTRACT

Various aspects of the present disclosure generally relate to wireless communication. In some aspects, a user equipment (UE) may communicate on a first set of carriers in a first frequency range (FR) and a second set of carriers in a second FR. The UE may detect a radio link control (RLC) discontinuity on at least one of the first set of carriers or the second set of carriers. The UE may identify one or more FRs, of the first FR and the second FR, in which the RLC discontinuity occurred. The UE may transmit an RLC status report based at least in part on the identified one or more FRs. Numerous other aspects are described.

30 Claims, 26 Drawing Sheets

(56) References Cited

U.S. PATENT DOCUMENTS

2023/0189048 A1\* 6/2023 Palle Venkata ....... H04L 1/1812
 370/328
2023/0422066 A1 12/2023 Kumar et al.

OTHER PUBLICATIONS

International Search Report and Written Opinion—PCT/US2022/077056—ISA/EPO—Feb. 9, 2023.

\* cited by examiner

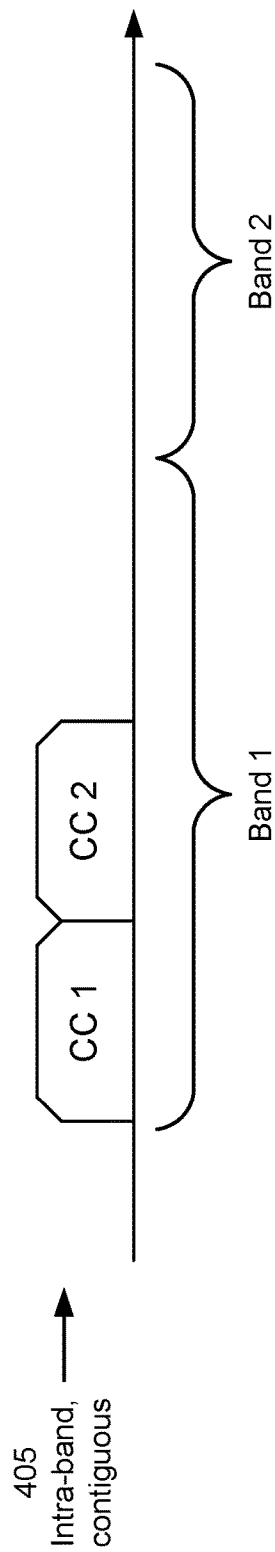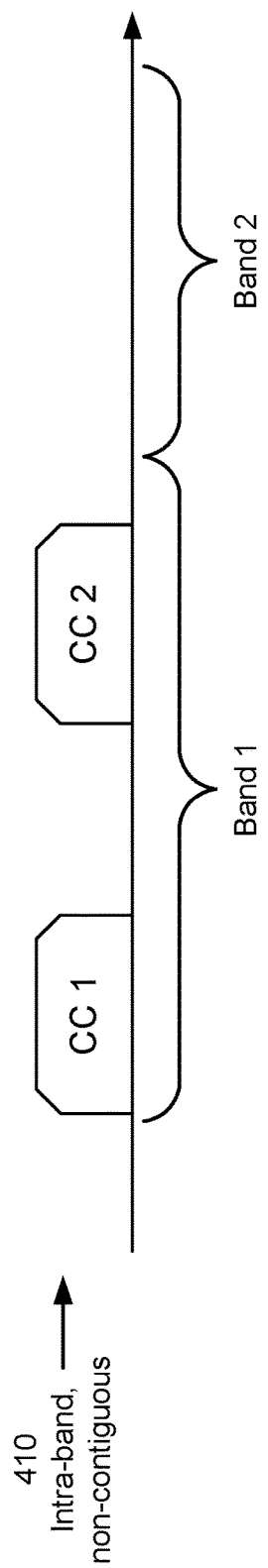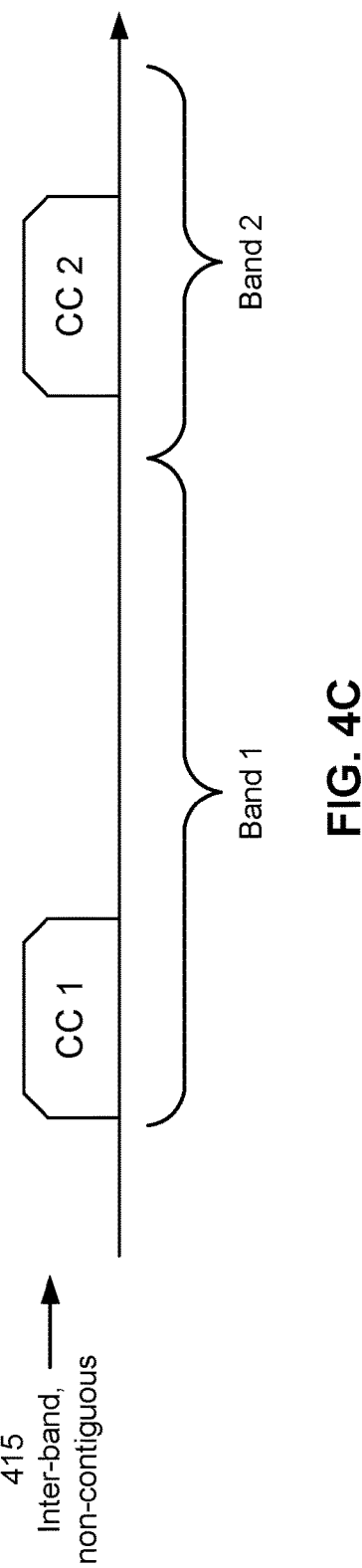

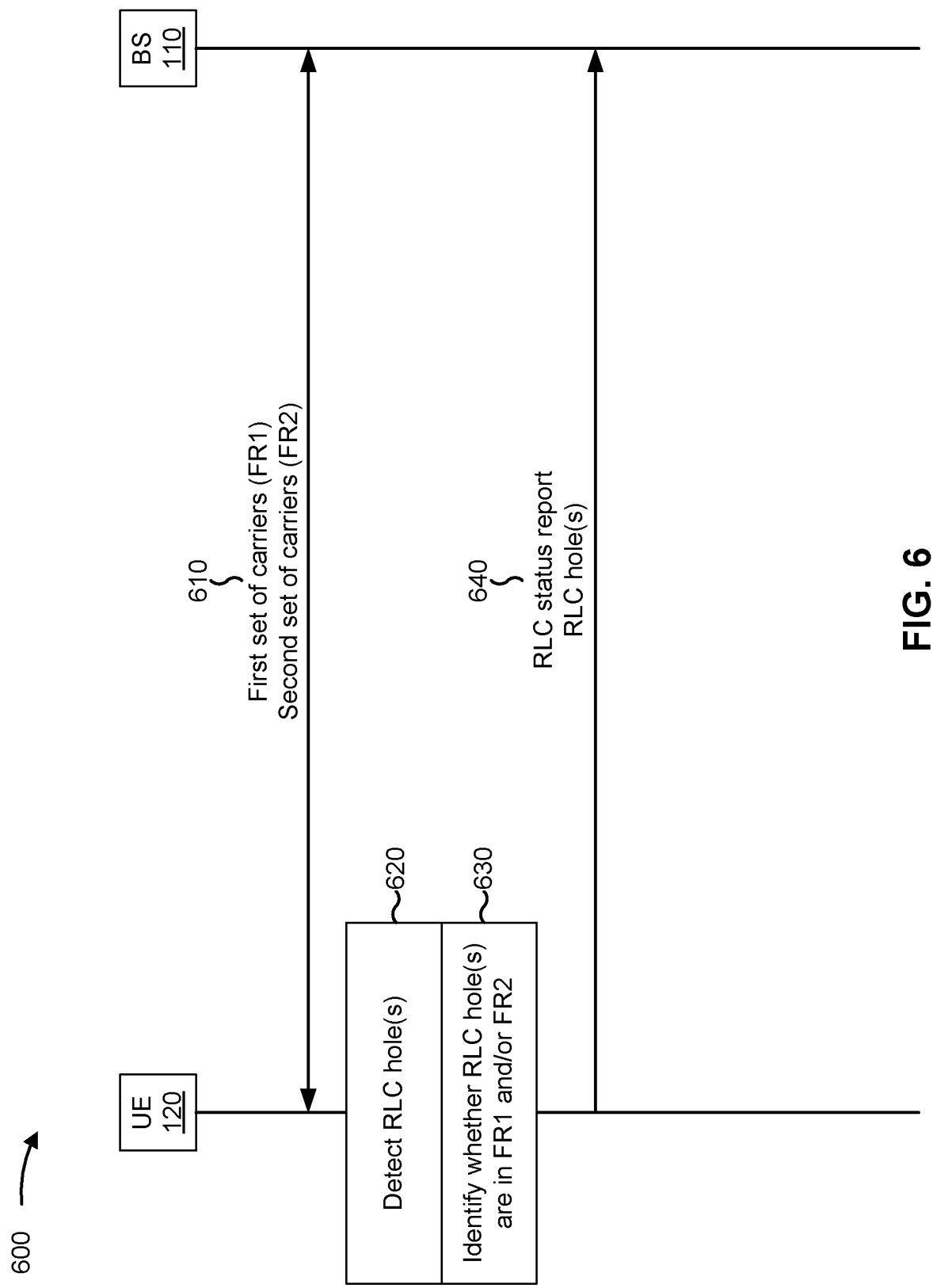

CARRIER AGGREGATION FOR MIXED FREQUENCY RANGES

INTRODUCTION

Aspects of the present disclosure generally relate to wireless communication and to techniques and apparatuses for carrier aggregation.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include communicating on a first set of carriers associated with a first set of parameters and a second set of carriers associated with a second set of parameters. The method may include detecting a radio link control (RLC) discontinuity on at least one set of carriers, of the first set of carriers or the second set of carriers. The method may include transmitting an RLC status report in accordance with an RLC timer that is based at least in part on at least one of a first hybrid automatic repeat request (HARQ) parameter associated with the first set of parameters or a second HARQ parameter associated with the second set of parameters, wherein the RLC timer based at least in part on a number of RLC duplicates received by the UE.

Some aspects described herein relate to a method of wireless communication performed by a user equipment (UE). The method may include transmitting a communication on one of a first set of carriers in a first frequency range (FR) or a second set of carriers in a second FR, wherein the communication is associated with a preferred numerology. The method may include receiving a radio link control (RLC) status report indicating an RLC discontinuity associated with the communication. The method may include one of, performing a retransmission of the communication on a preferred carrier associated with the preferred numerology in response to an uplink grant on the preferred carrier being received within a length of time, or performing the retransmission of the communication on a first available uplink grant when no uplink grant on the preferred carrier is received within the length of time.

Some aspects described herein relate to a method of wireless communication performed by a user equipment (UE). The method may include transmitting an indication to avoid Voice over New Radio (VoNR) communication in a first frequency range. The method may include generating a first transport block (TB) for transmission in the first frequency range, wherein the first TB is generated including a non-zero padding buffer status report or a voice packet. The method may include transmitting the first TB in the first frequency range. The method may include transmitting a second TB associated with the VoNR communication in a second frequency range based at least in part on the first TB including the non-zero padding buffer status report or the voice packet.

Some aspects described herein relate to a user equipment (UE) for wireless communication. The user equipment may include a memory and one or more processors coupled to the memory. The one or more processors may be configured to communicate on a first set of carriers associated with a first set of parameters and a second set of carriers associated with a second set of parameters. The one or more processors may be configured to detect a radio link control (RLC) discontinuity on at least one set of carriers, of the first set of carriers or the second set of carriers. The one or more processors may be configured to transmit an RLC status report in accordance with an RLC timer that is based at least in part on at least one of a first hybrid automatic repeat request (HARQ) parameter associated with the first set of parameters or a second HARQ parameter associated with the second set of parameters, wherein the RLC timer based at least in part on a number of RLC duplicates received by the UE.

Some aspects described herein relate to a UE for wireless communication. The UE may include a memory and one or more processors coupled to the memory. The one or more processors may be configured to transmit a communication on one of a first set of carriers in a first frequency range (FR) or a second set of carriers in a second FR, wherein the communication is associated with a preferred numerology. The one or more processors may be configured to receive a radio link control (RLC) status report indicating an RLC discontinuity associated with the communication. The one or more processors may be configured to one of.

Some aspects described herein relate to a UE for wireless communication. The UE may include a memory and one or more processors coupled to the memory. The one or more processors may be configured to transmit an indication to avoid Voice over New Radio (VoNR) communication in a first frequency range. The one or more processors may be configured to generate a first transport block (TB) for transmission in the first frequency range, wherein the first TB is generated including a non-zero padding buffer status report or a voice packet. The one or more processors may be configured to transmit the first TB in the first frequency range. The one or more processors may be configured to transmit a second TB associated with the VoNR communication in a second frequency range based at least in part on the first TB including the non-zero padding buffer status report or the voice packet.

Some aspects described herein relate to a non-transitory computer-readable medium that stores a set of instructions for wireless communication by a user equipment (UE). The set of instructions, when executed by one or more processors of the UE, may cause the UE to communicate on a first set of carriers associated with a first set of parameters and a second set of carriers associated with a second set of parameters. The set of instructions, when executed by one or more processors of the UE, may cause the UE to detect a radio link control (RLC) discontinuity on at least one set of carriers, of the first set of carriers or the second set of carriers. The set of instructions, when executed by one or more processors of the UE, may cause the UE to transmit an RLC status report in accordance with an RLC timer that is based at least in part on at least one of a first hybrid automatic repeat request (HARQ) parameter associated with the first set of parameters or a second HARQ parameter associated with the second set of parameters, wherein the RLC timer based at least in part on a number of RLC duplicates received by the UE.

Some aspects described herein relate to a non-transitory computer-readable medium that stores a set of instructions for wireless communication by a one or more instructions that, when executed by one or more processors of an UE. The set of instructions, when executed by one or more processors of the one or more instructions that, when executed by one or more processors of an UE, may cause the one or more instructions that, when executed by one or more processors of an UE to transmit a communication on one of a first set of carriers in a first frequency range (FR) or a second set of carriers in a second FR, wherein the communication is associated with a preferred numerology. The set of instructions, when executed by one or more processors of the one or more instructions that, when executed by one or more processors of an UE, may cause the one or more instructions that, when executed by one or more processors of an UE to receive a radio link control (RLC) status report indicating an RLC discontinuity associated with the communication. The set of instructions, when executed by one or more processors of the one or more instructions that, when executed by one or more processors of an UE, may cause the one or more instructions that, when executed by one or more processors of an UE to one of.

Some aspects described herein relate to a non-transitory computer-readable medium that stores a set of instructions for wireless communication by a one or more instructions that, when executed by one or more processors of an UE. The set of instructions, when executed by one or more processors of the one or more instructions that, when executed by one or more processors of an UE, may cause the one or more instructions that, when executed by one or more processors of an UE to transmit an indication to avoid Voice over New Radio (VoNR) communication in a first frequency range. The set of instructions, when executed by one or more processors of the one or more instructions that, when executed by one or more processors of an UE, may cause the one or more instructions that, when executed by one or more processors of an UE to generate a first transport block (TB) for transmission in the first frequency range, wherein the first TB is generated including a non-zero padding buffer status report or a voice packet. The set of instructions, when executed by one or more processors of the one or more instructions that, when executed by one or more processors of an UE, may cause the one or more instructions that, when executed by one or more processors of an UE to transmit the first TB in the first frequency range. The set of instructions, when executed by one or more processors of the one or more instructions that, when executed by one or more processors of an UE, may cause the one or more instructions that, when executed by one or more processors of an UE to transmit a second TB associated with the VoNR communication in a second frequency range based at least in part on the first TB including the non-zero padding buffer status report or the voice packet.

Some aspects described herein relate to an apparatus for wireless communication. The apparatus may include means for communicating on a first set of carriers associated with a first set of parameters and a second set of carriers associated with a second set of parameters. The apparatus may include means for detecting a radio link control (RLC) discontinuity on at least one set of carriers, of the first set of carriers or the second set of carriers. The apparatus may include means for transmitting an RLC status report in accordance with an RLC timer that is based at least in part on at least one of a first hybrid automatic repeat request (HARQ) parameter associated with the first set of parameters or a second HARQ parameter associated with the second set of parameters, wherein the RLC timer based at least in part on a number of RLC duplicates received by the UE.

Some aspects described herein relate to an apparatus for wireless communication. The apparatus may include means for transmitting a communication on one of a first set of carriers in a first frequency range (FR) or a second set of carriers in a second FR, wherein the communication is associated with a preferred numerology. The apparatus may include means for receiving a radio link control (RLC) status report indicating an RLC discontinuity associated with the communication. The apparatus may include one of, means for performing a retransmission of the communication on a preferred carrier associated with the preferred numerology in response to an uplink grant on the preferred carrier being received within a length of time, or means for performing the retransmission of the communication on a first available uplink grant when no uplink grant on the preferred carrier is received within the length of time.

Some aspects described herein relate to an apparatus for wireless communication. The apparatus may include means for transmitting an indication to avoid Voice over New Radio (VoNR) communication in a first frequency range. The apparatus may include means for generating a first transport block (TB) for transmission in the first frequency range, wherein the first TB is generated including a non-zero padding buffer status report or a voice packet. The apparatus may include means for transmitting the first TB in the first frequency range. The apparatus may include means for transmitting a second TB associated with the VoNR communication in a second frequency range based at least in part on the first TB including the non-zero padding buffer status report or the voice packet.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 4A-4C are diagrams illustrating examples of carrier aggregation, in accordance with the present disclosure.

FIG. 6 is a diagram illustrating an example of signaling associated with RLC operation for carrier aggregation with mixed numerologies, in accordance with the present disclosure.

DETAILED DESCRIPTION

Figure 1:
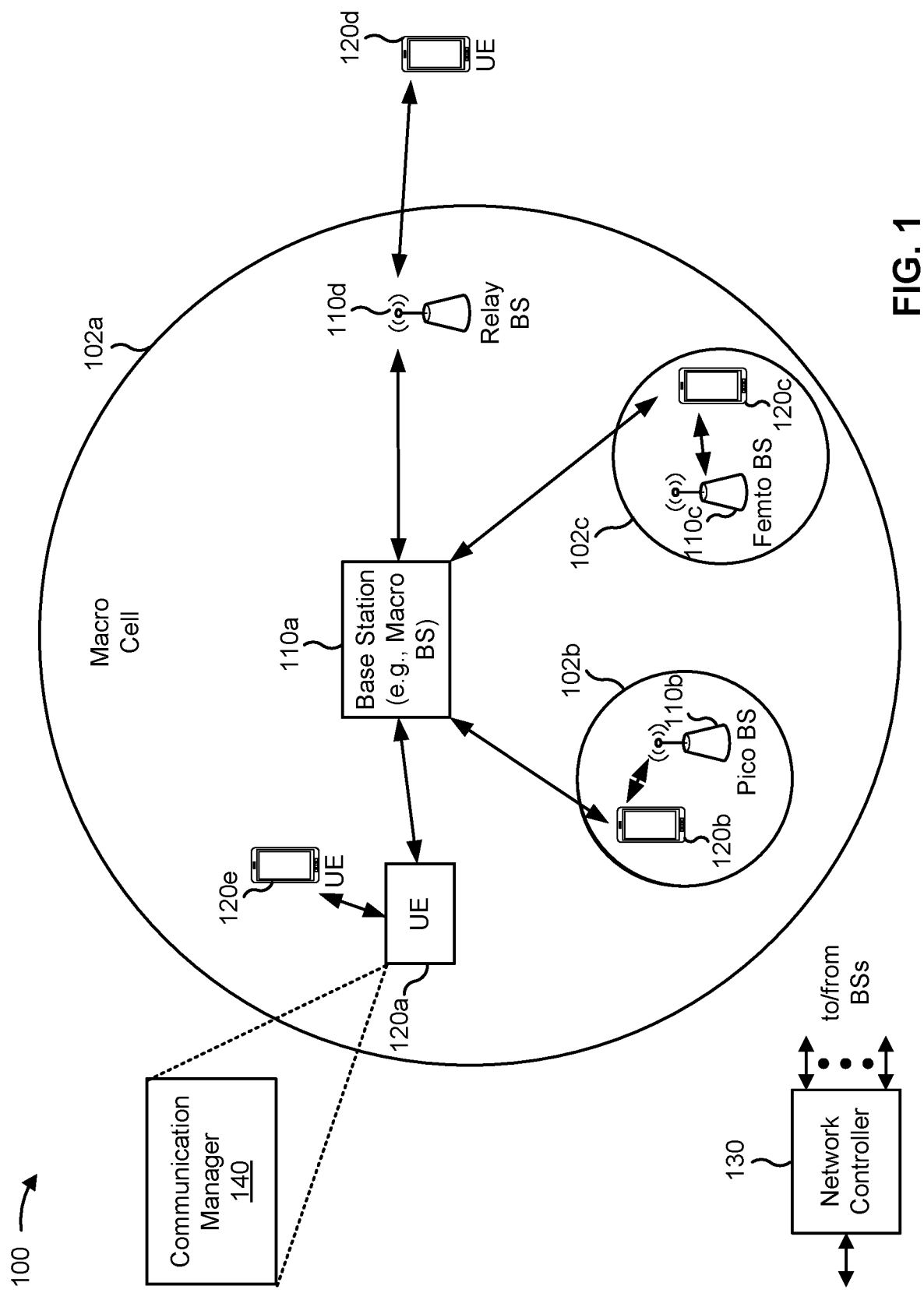
FIG. 1 is a diagram illustrating an example of a wireless network, in accordance with the present disclosure.

A UE may have a capability to communicate in multiple frequency ranges (FRs), such as the sub-6 GHz FR (referred to as FR1) and the mmWave FR (referred to as FR2). The UE may use different numerologies when communicating in different frequency ranges. A numerology is a set of parameters that indicates a subcarrier spacing and a cyclic prefix length of a carrier. A subcarrier spacing indicates how wide subcarriers are on the carrier, and can be used to derive the length of a slot on the carrier. Different numerologies may be associated with different bandwidths and different slot lengths. As the numerology increases (leading to a wider bandwidth), the length of a slot decreases proportionately.

Some UEs may have a capability to perform carrier aggregation of carriers in different FRs (e.g., with different numerologies). "Carrier aggregation" refers to communicating using multiple frequency regions (referred to as carriers). For example, a UE may have a capability to simultaneously communicate on a first set of carriers in FR1 and a second set of carriers in FR2, where the first set of carriers and the second set of carriers are associated with different numerologies.

The radio link control (RLC) layer of a UE performs reassembly of segmented RLC protocol data units (PDUs), among numerous other functions. "Reassembly" refers to assembling RLC PDUs into an RLC service data unit (SDU) for a higher layer of a protocol stack of the UE, such as a packet data convergence protocol (PDCP) layer. If reassembly cannot be accomplished due to one or more missing transport blocks (TBs), the RLC layer may identify an RLC hole in a given slot. As used herein, an RLC hole refers to a set of missing RLC sequence numbers associated with one or more RLC PDUs. For example, the UE may identify an RLC hole at RLC sequence number X when RLC sequence number X−1 and RLC sequence number X+1 have been received and RLC sequence number X has not been received. The UE may buffer communications received after the RLC hole is identified until the RLC hole can be resolved. If the RLC hole persists until a reassembly timer has elapsed, or if the UE receives a poll PDU (that is, a message requesting an RLC status report), the UE may transmit an RLC status report that indicates the RLC hole. The operation of the RLC layer may be based at least in part on RLC parameters that may define a set of RLC timers, such as the reassembly timer and various parameters relating to poll PDU transmission.

Different numerologies may be associated with different RLC parameters or RLC timers, since different numerologies have different bandwidths and subcarrier spacings. However, the UE may be associated with a single RLC entity (e.g., RLC layer), so that RLC operations of the UE across all carriers are performed by the single RLC entity. This may be problematic in the case of carrier aggregation across multiple numerologies. As one example, if the UE experiences an RLC hole associated with a first numerology and an RLC hole associated with a second numerology in quick succession, the UE may have to run successive reassembly timers for the first numerology, then the second numerology. Thus, the UE may have to buffer communications for the combined length of the successive reassembly timers, which requires significant memory resources. As another example, if the UE cannot differentiate which numerology is associated with an RLC hole, the UE may have to use a more conservative set of RLC parameters or timers (e.g., a longer reassembly timer) for the RLC hole, which may be inefficient and may degrade throughput.

Some techniques and apparatuses described herein provide identification (or estimation) of whether an RLC hole is associated with a first numerology or a second numerology. Based at least in part on the numerology associated with the RLC hole, the UE can selectively apply different sets of RLC parameters (e.g., different reassembly timers or the like) for different RLC holes. For example, the UE may use a shorter reassembly timer for an RLC hole associated with FR2, and may use a longer reassembly timer for an RLC hole associated with FR1, thereby improving resource utilization relative to using a more conservative set of RLC parameters. Furthermore, in some techniques and apparatuses described herein, the UE may have a capability to run reassembly timers in parallel for different RLC holes associated with different numerologies, and may have a capability to report RLC holes for specific numerologies, which reduces packet delay as well as UE buffer usage.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

The electromagnetic spectrum is often subdivided, by frequency/wavelength, into various classes, bands, channels, etc. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may communicate on a first set of carriers in a first frequency range (FR) and a second set of carriers in a second FR; detect a radio link control (RLC) discontinuity on at least one of the first set of carriers or the second set of carriers; identify one or more FRs, of the first FR and the second FR, in which the RLC discontinuity occurred; and transmit an RLC status report based at least in part on the identified one or more FRs. Additionally, or alternatively, the communication manager 140 may perform one or more other operations described herein.

In some aspects, the UE 120 may include a communication manager 140. As described in more detail elsewhere herein, the communication manager 140 may transmit a communication on one of a first set of carriers in a first FR or a second set of carriers in a second FR, wherein the communication is associated with a numerology; receive a RLC status report indicating an RLC discontinuity associated with the communication; and perform a retransmission of the communication, wherein the retransmission is on a carrier associated with the numerology if an uplink grant on the carrier is received within a length of time, and wherein the retransmission is on a first available uplink grant otherwise. Additionally, or alternatively, the communication manager 140 may perform one or more other operations described herein.

In some aspects, the UE 120 may include a communication manager 140. As described in more detail elsewhere herein, the communication manager 140 may transmit an indication to avoid Voice over New Radio (VoNR) communication in a first frequency range; generate a transport block (TB) for transmission in the first frequency range, wherein the TB includes padding such that a TB associated with the VoNR communication is transmitted in a second frequency range; and transmit the TB in the first frequency range. Additionally, or alternatively, the communication manager 140 may perform one or more other operations described herein.

As indicated above, FIG. 1 is provided as an example. Other examples may differ from what is described with regard to FIG. 1.

Figure 2:
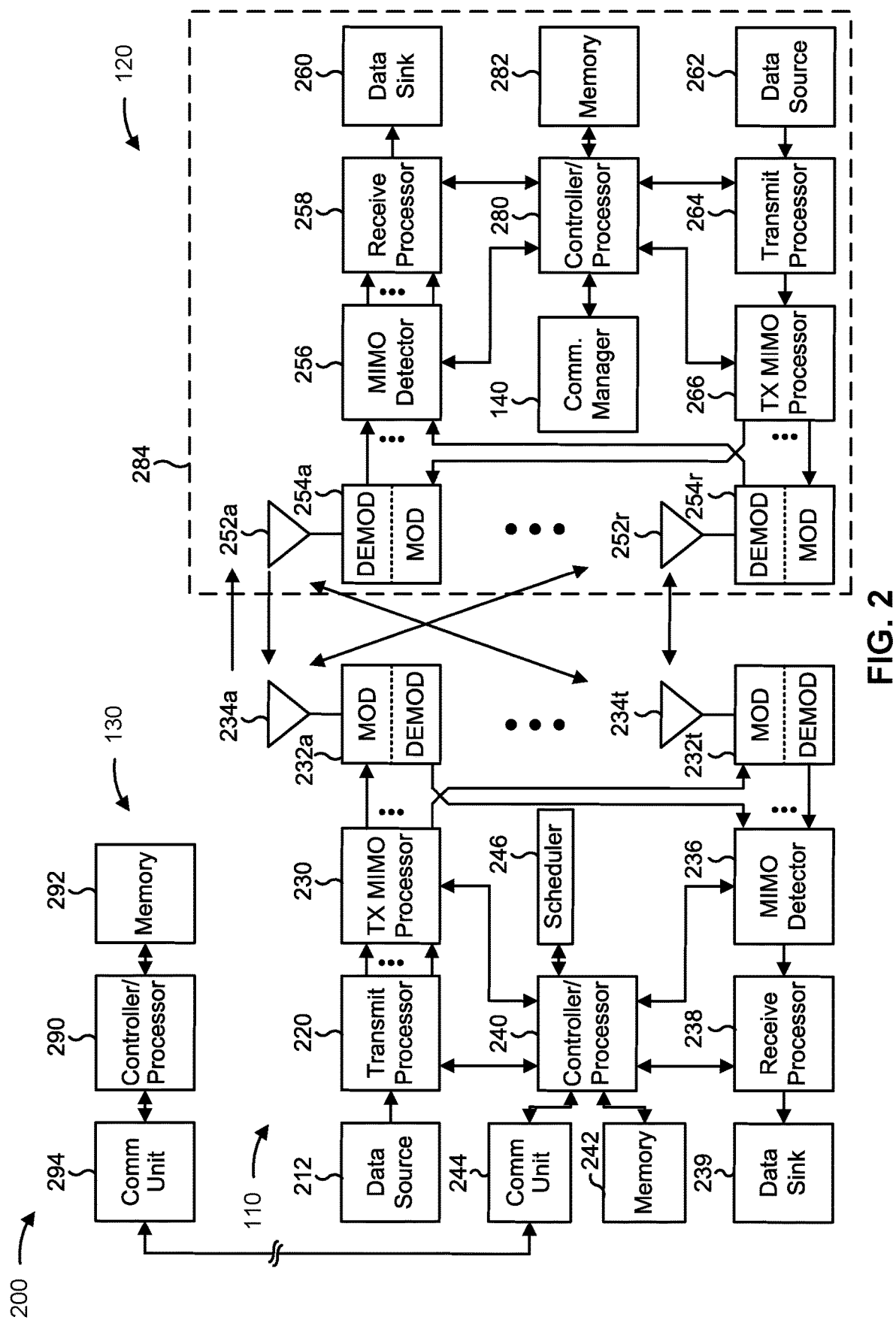
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein.

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein.

The controller/processor 240 of the base station 110, the controller/processor 280 of the UE 120, and/or any other component(s) of FIG. 2 may perform one or more techniques associated with mixed numerology carrier aggregation, as described in more detail elsewhere herein. For example, the controller/processor 240 of the base station 110, the controller/processor 280 of the UE 120, and/or any other component(s) of FIG. 2 may perform or direct operations of, for example, process 1900 of FIG. 19, process 2000 of FIG. 20, process 2100 of FIG. 21, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1900 of FIG. 19, process 2000 of FIG. 20, process 2100 of FIG. 21, and/or other processes as described herein. In some examples, executing instructions may include running the instructions, converting the instructions, compiling the instructions, and/or interpreting the instructions, among other examples.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3B:
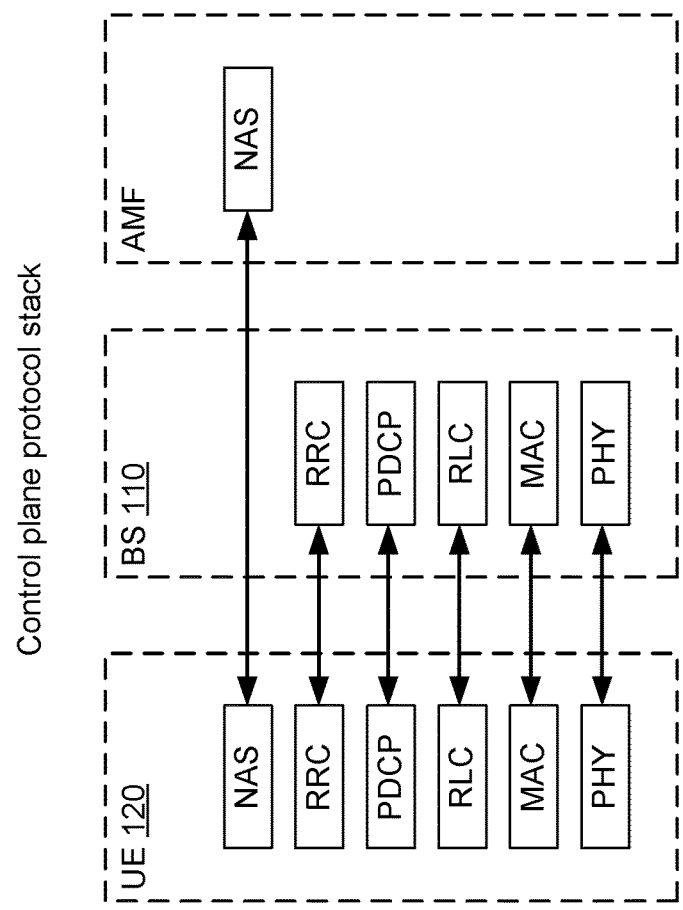
FIGS. 3A and 3B are diagrams illustrating examples of a user plane protocol stack and a control plane protocol stack for a base station and a core network in communication with a UE, in accordance with the present disclosure.
Figure 3A:
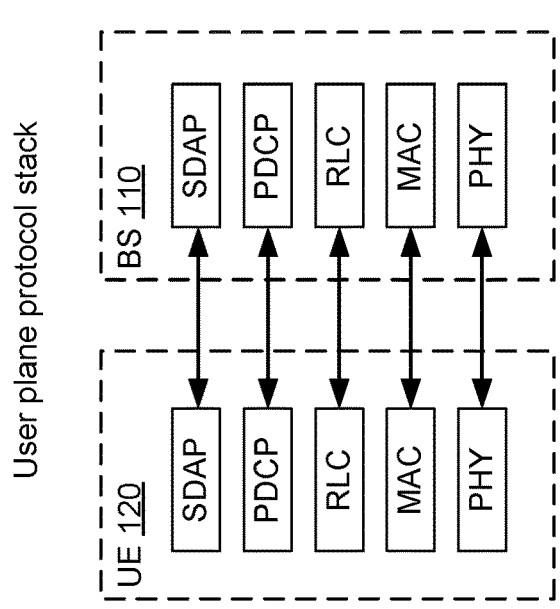

FIGS. 3A and 3B are diagrams illustrating an example 300 of a user plane protocol stack (in FIG. 3A) and a control plane protocol stack (in FIG. 3B) for a base station 110 and a core network in communication with a UE 120, in accordance with the present disclosure.

On the user plane, the UE 120 and the BS 110 may include respective physical (PHY) layers, medium access control (MAC) layers, radio link control (RLC) layers, packet data convergence protocol (PDCP) layers, and service data adaptation protocol (SDAP) layers. A user plane function may handle transport of user data between the UE 120 and the BS 110. On the control plane, the UE 120 and the BS 110 may include respective radio resource control (RRC) layers. Furthermore, the UE 120 may include a non-access stratum (NAS) layer in communication with an NAS layer of an access and management mobility function (AMF). The AMF may be associated with a core network associated with the BS 110, such as a 5G core network (5GC) or a next-generation radio access network (NG-RAN). A control plane function may handle transport of control information between the UE and the core network. Generally, a first layer is referred to as higher than a second layer if the first layer is further from the PHY layer than the second layer. For example, the PHY layer may be referred to as a lowest layer, and the SDAP/PDCP/RLC/MAC layer may be referred to as higher than the PHY layer and lower than the RRC layer. An application (APP) layer, not shown in FIG. 3, may be higher than the SDAP/PDCP/RLC/MAC layer. In some cases, an entity may handle the services and functions of a given layer (e.g., a PDCP entity may handle the services and functions of the PDCP layer), though the description herein refers to the layers themselves as handling the services and functions.

The RRC layer may handle communications related to configuring and operating the UE 120, such as: broadcast of system information related to the access stratum (AS) and the NAS; paging initiated by the 5GC or the NG-RAN; establishment, maintenance, and release of an RRC connection between the UE and the NG-RAN, including addition, modification, and release of carrier aggregation, as well as addition, modification, and release of dual connectivity; security functions including key management; establishment, configuration, maintenance, and release of signaling radio bearers (SRBs) and data radio bearers (DRBs); mobility functions (e.g., handover and context transfer, UE cell selection and reselection and control of cell selection and reselection, inter-RAT mobility); quality of service (QoS) management functions; UE measurement reporting and control of the reporting; detection of and recovery from radio link failure; and NAS message transfer between the NAS layer and the lower layers of the UE 120. The RRC layer is frequently referred to as Layer 3 (L3).

The SDAP layer, PDCP layer, RLC layer, and MAC layer may be collectively referred to as Layer 2 (L2). Thus, in some cases, the SDAP, PDCP, RLC, and MAC layers are referred to as sublayers of Layer 2. On the transmitting side (e.g., if the UE 120 is transmitting an uplink communication or the BS 110 is transmitting a downlink communication), the SDAP layer may receive a data flow in the form of a QoS flow. A QoS flow is associated with a QoS identifier, which identifies a QoS parameter associated with the QoS flow, and a QoS flow identifier (QFI), which identifies the QoS flow. Policy and charging parameters are enforced at the QoS flow granularity. A QoS flow can include one or more service data flows (SDFs), so long as each SDF of a QoS flow is associated with the same policy and charging parameters. In some aspects, the RRC/NAS layer may generate control information to be transmitted and may map the control information to one or more radio bearers for provision to the PDCP layer.

The SDAP layer, or the RRC/NAS layer, may map QoS flows or control information to radio bearers. Thus, the SDAP layer may be said to handle QoS flows on the transmitting side. The SDAP layer may provide the QoS flows to the PDCP layer via the corresponding radio bearers. The PDCP layer may map radio bearers to RLC channels. The PDCP layer may handle various services and functions on the user plane, including sequence numbering, header compression and decompression (if robust header compression is enabled), transfer of user data, reordering and duplicate detection (if in-order delivery to layers above the PDCP layer is required), PDCP protocol data unit (PDU) routing (in case of split bearers), retransmission of PDCP service data units (SDUs), ciphering and deciphering, PDCP SDU discard (e.g., in accordance with a timer, as described elsewhere herein), PDCP re-establishment and data recovery for RLC acknowledged mode (AM), and duplication of PDCP PDUs. The PDCP layer may handle similar services and functions on the control plane, including sequence numbering, ciphering, deciphering, integrity protection, transfer of control plane data, duplicate detection, and duplication of PDCP PDUs.

The PDCP layer may provide data, in the form of PDCP PDUs, to the RLC layer via RLC channels. The RLC layer may handle transfer of upper layer PDUs to the MAC and/or PHY layers, sequence numbering independent of PDCP sequence numbering, error correction via automatic repeat requests (ARQ), segmentation and re-segmentation, reassembly of an SDU, RLC SDU discard, and RLC re-establishment.

The RLC layer may provide data, mapped to logical channels, to the MAC layer. The services and functions of the MAC layer include mapping between logical channels and transport channels (used by the PHY layer as described below), multiplexing/demultiplexing of MAC SDUs belonging to one or different logical channels into/from transport blocks (TBs) delivered to/from the physical layer on transport channels, scheduling information reporting, error correction through hybrid ARQ (HARQ), priority handling between UEs by means of dynamic scheduling, priority handling between logical channels of one UE by means of logical channel prioritization, and padding.

The MAC layer may package data from logical channels into TBs, and may provide the TBs on one or more transport channels to the PHY layer. The PHY layer may handle various operations relating to transmission of a data signal, as described in more detail in connection with FIG. 2. The PHY layer is frequently referred to as Layer 1 (L1).

On the receiving side (e.g., if the UE 120 is receiving a downlink communication or the BS 110 is receiving an uplink communication), the operations may be similar to those described for the transmitting side, but reversed. For example, the PHY layer may receive TBs and may provide the TBs on one or more transport channels to the MAC layer. The MAC layer may map the transport channels to logical channels and may provide data to the RLC layer via the logical channels. The RLC layer may map the logical channels to RLC channels and may provide data to the PDCP layer via the RLC channels. The PDCP layer may map the RLC channels to radio bearers and may provide data to the SDAP layer or the RRC/NAS layer via the radio bearers.

Data may be passed between the layers in the form of PDUs and SDUs. An SDU is a unit of data that has been passed from a layer or sublayer to a lower layer. For example, the PDCP layer may receive a PDCP SDU. A given layer may then encapsulate the unit of data into a PDU and may pass the PDU to a lower layer. For example, the PDCP layer may encapsulate the PDCP SDU into a PDCP PDU and may pass the PDCP PDU to the RLC layer. The RLC layer may receive the PDCP PDU as an RLC SDU, may encapsulate the RLC SDU into an RLC PDU, and so on. In effect, the PDU carries the SDU as a payload.

The RLC layer can operate in an acknowledged mode (AM), an unacknowledged mode (UM), or a transparent mode (TM). In AM, buffering is performed at the transmitter and the receiver. Segmentation is performed at the transmitter and reassembly is performed at the receiver. A feedback mechanism (including an acknowledgment (ACK) or a negative ACK (NACK) is used for communication (such as RLC PDUs or RLC SDUs). AM may be used for certain signaling radio bearers (such as SRB1, SRB2, and SRB3) and data radio bearers. A sequence number in AM, which may be used for reassembly and recovery, can be selected from a 12-bit size or an 18-bit size. In UM, buffering is performed at the transmitter and the receiver, segmentation is performed at the transmitter, reassembly is performed at the receiver, and no feedback mechanism is used. In TM, no RLC header is used, buffering is performed at the transmitter only, no segmentation or reassembly is performed, and no feedback mechanism is used.

An RLC transmitter in AM may perform segmentation and concatenation of a packet. The RLC transmitter may add an RLC header to the packet. The RLC transmitter may provide an RLC PDU with the RLC header to the MAC layer. The RLC transmitter may also buffer the RLC PDU in case of a NACK from the RLC receiver. If the RLC transmitter receives a NACK within a period of time, then the RLC transmitter may trigger retransmission of the buffered RLC PDU.

The RLC transmitter may use a transmit window to limit the number of RLC SDUs that are transmitted while waiting for an acknowledgment from an RLC receiver. The transmit window may start at the oldest transmitted RLC SDU which has not been fully acknowledged. The oldest transmitted RLC SDU may have been partly acknowledged if it was segmented prior to transmission. The transmit window advances as acknowledgments are received. The size of the transmit window is limited by the sequence number (SN) range. The transmit window is used to prevent SN ambiguity at the RLC receiver. The length of the SN is configured using an RRC parameter.

The RLC transmitter can request a status report from an RLC receiver, such as based at least in part on a number of PDUs transmitted since a previous request, or a data volume since a previous request. An RLC parameter pollPDU may indicate the number of PDUs transmitted since a previous request, and an RLC parameter pollByte may indicate the data volume since the previous request. If the RLC transmitter requests and does not receive a status report after waiting a period of time defined by an RLC parameter t-PollRetransmit, the RLC transmitter may retransmit the request. The status report may identify the SNs up to which all RLC SDUs have been successfully received, with the exception of RLC SDUs specified within the remainder of the status report. The status report may indicate to retransmit a complete RLC SDU, or may indicate to retransmit one or more segments of an RLC SDU.

An RLC receiver in AM may buffer a received RLC PDU (referred to as an AM data (AMD) PDU) if the RLC PDU is within a receive window, perform reordering, remove the RLC header, and perform reassembly of RLC PDUs to form RLC SDUs. In AM, the RLC receiver may provide feedback regarding reception of RLC PDUs. In AM, each RLC PDU may be transmitted with an SN in ascending order. AM supports automatic repeat request (ARQ). The RLC receiver may transmit a status PDU (sometimes referred to as a status message or a status report) to indicate the status of RLC PDUs at the RLC receiver. The status PDU may indicate which RLC PDU SN(s) were not received by the RLC receiver. For example, the RLC receiver may use a reassembly timer (defined by an RLC parameter t-reassembly). The RLC receiver may start the reassembly timer when a segment of an SDU is received and more segments are pending for that SDU (e.g., if one or more SNs of the SDU are missed). Once the SDU is completely received, the RLC receiver may stop the reassembly timer. If the reassembly timer expires without having received the one or more SNs that were missed, the RLC receiver may transmit a status report indicating one or more segments of the SDU that were not received. For example, the RLC receiver may wait for the length of the reassembly timer (in the hope that a hybrid ARQ (HARQ) mechanism can provide for recovery via retransmission of the one or more SNs that were missed) before transmitting the status report to trigger RLC-layer retransmission of the one or more SNs that were missed.

As indicated above, FIGS. 3A and 3B are provided as one or more examples. Other examples may differ from what is described with regard to FIGS. 3A and 3B.

FIGS. 4A-4C are diagrams illustrating examples of carrier aggregation, in accordance with the present disclosure.

Carrier aggregation is a technology that enables two or more component carriers (CCs, sometimes referred to as carriers) to be combined (e.g., into a single channel) for a single UE 120 to enhance data capacity. As shown, carriers can be combined in the same or different frequency bands. Additionally, or alternatively, contiguous or non-contiguous carriers can be combined. A base station 110 may configure carrier aggregation for a UE 120, such as in a radio resource control (RRC) message, downlink control information (DCI), and/or another signaling message.

As shown in FIG. 4A, and by reference number 405, in some aspects, carrier aggregation may be configured in an intra-band contiguous mode where the aggregated carriers are contiguous to one another and are in the same band. As shown in FIG. 4B, and by reference number 410, in some aspects, carrier aggregation may be configured in an intra-band non-contiguous mode where the aggregated carriers are non-contiguous to one another and are in the same band. As shown in FIG. 4C, and by reference number 415, in some aspects, carrier aggregation may be configured in an inter-band non-contiguous mode where the aggregated carriers are non-contiguous to one another and are in different bands.

In carrier aggregation, a UE 120 may be configured with a primary carrier or primary cell (PCell) and one or more secondary carriers or secondary cells (SCells). In some aspects, the primary carrier may carry control information (e.g., downlink control information and/or scheduling information) for scheduling data communications on one or more secondary carriers, which may be referred to as cross-carrier scheduling. In some aspects, a carrier (e.g., a primary carrier or a secondary carrier) may carry control information for scheduling data communications on the carrier, which may be referred to as self-carrier scheduling or carrier self-scheduling.

In some aspects, carrier aggregation may be used across multiple numerologies. A carrier may be configured with a numerology, which may be indicated by an index $\mu$. A numerology may indicate a subcarrier spacing (SCS) of the carrier in the frequency domain, as well as other parameters, such as a cyclic prefix length. The SCS may determine the frequency domain bandwidth and the time domain duration of a resource element. In some aspects, a first carrier of a carrier aggregation configuration may have a first numerology (corresponding to a first SCS) and a second carrier of the carrier aggregation configuration may have a second numerology (corresponding to a second SCS). In some aspects, different numerologies may be used in different frequency ranges (which are defined elsewhere herein). For example, FR1 may typically be associated with numerologies $\mu=0$, 1, and 2 (which correspond to SCSs of 15 kHz, 30 kHz, and 60 kHz, respectively), while FR2 may typically be associated with numerologies $\mu=2$, 3, and 4 (which correspond to SCSs of 60 kHz, 120 kHz, and 240 kHz, respectively). Carrier aggregation can be used for carriers in different frequency ranges, such as a first group of carriers in FR1 (associated with numerologies in the range of $\mu=0$, 1, and 2) and a second group of carriers in FR2 (associated with numerologies in the range of $\mu=2$, 3, and 4).

As indicated above, FIGS. 4A-4C are provided as one or more examples. Other examples may differ from what is described with regard to FIGS. 4A-4C.

Figure 5:
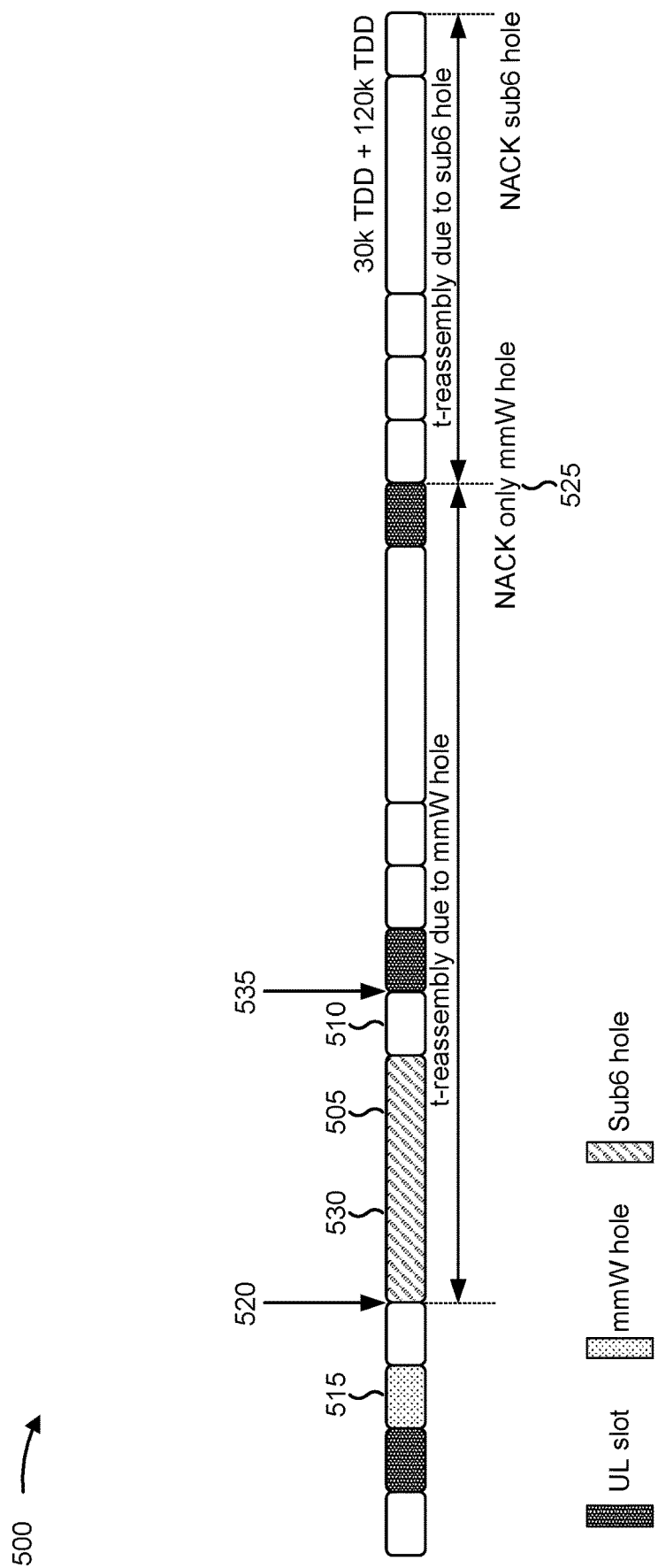
FIG. 5 is a diagram illustrating an example of radio link control (RLC) holes in two numerologies and a reassembly timer associated with the RLC holes, in accordance with the present disclosure.

FIG. 5 is a diagram illustrating an example 500 of RLC holes in two numerologies and a reassembly timer associated with the RLC holes, in accordance with the present disclosure. FIG. 5 is an example where a UE 120 may not differentiate which numerology is associated with an RLC hole, and may therefore run reassembly timers in sequence for RLC holes on different numerologies.

FIG. 5 illustrates downlink data received at an RLC layer of the UE 120. The data is associated with two numerologies: a first numerology with a 30 kHz subcarrier spacing associated with a sub6 FR (e.g., FR1) and a second numerology with a 120 kHz subcarrier spacing associated with a mmW FR (e.g., FR2). The first numerology is associated with a longer slot length than the second numerology. Data received in a slot of the first numerology is illustrated by a longer rectangle (such as shown by reference number 505) and data received in a slot of the second numerology is illustrated by a shorter rectangle (such as shown by reference number 510). It can be seen that there are four of the shorter slots per longer slot, since there are four slots of the second numerology per slot of the first numerology in accordance with the subcarrier spacings. In example 500, there may be one carrier of the first numerology and one carrier of the second numerology. The carrier of the second numerology may be a time division duplexing (TDD) carrier, as indicated by the uplink slots with the black fill.

The data may be received in the form of RLC PDUs. Each RLC PDU may be associated with a sequence number (SN). One or more RLC PDUs may be received per slot. For an example where SNs received in each slot are illustrated, refer to FIG. 11.

An RLC hole may occur on the carrier associated with the first numerology or the carrier associated with the second numerology. An RLC hole occurs when the UE 120 does not receive one or more RLC PDUs. The UE 120 may determine that an RLC hole has occurred based at least in part on SNs of the RLC PDUs. For example, an RLC hole 515 occurs, meaning that the UE 120 failed to receive one or more RLC PDUs in a slot. The UE 120 may identify the RLC hole 515 at the time shown by reference number 520, since at that time, the UE 120 will have received one or more RLC PDUs with higher SNs than the one or more missed RLC PDUs, and can thus determine that the one or more missed RLC PDUs were missed. "RLC hole" is used interchangeably with "RLC discontinuity" herein.

The UE 120 may start a reassembly timer, shown by reference number 525. As the reassembly timer runs, the UE 120 may buffer received data (e.g., on the slot shown by reference number 505, the slot shown by reference number 510, and so on). In some cases, the UE 120 may successfully resolve the RLC hole 515, such as based at least in part on RLC PDUs being received out of order and subsequently reordered, or based at least in part on a HARQ mechanism. If the UE 120 resolves the RLC hole 515, then the UE 120 may not transmit a NACK regarding the RLC hole 515.

If the reassembly timer associated with the RLC hole 515 elapses and the UE 120 has not resolved the RLC hole 515, the UE 120 may transmit a NACK regarding the RLC hole 515, such as at a time shown by reference number 525. For example, the UE 120 may transmit an RLC status report indicating a NACK regarding the RLC hole 515. In example 500, the RLC status report may indicate a most recent successfully received SN, and may indicate one or more SNs of the one or more missed RLC PDUs of the RLC hole 515.

As further shown in example 500, another RLC hole 530 may occur in the slot shown by reference number 505. This RLC hole 530 may occur on the carrier associated with the first numerology. The UE 120 may identify the RLC hole 530 at the time shown by reference number 535. However, in example 500, since the UE 120 is already running a reassembly timer associated with the RLC hole 515, the UE 120 may wait to start a reassembly timer for the RLC hole 530 until the reassembly timer associated with the RLC hole 515 has ended. Thus, the UE 120 may continue to buffer communications during both reassembly timers, which may use significant buffer resources of the UE 120.

In some aspects, the UE 120 may switch to a fast NACK mode based at least in part on memory usage of the UE 120 satisfying a threshold. For example, if Layer 2 (RLC) memory usage exceeds a threshold, the UE 120 may enter a fast NACK mode. The fast NACK mode may be associated with a less aggressive mode and a more aggressive mode, as described below. In the fast NACK mode, the UE 120 may shorten the reassembly timer and a t-statusProhibit timer, such that buffering is shorter and memory usage is decreased. The fast NACK mode may use a conservative assumption to set RLC parameters (e.g., RLC timers) such as the length of the reassembly timer. For example, if the UE 120 communicates using an FR1 numerology and an FR2 numerology (as in example 500), the fast NACK mode may use the maximum of HARQ round-trip times (RTTs) associated with FR1 and FR2 to set the reassembly timer. Due to this, the reassembly timer may be based at least in part on a HARQ RTT for FR1, which may be too slow for FR2, leading to increased buffer usage. Furthermore, as packet data convergence protocol (PDCP) throughput is high, the UE 120 may quickly move to the more aggressive mode (e.g., within approximately 3 to 4 ms after RLC hole detection). In some examples, the reassembly timer based at least in part on FR1's HARQ RTT may be 5 to 8 ms. Another 4 ms may elapse from reassembly timer expiry until RLC retransmission is processed at the UE 120. Thus, in the worst case, the UE 120 may buffer more than 15 MB at a 10 Gbps throughput. In some examples, RLC duplicates on FR2 may be negligible, as the 8 ms reassembly timer may allow up to 5 HARQ transmissions, and throughput loss due to RLC duplicates on FR1 may be expected to be approximately 0.3%. However, even in the more aggressive fast NACK mode, buffer occupancy may remain high (e.g., greater than 50 percent) until an RLC retransmission is transmitted, and for peak bidirectional throughput cases, overall Layer 2 memory usage may remain a concern.

Some techniques described herein provide adjustment of an RLC timer (such as a reassembly timer or a status prohibit timer) based at least in part on respective HARQ parameters (such as HARQ RTTs, HARQ recovery delays, or whether HARQ is ongoing for a given set of carriers) and based at least in part on a number of duplicate RLC PDUs received. Furthermore, some techniques described herein provide for the identification of a set of carriers on which an RLC hole occurs. For example, some techniques described herein provide differentiation of whether an RLC hole is associated with a first numerology (e.g., in a first FR) or a second numerology (e.g., in a second FR). In some aspects, the techniques described herein provide for the identification of whether an RLC hole is associated with a set of carriers having a first set of parameters (such as a duplexing configuration, a scheduling delay, a numerology, a frequency range, or an uplink/downlink slot allocation) or a set of carriers having a second set of parameters. By differentiating the set of carriers of the RLC hole, the UE 120 can use RLC parameters that are appropriate for the set of carriers associated with the RLC hole. For example, the UE 120 can use a shorter reassembly timer for RLC holes associated with a higher numerology (and thus a shorter slot length and shorter HARQ RTT) and a longer reassembly timer for RLC holes associated with a lower numerology (and thus a longer slot length and longer HARQ RTT). As another example, the UE 120 may perform RLC status reporting based at least in part on the numerology, such as by selectively acknowledging RLC holes based at least in part on numerologies associated with the RLC holes, as described in connection with FIG. 6, or by separately performing RLC status reporting for each numerology, as described in connection with FIG. 11. Thus, buffer usage of the UE 120 is reduced, delay associated with RLC reassembly in higher numerologies is reduced, and resource utilization of the UE 120 is improved. For example, for FR2 RLC holes, the reassembly timer may be reduced to approximately 2 to 4 ms, which leads to buffer usage of approximately 12 percent. Furthermore, the reduced memory usage of the UE 120 may mean that this memory can be repurposed for other usages, such as to relax a memory-based cap on an RLC transmit window size for uplink transmission by the UE 120. As used herein, a lower numerology is associated with a smaller subcarrier spacing. For example, a numerology with a 15 kHz subcarrier spacing is lower than a numerology with a 30 kHz subcarrier spacing, and a numerology with a 120 kHz subcarrier spacing is higher than the numerology with the 30 kHz subcarrier spacing.

It should be noted that many of the techniques described herein are described with regard to a combination of carriers of two or more different numerologies. However, these techniques can be applied for combinations of carriers of two or more different sets of parameters, including different duplexing configurations, different scheduling delays, different numerologies, different frequency ranges, different uplink/downlink slot allocations, or a combination thereof. It should be understood that a technique, described herein, as being performed for carriers of two different numerologies can also be performed for carriers of two different sets of parameters, unless noted otherwise.

As indicated above, FIG. 5 is provided as an example. Other examples may differ from what is described with regard to FIG. 5.

FIG. 6 is a diagram illustrating an example 600 of signaling associated with RLC operation for carrier aggregation with mixed sets of parameters, in accordance with the present disclosure. As shown, example 600 includes a UE 120 and a BS 110. In example 600, the BS 110 is an RLC transmitter and the UE 120 is an RLC receiver (e.g., example 600 concerns downlink communication). In some aspects (e.g., for uplink communication), the UE 120 is an RLC transmitter and the BS 110 is an RLC receiver.

As shown by reference number 610, the UE 120 and the BS 110 may communicate using carrier aggregation. For example, the UE 120 and the BS 110 communicate on a first set of carriers (e.g., one or more carriers) in a first frequency range (e.g., FR1) and a second set of carriers (e.g., one or more carriers) in a second frequency range (e.g., FR2). In some aspects, the first set of carriers may be associated with a first numerology and the second set of carriers may be associated with a second numerology different than the first numerology. While the techniques described herein are described with regard to two numerologies, these techniques can be applied for combinations of carriers with any number of different numerologies, or for carriers with the same numerology. For example, the techniques described herein can be performed for combinations of carriers with two or more different sets of parameters, as described elsewhere herein.

As shown by reference number 620, the UE 120 may detect one or more RLC holes. For example, the UE 120 may detect one or more RLC holes on the first set of carriers and/or one or more RLC holes on the second set of carriers. The detection of an RLC hole is described in connection with FIG. 5. In some aspects, the UE 120 may detect a single RLC hole. In some aspects, the UE 120 may detect multiple RLC holes.

As shown by reference number 630, the UE 120 may identify whether the one or more RLC holes are in FR1 (e.g., associated with a communication received on the first set of carriers) or in FR2 (e.g., associated with a communication received on the second set of carriers). For example, the UE 120 may determine a numerology associated with each RLC hole of the one or more RLC holes. In some aspects, the UE 120 may identify whether the one or more RLC holes are in FR1 or FR2 based at least in part on correlating a timing of a cyclic redundancy check (CRC) error with an RLC hole, as described in connection with FIGS. 7A-7C. In some aspects, the UE 120 may identify whether the one or more RLC holes are in FR1 or FR2 based at least in part on correlating TB sizes with RLC holes, as described in connection with FIGS. 8-10. In some aspects, the UE 120 may identify whether the one or more RLC holes are in FR1 or FR2 based at least in part a combination of the techniques described in connection with FIGS. 7A-10.

As shown by reference number 640, the UE 120 may transmit an RLC status report based at least in part on identifying whether the one or more RLC holes are in FR1 or FR2. For example, in some aspects, the UE 120 may transmit an RLC status report with a NACK up to the latest RLC hole (e.g., irrespective of whether the latest RLC hole has had sufficient time for HARQ recovery), which may avoid excessive delay for RLC recovery of RLC holes associated with higher numerologies at the cost of potential loss of data associated with RLC holes of lower numerologies. In some aspects, the UE 120 may transmit an RLC status report indicating a NACK for each RLC hole, associated with a first numerology, until a next RLC hole associated with a second numerology. For example, the UE 120 may transmit an RLC status report indicating one or more NACKs for one or more RLC holes associated with FR2 that occur before a next RLC hole associated with FR1 (e.g., based at least in part on identifying whether the one or more RLC holes are associated with FR1 or FR2), which may reduce delay associated with RLC recovery of FR2 RLC holes while allowing sufficient time for RLC recovery of FR1 RLC holes.

In some aspects, the UE 120 may transmit an RLC status report indicating a NACK for any RLC hole for which HARQ recovery is expected to be complete. For example, the UE 120 may determine a numerology associated with an RLC hole, as described in connection with reference number 630. The UE 120 may use a timer associated with the numerology that indicates a length of time after which HARQ recovery is expected to be complete. For a numerology in FR1, the timer may be expressed as $t_{FR1}^{harq}$=t-reassembly-$k_1$*RTT(FR1), where $k_1$ is an integer that indicates a typical maximum number of HARQ retransmissions needed to recover an FR1 RLC hole. For a numerology in FR2, the timer may be expressed as $t_{FR2}^{harq}$=t-reassembly-$k_2$*RTT(FR2), where $k_2$ is an integer that indicates a typical maximum number of HARQ retransmissions needed to recover an FR2 RLC hole. The UE 120 may start these timers upon starting the reassembly timer associated with an RLC hole. For example, for an RLC hole on either FR1 or FR2, the UE 120 may start both $t_{FR1}^{harq}$ and $t_{FR2}^{harq}$. The UE 120 may mark the highest RLC hole on each numerology when the respective timer expires. Upon expiry of the reassembly timer, the UE 120 may prepare an RLC status report that indicates a NACK for each marked RLC hole, and each RLC hole that precedes each marked RLC hole. It may be expected that HARQ recovery has failed for each of these RLC holes, so the UE 120 can safely provide a NACK for each of these RLC holes. RLC holes after the marked RLC hole may still be recovered using HARQ recovery, so the UE 120 may not provide a NACK for these RLC holes. Thus, by determining the numerology associated with each RLC hole, the UE 120 can selectively indicate a NACK for each RLC hole based at least in part on a timer associated with an expected HARQ recovery, which reduces buffer usage and delay associated with recovery of higher numerologies.

In some aspects, the UE 120 may transmit an RLC status report without having determined a numerology associated with an RLC hole. For example, the RLC status report may be based at least in part on a reassembly timer, as described elsewhere herein. In some aspects, the reassembly timer may be determined (e.g., statically) based at least in part on the numerologies of a number of sets of carriers. For example, the reassembly timer may be expressed as t-reassembly=min (RRC t-reassembly, max($k_1$*HARQ_RTT($\mu_1$), $k_2$*HARQ_RTT($\mu_2$), . . . , $k_n$*HARQ_RTT($\mu_n$)), where $\mu_1$, $\mu_2$, . . . , $\mu_n$ denote numerologies of n set of carriers, and $k_1$, $k_2$, . . . , $k_n$ denote a maximum number of HARQ retransmissions to wait for each carrier of each numerology n before transmitting an RLC status report indicating a NACK. In some aspects, $k_1$, $k_2$, . . . , $k_n$ may be determined based at least in part on a number of HARQ transmissions performed to recover an RLC hole (which may be quantified as the number of HARQ RTTs that the UE 120 will wait before sending a NACK, and which may be referred to herein as a HARQ parameter) and a number of RLC duplicates. For example, $k_1$, $k_2$, . . . , $k_n$ may be determined such that a balance is achieved between the number of HARQ transmissions and the number of RLC duplicates. In this example, an RLC timer (e.g., a reassembly timer or a prohibit timer) that is relatively shorter may result in a quicker NACK transmission, but may increase the rate of RLC duplicates. An RLC timer that is relatively longer (compared to the relatively shorter RLC timer) may reduce the rate of RLC duplicates but may delay NACK. The UE 120 or the base station 110 may determine $k_1$, $k_2$, . . . , $k_n$ based at least in part on the number of HARQ transmissions and the number of RLC duplicates, as described elsewhere herein.

In some aspects, the reassembly timer may be determined (e.g., semi-statically) based at least in part on which configured carriers (of the first set of carriers and the second set of carriers) are active for downlink scheduling. For example, the UE 120 may identify a set L of all carriers with a scheduled physical downlink shared channel (PDSCH). If all carriers of L have the same numerology, then the UE 120 may set the reassembly timer as t-reassembly=min(RRC t-reassembly, k*HARQ_RTT ($\mu$)). If two or more carriers of L have n different numerologies (where n is greater than 1), then the UE 120 may set the reassembly timer as t-reassembly=min(RRC t-reassembly, max($k_1$*HARQ_RTT ($\mu_1$), $k_2$*HARQ_RTT($\mu_2$), . . . , $k_n$*HARQ_RTT($\mu_n$)), as described above. The UE 120 may update L semi-statically, such as based at least in part on an RRC update, a DCI update, or the like.

In some aspects, the BS 110 and the UE 120 may perform per-numerology RLC status reporting. For example, the BS 110 may maintain per-numerology queues for transmitted RLC PDUs and PDUs to be retransmitted. The BS 110 may maintain a common queue for incoming PDCP PDUs (e.g., incoming to the RLC layer) until the incoming PDCP PDUs are transmitted on a CC associated with a given numerology.

The UE 120 may track RLC SNs per numerology. For example, the UE 120 may track RLC SNs received on a given numerology. In some aspects, the UE 120 may detect a numerology of an RLC hole, such as using the techniques described in connection with FIGS. 7-8. In some aspects, for a mixed RLC hole, the UE 120 may consider the mixed RLC hole to be associated with a lowest numerology of the numerologies associated with the mixed RLC hole. The UE 120 and the BS 110 may use numerology-specific RLC parameters (such as a reassembly timer, a t-statusProhibit timer, a pollPDU parameter, a pollBytes parameter, a t-Poll-Retransmit parameter, or the like), which may be specified via RRC signaling for uplink and downlink communications of the UE 120. The UE 120 (or an RLC receiver) may transmit an RLC status report for a given numerology upon receiving a poll PDU for the given numerology or upon a reassembly timer for the given numerology expiring. In the RLC status report, the RLC receiver may indicate a highest RLC SN received on the given numerology (such that there is no ambiguity regarding whether the highest RLC SN is associated with the given numerology or another numerology. The BS 110 (or an RLC transmitter) can determine the numerology associated with the RLC status report by reference to the highest RLC SN (since the highest RLC SN was transmitted by the BS 110). In this way, the UE 120 may identify one or more numerologies in which an RLC hole occurred. The one or more numerologies may include a single numerology (e.g., only a single numerology) if the RLC hole is a pure RLC hole, and may include multiple numerologies if the RLC hole is a mixed RLC hole. Thus, the UE 120 and the BS 110 may implement numerology-specific RLC status reporting, which reduces buffer utilization and increases speed of RLC recovery for higher frequency ranges.

As indicated above, FIG. 6 is provided as an example. Other examples may differ from what is described with regard to FIG. 6.

Figure 7A:
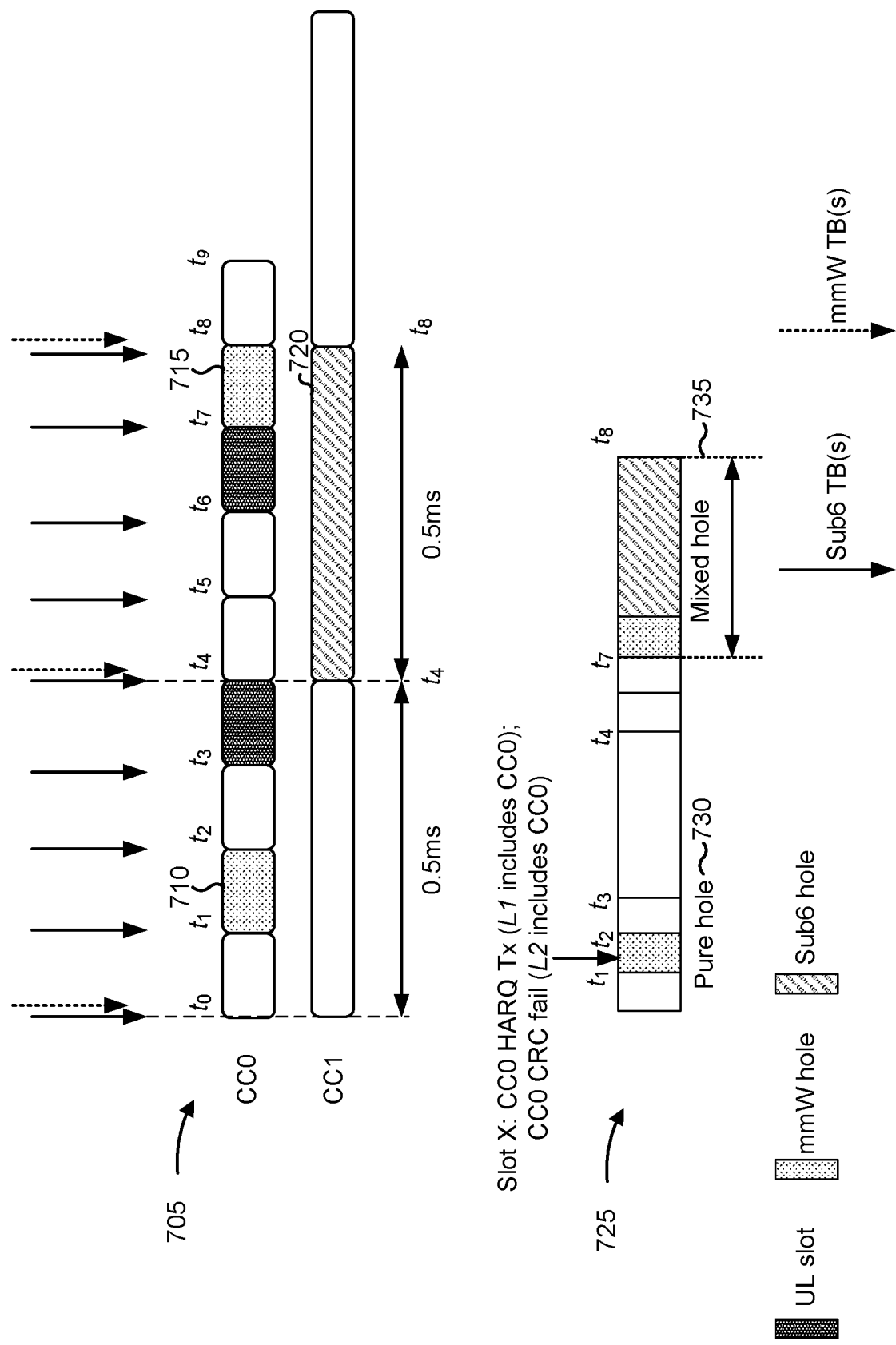
FIGS. 7A-7C are diagrams illustrating examples of identifying a numerology associated with an RLC hole based at least in part on correlating timing of cyclic redundancy check errors with RLC holes, in accordance with the present disclosure.
Figure 7B:
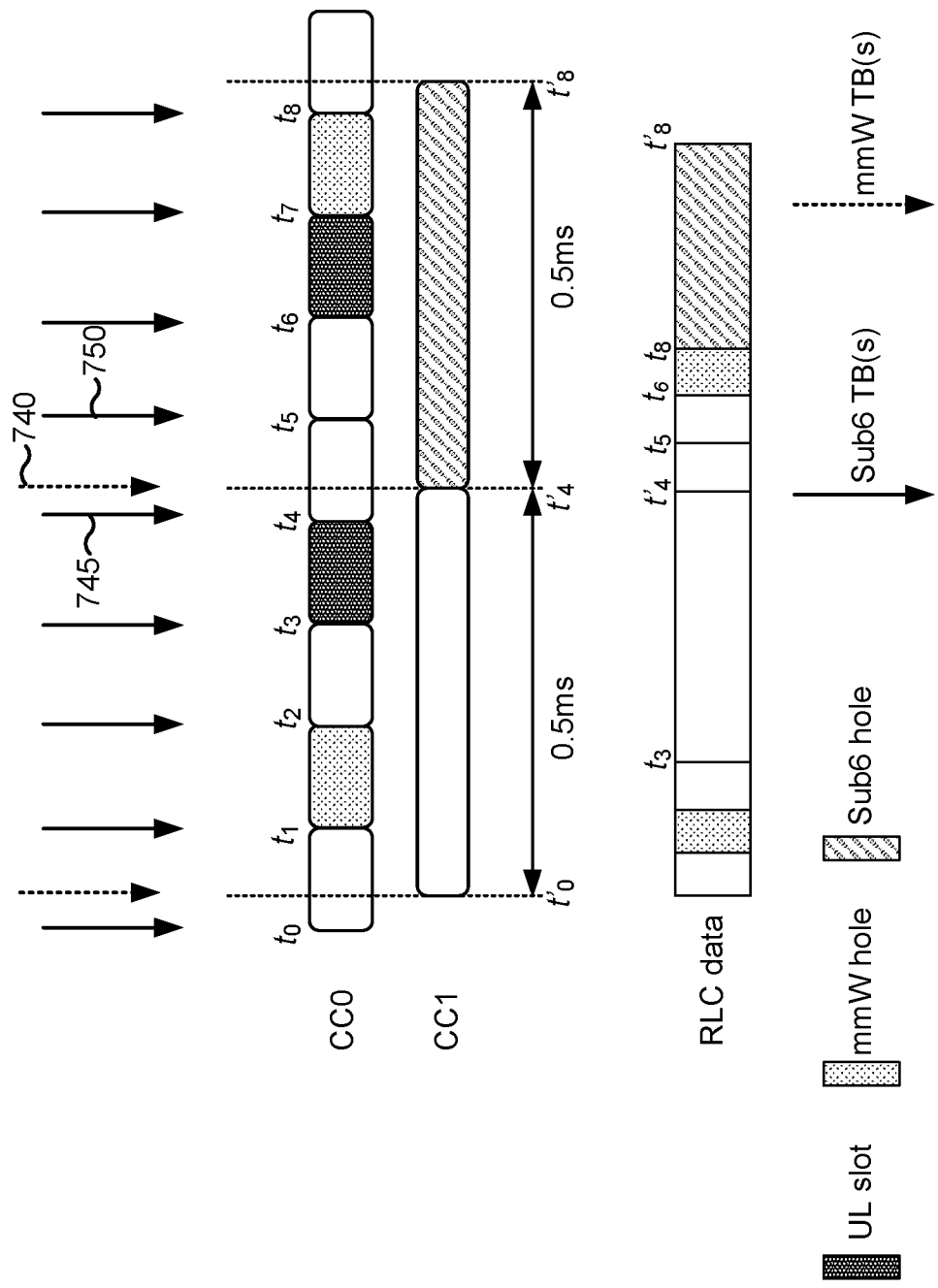
Figure 7C:
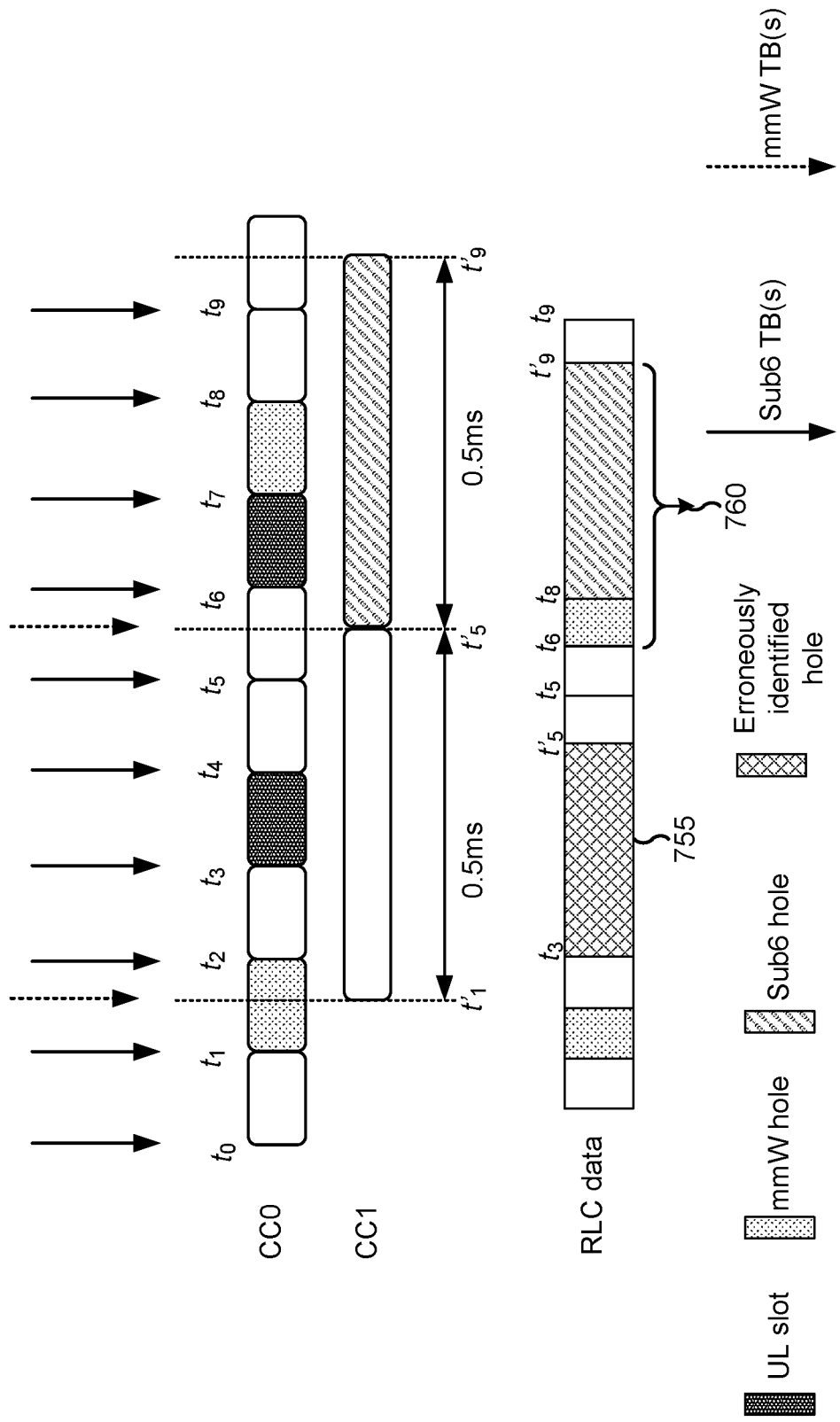

FIGS. 7A-7C are diagrams illustrating examples of identifying a numerology associated with an RLC hole based at least in part on correlating timing of CRC errors with RLC holes, in accordance with the present disclosure. While FIGS. 7A-7C are primarily described with regard to a first numerology and a second numerology, the techniques described with regard to FIGS. 7A-7C can be used to identify which configuration, of a first configuration and a second configuration, is associated with an RLC hole. The configurations are described in more detail elsewhere herein.

FIG. 7A illustrates communications on a CC0 and a CC1. Communications on CC0 are illustrated by downward solid (undashed) arrows. Communications on CC1 are illustrated by downward dashed arrows. Each communication may include a number of RLC PDUs. For example, each communication may represent one or more TBs which may be associated with a number of RLC PDUs. Thus, the UE may receive RLC PDUs. An RLC PDU may be associated with a sequence number. In some aspects, some number of the RLC PDUs may be RLC duplicates. An RLC duplicate may be caused when an RLC layer transmits a NACK for a communication that was successfully received by the UE. For example, if a shorter reassembly timer is used, the UE may determine that an RLC PDU was missed when the RLC PDU is in fact associated with a longer slot length, meaning that the RLC layer has not yet received the successfully received RLC PDU. In some aspects, the UE may receive some number of RLC duplicates. For example, the UE may receive non-duplicate RLC PDUs and duplicated RLC PDUs (i.e., RLC duplicates). The UE may identify RLC duplicates, for example, based at least in part on a sequence number of the RLC duplicate being associated with at least two received RLC PDUs (of which at least one is associated with a retransmission of an initial transmission of the RLC PDU). In some aspects, the UE 120 may adjust an RLC timer, such as a reassembly timer or a prohibit timer, based at least in part on the number of RLC duplicates, such as based at least in part on identifying a ratio of RLC duplicates to non-duplicates, a threshold number of RLC duplicates being received, or the like, as described in more detail elsewhere herein.

CC0 is associated with a higher numerology than CC1. For example, CC0 may belong to the second set of carriers of FIG. 6, and CC1 may belong to the first set of carriers of FIG. 6. In some aspects, CC0 may be associated with a 120 kHz subcarrier spacing and CC1 may be associated with a 30 kHz subcarrier spacing. In FIG. 7A, slot boundaries are aligned across component carriers. Thus, the UE 120 can perform a one-to-one mapping of RLC holes and HARQ errors. In FIG. 7A, RLC SNs in each TB are assumed to be contiguous.

Reference number 705 shows slots of CC0 and CC1. In FIG. 7A, the slots are aligned. As in FIG. 5, white fill with black dots indicates an RLC hole in CC0 (e.g., associated with the numerology and/or FR of CC0) and diagonal fill indicates an RLC hole in CC1 (e.g., associated with the numerology and/or FR of CC1). Furthermore, a black fill indicates an uplink slot of a TDD carrier. As shown, an RLC hole 710 occurs at time $t_1$ and an RLC hole 715 occurs at time $t_7$ on CC0, and an RLC hole 720 occurs at time $t_4$ on CC1. The UE 120 may have a capability to identify the RLC hole 710 after $t_3$, the RLC hole 715 after $t_8$ (e.g., after a communication subsequent to $t_8$ is received on CC0), and the RLC hole 720 after $t_8$ (e.g., after a communication subsequent to $t_8$ is received on CC0).

Reference number 725 shows RLC holes as identified by the UE 120. For example, the UE 120 may determine a set of carriers L1 that have a new HARQ transmission in a slot X. For carriers in L1, at the end of slot X, the UE 120 may identify a set of carriers L2 associated with a CRC failure. The set of carriers L2 is a set of carriers associated with an RLC hole. As shown by reference number 730, in some aspects, the UE 120 may identify a pure RLC hole, such as the pure RLC hole in slot X. A pure RLC hole is an RLC hole (or a group of RLC holes) that is associated with a single numerology. For example, the UE 120 may determine that all carriers in L2 have the same numerology, and may thus identify a pure RLC hole. For a pure RLC hole, the UE 120 may set a reassembly timer as t-reassembly=min(RRC t-reassembly, k*HARQ_RTT($\mu$)), where k is an integer indicating a maximum number of HARQ retransmissions, such that RLC recovery is delayed to allow for HARQ recovery.

As shown by reference number 735, in some aspects, the UE 120 may identify a mixed RLC hole. A mixed RLC hole occurs when two RLC holes at least partially overlap each other and are associated with different configurations (e.g., different numerologies). For example, the UE 120 may identify a mixed RLC hole when carriers of L2 have different configurations. The UE 120 may set the reassembly timer as t-reassembly=min(RRC t-reassembly, k*max(HARQ_RTT($\mu$))), where $\mu$ denotes the set of numerologies of carriers in L2.

In some aspects, RLC SNs in a TB may be out of order. For example, out-of-order SNs in an FR1 TB (such as the TB shown by reference number 740 of FIG. 7B) may result in SN discontinuity across TBs of FR2 (such as the TBs shown by reference numbers 745 and 750), and may or may not result in discontinuity within a TB of FR2. If an RLC hole is detected without a HARQ error, then the UE 120 may determine that the RLC hole is due to out-of-order SN(s). If the UE 120 detects an RLC hole with a corresponding HARQ error in the slot, in some aspects, the UE 120 may wait for a length of time for out-of-order SNs to arrive before identifying the numerology associated with the RLC hole.

FIGS. 7B and 7C illustrate identifying a numerology associated with an RLC hole with misaligned slot boundaries between carriers. FIG. 7B is an example where there is less than 1 slot of timing difference between CCs, and FIG. 7C is an example where there is more than 1 slot of timing difference between CCs. As shown, in FIG. 7B, CC1's slot boundaries are later than CC0's slot boundaries by less than the length of a slot on CC0. Thus, the starting boundary of slot 0 on CC1 is at $t_0'$, while the starting boundary of slot 0 on CC0 is at $t_0$. In FIG. 7C, CC1's slot boundaries are later than CC0's slot boundaries by more than the length of a slot on CC0. Thus, the starting boundary of slot 0 on CC1 is at $t_1'$, while the starting boundary of slot 0 on CC0 is at to. The unaligned slot boundaries may cause out-of-order SN reception, which may lead to a false detection of an FR1 hole. For example, as shown by reference number 755 of FIG. 7C, the UE 120 may not receive SNs of the slot on CC1 ending at $t_5'$ until after the end of the slot on CC0 ending at $t_5$, leading to false detection of an RLC hole on CC1. Furthermore, as shown by reference number 760, the UE 120 may detect a mixed hole on CC0 and CC1 due to out-of-order SNs of CC1 being received more than one slot after SNs on CC0.

In some aspects, the UE 120 may wait for a time offset $\delta$ before identifying a numerology associated with a detected RLC hole. By waiting for the time offset, the UE 120 may allow out-of-order SNs to be received before attempting to identify the numerology, which reduces the occurrence of false RLC hole detection, thereby improving RLC recovery for FR2 carriers. Furthermore, by using the time offset, performance with misaligned slot boundaries may be approximately equivalent to performance with aligned slot boundaries.

As indicated above, FIGS. 7A-7C are provided as examples. Other examples may differ from what is described with regard to FIGS. 7A-7C.

Figure 8:
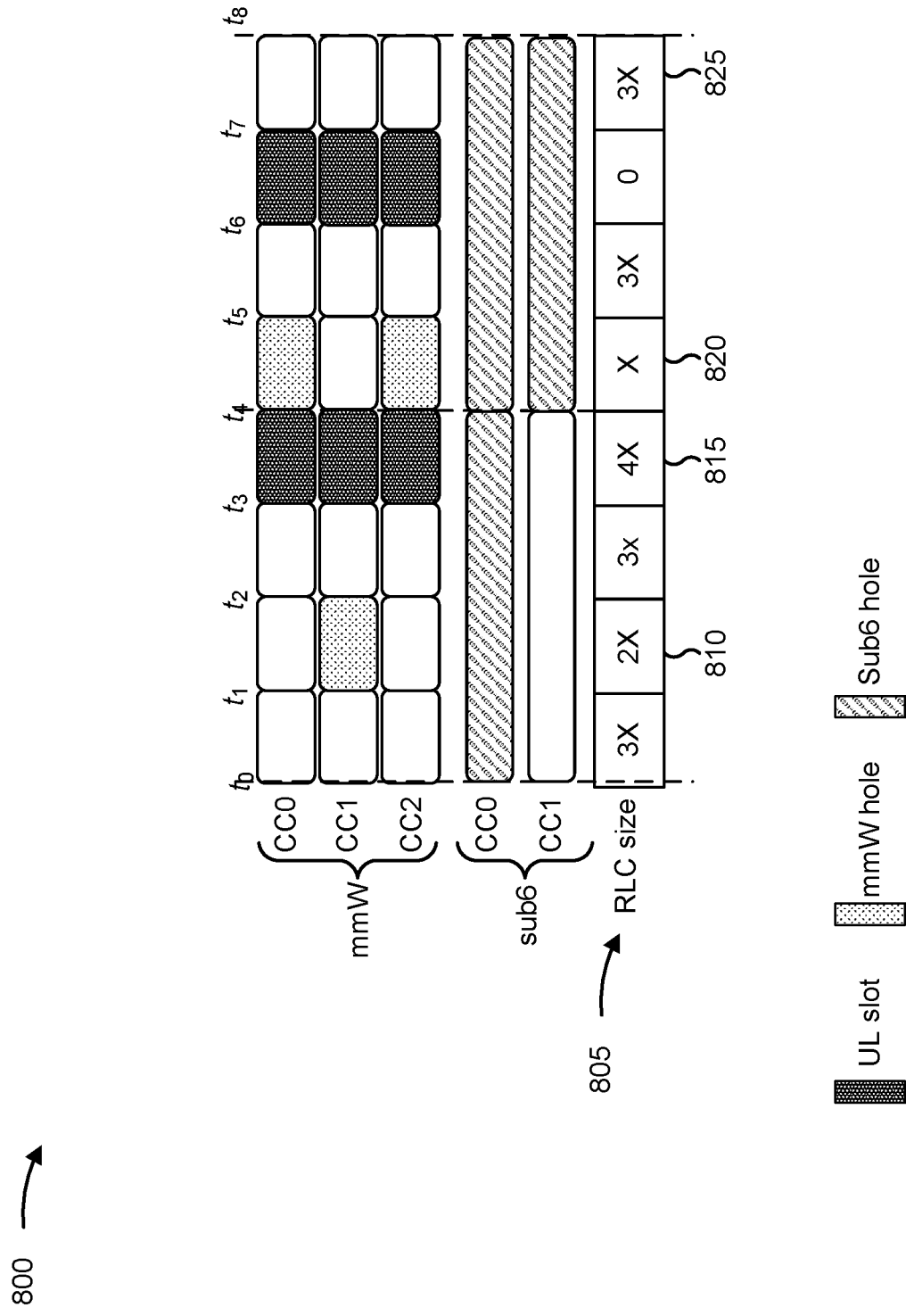
FIG. 8 is a diagram illustrating an example of identifying a numerology associated with an RLC hole based at least in part on correlating a transport block size with an RLC hole, in accordance with the present disclosure.

FIG. 8 is a diagram illustrating an example 800 of identifying a numerology associated with an RLC hole based at least in part on correlating a TB size with an RLC hole, in accordance with the present disclosure. FIG. 8 illustrates communications on a CC0, a CC1, and a CC2 of a mmW numerology (e.g., FR2), and a CC3 and a CC4 of a sub6 numerology (e.g., FR1). The mmW numerology is higher than the sub6 numerology. For example, CC0, CC1, and CC2 may belong to the second set of carriers of FIG. 6, and CC3 and CC4 may belong to the first set of carriers of FIG. 6. In some aspects, CC0 may be associated with a 30 kHz subcarrier spacing and CC1 may be associated with a 120 kHz subcarrier spacing. In example 800, slot boundaries are aligned across component carriers. While FIG. 8 is primarily described with regard to a first numerology and a second numerology, the techniques described with regard to FIG. 8 can be used to identify which configuration, of a first configuration and a second configuration, is associated with an RLC hole. The configurations are described in more detail elsewhere herein.

Let X and Y be an estimated TB size for the mmW numerology and the sub6 numerology, respectively. In a case where the same bandwidth and modulation and coding scheme (MCS) for each CC (for simplicity of illustration), and assuming a 30 kHz subcarrier spacing for the sub6 numerology and a 120 kHz subcarrier spacing for the mmW numerology, then Y is approximately equal to 4×. For simplicity, in example 800, the estimated TB size of a TB is equal to the sum of all RLC PDUs in the TB. In some aspects, the UE 120 may allow for an ambiguity margin of some number of bytes in case the estimated TB size of the TB is not exactly equal to the sum of all RLC PDUs in the TB.

Reference number 805 illustrates the estimated TB size as received at the RLC layer in each time interval corresponding to a slot on one of the CCs. For example, "3×," at time $t_0-t_1$, indicates that three TBs of size X were received in the first slot.

The UE 120 may identify RLC holes in the time intervals 810, 815, 820, and 825. In the time interval 810, the UE 120 identifies an estimated TB size of 2× since an RLC hole occurred on CC1. The time interval 810 does not take into account the data of CC1 because the reception of the data of CC4 is not complete until $t_4$. Based at least in part on the estimated TB size of 2×, the UE 120 may determine that the RLC hole is associated with the mmW numerology, and may determine an appropriate reassembly timer accordingly. Similarly, at the time interval 815, the UE 120 identifies an estimated TB size of 4× since an RLC hole occurred on CC3, and each of CC0, CC1, and CC2 have uplink slots ending at $t_4$. Thus, the UE 120 may determine that the RLC hole is associated with the sub6 numerology, and may determine an appropriate reassembly timer accordingly. Similarly, at the time interval 820, the UE 120 identifies an estimated TB size of X since RLC holes occurred on CC0 and CC2. Thus, the UE 120 may determine that the RLC hole is associated with the mmW numerology, and may determine an appropriate reassembly timer accordingly. Similarly, at the time interval 820, the UE 120 identifies an estimated TB size of 3× since RLC holes occurred on CC3 and CC4. Thus, the UE 120 may determine that the RLC holes are associated with the sub6 numerology, and may determine an appropriate reassembly timer accordingly. The UE 120 may perform such determinations based at least in part on an estimated or configured TB size per CC, a set of CCs with ongoing downlink scheduling, a downlink/uplink TDD pattern for each CC (which defines whether each slot or symbol is for downlink or uplink communication), and relative slot timing of the CCs.

As indicated above, FIG. 8 is provided as an example. Other examples may differ from what is described with regard to FIG. 8.

Figure 9:
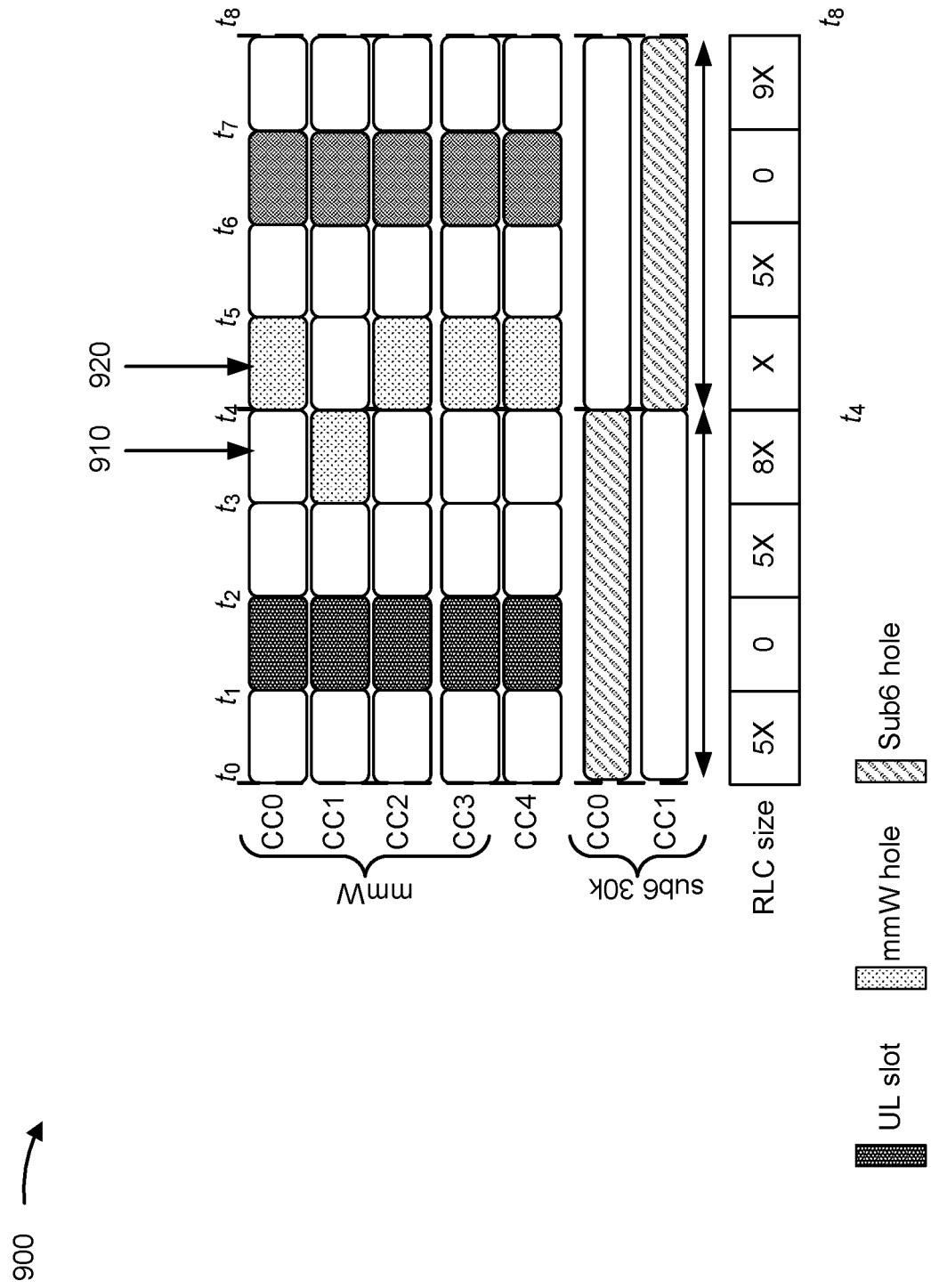
FIG. 9 is a diagram illustrating an example of ambiguity associated with an RLC hole.

FIG. 9 is a diagram illustrating an example 900 of ambiguity associated with an RLC hole.

In some cases, ambiguity may occur with regard to whether an RLC hole is associated with a first numerology or a second numerology. For example, when the sum of the number of TBs associated with a first numerology is approximately equal to the sum of the number of TBs associated with a second numerology, confusion may arise. As an example, example 900 includes five CCs associated with the mmW numerology and two CCs associated with the sub6 numerology. As shown by reference number 910, a mixed RLC hole involving an RLC hole on one of the five CCs and an RLC hole on one of the two CCs may overlap in time. In this case, the UE 120 may have difficulty identifying that there is one RLC hole associated with each numerology. For example, the TB size of 8× in this situation could correspond to all of the five CCs having an RLC hole and none of the two CCs having an RLC hole, or to one of the five CCs having an RLC hole and one of the two CCs having an RLC hole, which may lead to an inappropriate reassembly timer being used. As another example, shown by reference number 920, a pure RLC hole on one of the two CCs can be mistaken for a mixed hole occurring on four of the five mmW CCs. For example, the TB size of 8× in this situation could correspond to four of the five CCs having an RLC hole and neither of the two CCs having an RLC hole. In this situation, in some aspects, the UE 120 may use the techniques described with regard to FIGS. 7A-7C to resolve the ambiguity.

As indicated above, FIG. 9 is provided as an example. Other examples may differ from what is described with regard to FIG. 9.

Figure 10:
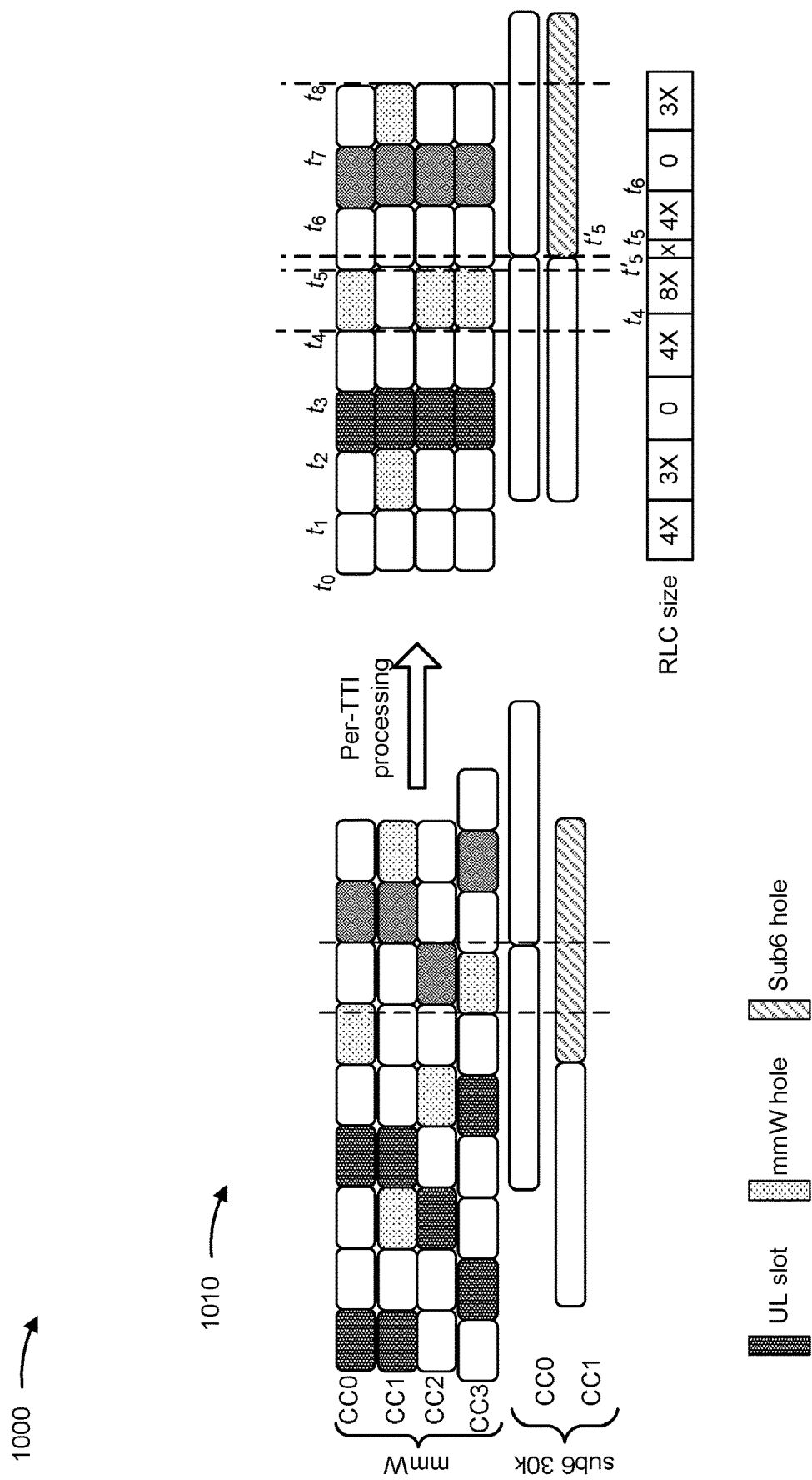
FIG. 10 is a diagram illustrating an example of identifying a numerology associated with an RLC hole based at least in part on correlating a transport block size with an RLC hole with a timing mismatch, in accordance with the present disclosure.

FIG. 10 is a diagram illustrating an example 1000 of identifying a numerology associated with an RLC hole based at least in part on correlating a transport block size with an RLC hole with a timing mismatch, in accordance with the present disclosure. While FIG. 10 is primarily described with regard to a first numerology and a second numerology, the techniques described with regard to FIG. 10 can be used to identify which configuration, of a first configuration and a second configuration, is associated with an RLC hole. The configurations are described in more detail elsewhere herein.

In some aspects, slot boundaries of CCs may be misaligned. For example, as shown by reference number 1010, slot boundaries may be misaligned between CCs of a first numerology and between CCs of a second numerology. In this example, CC3 of the mmW FR is ahead of other CCs of the mmW FR, and CC0 of the sub6 FR is ahead of CC0 of the sub6 FR. The UE 120 may perform per-transmission time interval (per-TTI) processing to align CCs of a given numerology. For example, as shown, the UE 120 align each of the CCs of the mmW FR with each other, and may align each of the CCs of the sub6 FR with each other. In this case, CCs of different numerologies can still be misaligned with each other, which may lead to misidentification of an RLC hole. For example, the UE may identify an RLC hole between $t_4$ and $t_5$ associated with the two CCs of the sub6 FR. In some aspects, the UE 120 may wait for a time offset δ before identifying a numerology associated with a detected RLC hole using the techniques of FIG. 10. For example, δ may be at least as long as the misalignment between the sub6 FR's CCs and the mmW FR's CCs (in this example, at least $t_5'-t_5$). By waiting for the time offset, the UE 120 may allow out-of-order SNs to be received and reordered (e.g., within a numerology) before attempting to identify the numerology, which reduces the occurrence of false RLC hole detection, thereby improving RLC recovery for FR2 carriers. Here, the UE 120 may identify the RLC size of 8× after $t_5'$, and may identify the RLC size of X after $t_5$. Thus, the UE may determine that there is no RLC hole in the sub6 FR's CCs and that there are three RLC holes in the mmw FR's CCs. Furthermore, by using the time offset, performance with misaligned slot boundaries may be approximately equivalent to performance with aligned slot boundaries.

As indicated above, FIG. 10 is provided as an example. Other examples may differ from what is described with regard to FIG. 10.

Figure 11:
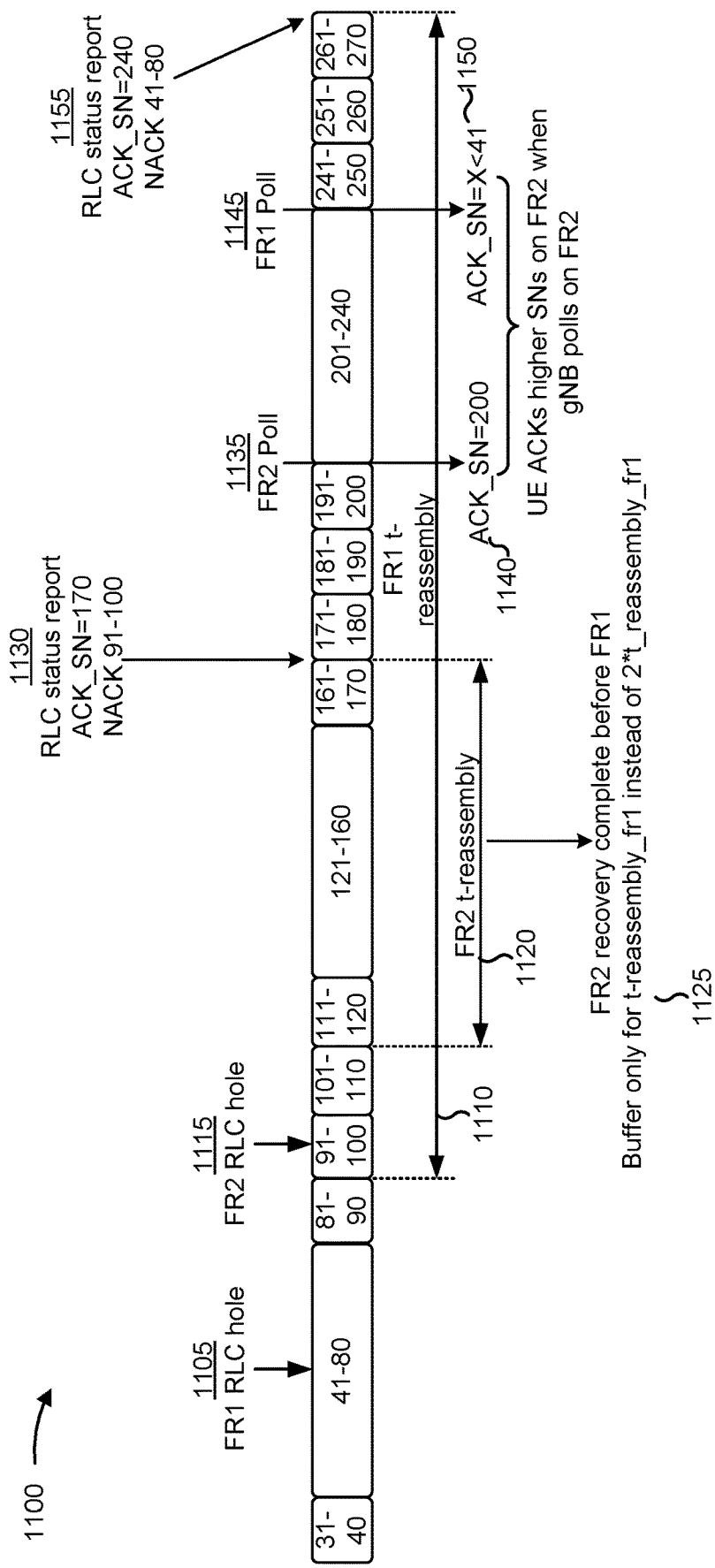
FIG. 11 is a diagram illustrating an example of independent RLC status reporting regarding a first numerology and a second numerology using reassembly timers running in parallel, in accordance with the present disclosure.

FIG. 11 is a diagram illustrating an example 1100 of independent RLC status reporting regarding a first numerology and a second numerology using reassembly timers running in parallel, in accordance with the present disclosure. Example 1100 shows data received by a UE 120 on a first carrier, associated with a first numerology, and a second carrier associated with a second numerology. For example, the first carrier may have a numerology associated with a subcarrier spacing of 30 kHz and the second carrier may have a numerology associated with a subcarrier spacing of 120 kHz. RLC SNs of TBs received in each slot are shown as numbers included in each block. For example, in a first slot of the second carrier, the UE may receive RLC SNs 31-40. In a first slot of the first carrier (if an RLC hole 1105 did not occur), the UE may receive RLC SNs 41-80. Example 1100 illustrates how a UE 120 and a BS 110 can maintain per-numerology RLC reassembly timers and RLC status reporting. While FIG. 11 is primarily described with regard to a first numerology and a second numerology, the techniques described with regard to FIG. 11 can be applied for multiple configurations, which are described in more detail elsewhere herein. Example 1100 shows how a UE 120 can run, in parallel, the t-reassembly timer per numerology (e.g., per configuration) and can perform independent status reporting for each numerology. The techniques described with regard to example 1100 may involve minimal modification to a wireless communication specification.

As shown, the UE 120 may identify an RLC hole 1105 associated with an FR1 numerology. The UE 120 may determine that the RLC hole 1105 is associated with the FR1 numerology using one or more of the techniques described with regard to FIGS. 7-10. As shown, the RLC hole 1105 may impact RLC SNs 41-80. Accordingly, the UE 120 may start a reassembly timer 1110 after detecting the RLC hole 1105 (e.g., after a subsequent slot including RLC SNs 81-90). The reassembly timer 1110 may be associated with the FR1 numerology. For example, the reassembly timer 1110 may have a length associated with the FR1 numerology.

As further shown, the UE 120 may identify an RLC hole 1115 associated with an FR2 numerology. The UE 120 may determine that the RLC hole 1115 is associated with the FR2 numerology using one or more of the techniques described with regard to FIGS. 7-10. As shown, the RLC hole 1115 may impact RLC SNs 91-100. Accordingly, the UE 120 may start a reassembly timer 1120 after detecting the RLC hole 1115 (e.g., after a subsequent slot including RLC SNs 101-110). The reassembly timer 1120 may be associated with the FR2 numerology. For example, the reassembly timer 1120 may have a length associated with the FR2 numerology. Furthermore, the UE 120 may start the reassembly timer 1120 before the reassembly timer 1110 has elapsed, which reduces FR2 recovery time relative to running the reassembly timer 1110 and then the reassembly timer 1120 in sequence. As shown by reference number 1125, the reassembly timer 1120 may elapse before the reassembly timer 1110, such that FR2 recovery can be completed before FR1 recovery. Thus, the UE 120 may buffer only for the length of the longer reassembly timer (e.g., the reassembly timer 1110 associated with the FR1 numerology) rather than the combined length of the reassembly timers.

As shown by reference number 1130, the UE 120 may transmit an RLC status report based at least in part on the reassembly timer 1120 expiring. The RLC status report may indicate an ACK for a most recently received SN (e.g., SN number 170), and may indicate a NACK for the FR2 RLC hole (e.g., based at least in part on the reassembly timer 1120 being associated with the FR2 numerology). Notably, the RLC status report is transmitted before the reassembly timer 1110 has elapsed, thereby expediting the recovery of the RLC hole 1115. Thus, the worst case PDCP buffer requirement is max(t-reassembly for all μ)*total_DL_Tput.

As shown by reference number 1135, the UE 120 may receive an RLC poll associated with the FR2 numerology.

As shown by reference number 1140, the UE 120 may transmit an RLC status report indicating an ACK up to a most recently received RLC SN (e.g., RLC SN 200) irrespective of the state of the reassembly timer 1110. For example, the UE 120 may acknowledge higher RLC SNs on FR1 than a highest RLC SN before a NACK on FR1 (associated with the RLC hole 1105). As shown by reference number 1145, the UE 120 may receive an RLC poll associated with the FR1 numerology. As shown by reference number 1150, the UE 120 may transmit an RLC status report indicating an ACK up to a most recent RLC hole (e.g., the RLC hole 1115) (e.g., indicating an RLC SN less than 41, corresponding to whatever RLC SN was most recently received on the FR1 numerology).

As shown by reference number 1155, upon expiration of the reassembly timer 1110, the UE 120 may transmit an RLC status report associated with the FR1 numerology (since the reassembly timer 1110 is associated with the FR1 numerology). As further shown, the RLC status report may indicate an ACK for a most recently received FR1 RLC SN (e.g., RLC SN number 240) and a NACK for the RLC hole 1105.

In some aspects, the UE 120 (or an RLC receiver) may mistake an RLC hole associated with RLC SN X in FR2 for an RLC hole in FR1. The buffer of the FR1 transmit window may grow undesirably until the reassembly timer expires, since the FR1 status for each FR1 poll PDU may have an acknowledged SN that is lower than X. It may be likely that the BS 110 (or an RLC transmitter) transmits a poll PDU on FR2 before the RLC hole in FR2 is filled by sending NACK in FR1 status when FR1 t-reassembly expires, since the reassembly timer for FR1 is longer than for FR2. Therefore, since no NACK is transmitted for the RLC hole in FR2 (since the UE 120 has mistaken this RLC hole as being associated with FR1), the BS 110 may discard data associated with the RLC hole. To avoid this data discard, the UE 120 may transmit a NACK for the RLC hole irrespective of whether a poll PDU is associated with FR1 or FR2. For example, the UE 120 may transmit a NACK for an RLC hole associated with any numerology, irrespective of the numerology associated with a poll PDU or a reassembly timer that triggers the NACK. The above technique is also applicable for an RLC hole in FR1 being mistaken for an RLC hole in FR2.

As indicated above, FIG. 11 is provided as an example. Other examples may differ from what is described with regard to FIG. 11.

Figure 12:
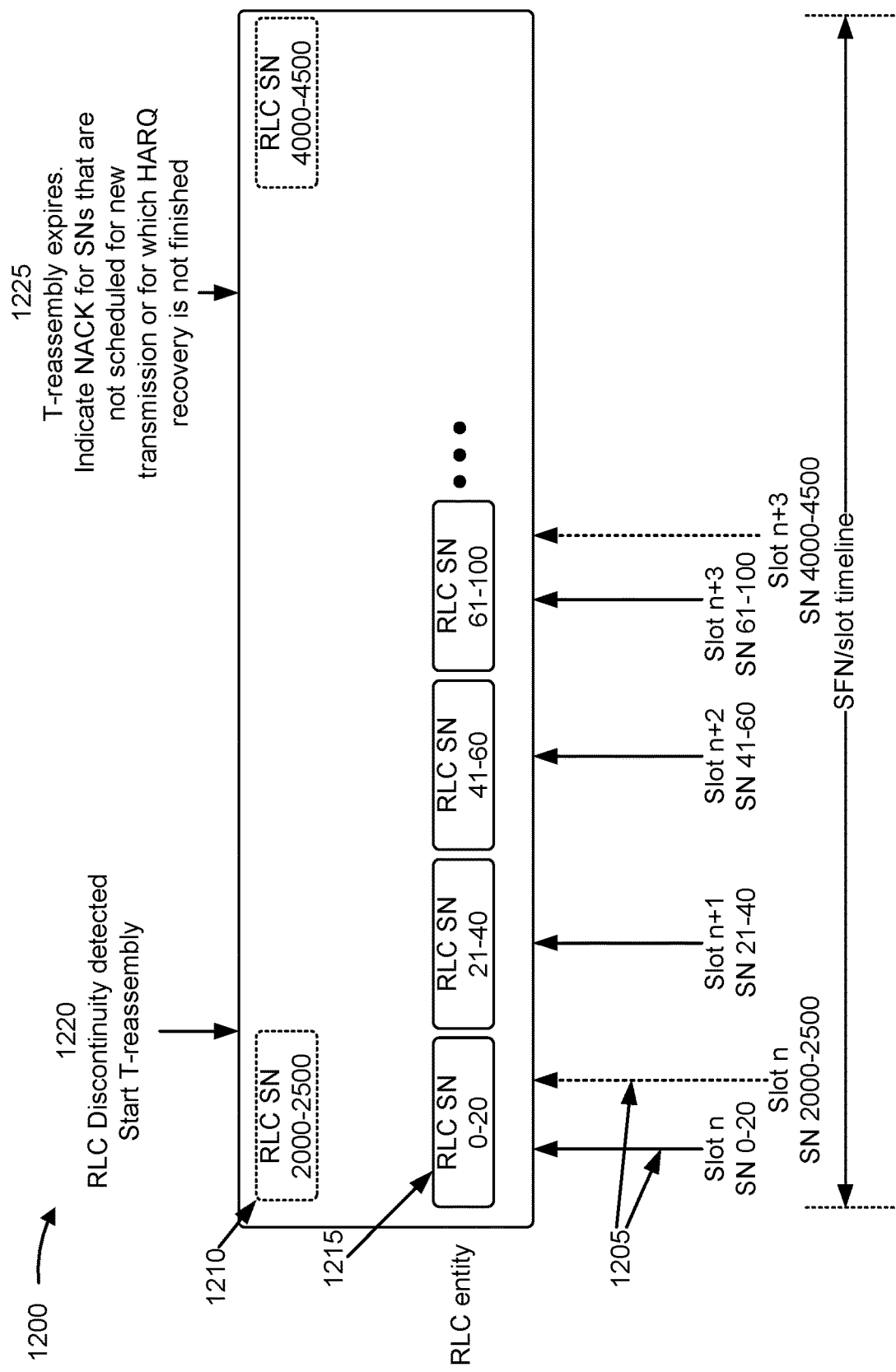
FIG. 12 is a diagram illustrating an example of RLC hole detection for a leading carrier and a lagging carrier.

FIG. 12 is a diagram illustrating an example 1200 of RLC hole detection for a leading carrier and a lagging carrier. Example 1200 illustrates an RLC entity receiving traffic associated with a first carrier and a second carrier. RLC SNs received in a given slot are denoted by an upward arrow indicating the number of the slot (e.g., slot n, slot n+1, and so on), and the RLC SNs received in that slot. Solid upward arrows indicate communications received via a first carrier and dashed upward arrows indicate communications received via a second carrier. The first carrier may be associated with a first set of parameters (e.g., a first configuration) and the second carrier may be associated with a second set of parameters (e.g., a second configuration). For example, the first set of parameters and the second set of parameters may indicate at least one of a HARQ parameter (e.g., a HARQ round trip time, a HARQ recovery delay), a duplexing configuration (e.g., TDD or FDD), a scheduling delay, a numerology, a bandwidth, a frequency range, an uplink/downlink slot allocation (e.g., a TDD downlink/ uplink slot configuration, a slot format indication), or a combination thereof. A rectangle within the rectangle indicating the RLC entity indicates traffic associated with a slot as received by the RLC entity. It should be noted that the traffic received by the RLC entity is not shown in order with regard to time. For example, the RLC entity may receive RLC SNs 2000-2500 at substantially the same time as receiving RLC SNs 0-20, or prior to receiving RLC SNs 21-40.

As shown by reference number 1205, in a slot n, the RLC entity may receive RLC SNs 0-20 on the first carrier and SNs 2000-2500 on the second carrier. As further shown, on the first carrier, the RLC entity may receive SNs 21-40 in slot n+1, SNs 41-60 in slot n+2, and SNs 61-100 in slot n+1. For example, the first carrier and the second carrier may be associated with different sets of parameters such that the RLC entity receives a larger number of RLC PDUs on the second carrier in a given slot. As another example, the second carrier may be configured such that TBSs are received less frequently on the second carrier. Thus, the first carrier may take multiple transmission time intervals (TTIs) to reach the RLC SN of the second carrier. For example, it can be seen that the first carrier may require a large number of slots to transmit enough RLC PDUs for the RLC SNs of the first carrier (e.g., 0-20, 21-40, and so on) to reach the RLC SNs of the second carrier transmitted in slot n (e.g., 2000-2500). Thus, the first carrier may be referred to as a lagging carrier and the second carrier may be referred to as a leading carrier. This delay in the convergence may be exacerbated by a block error rate (BLER) for hybrid automatic repeat request (HARQ) feedback or retransmissions, as well as network scheduler implementation configurations.

As described above, from the RLC entity's perspective, the UE may receive packets with RLC SNs (or PDCP SNs) spread out considerably. For example, higher range RLC SNs (such as RLC SNs 2000-2500, shown by reference number 1210) will be received from the leading carrier while lower range RLC SNs (such as RLC SNs 0-100, of which RLC SNs 0-20 are shown by reference number 1215) are filled from the lagging carrier in the same TTI. This issue can also arise for any number of carriers and an SN gap of any value that cannot be received or recovered via HARQ within a configured RLC reassembly timer. If there is residual HARQ BLER which is common in field, HARQ recovery delay can exacerbate the issue.

As shown by reference number 1220, the RLC entity may detect an RLC hole based at least in part on RLC SN 2000 being received before RLC SN 21 through 1999. Thus, the RLC entity may start a reassembly timer. Once the reassembly timer expires, as shown by reference number 1225, the RLC entity may transmit an RLC status report reporting a NACK for a subset of RLC SNs that are not scheduled for new transmission or for which HARQ recovery is unfinished. If the gap between the RLC SNs of the second carrier (starting at RLC SN 2000) and the RLC SNs of the first carrier (starting at RLC SN 0) is sufficiently large, then the subset of RLC PDUs between RLC SN 20 and RLC SN 2000 may be lost. For example, if the reassembly timer is shorter than the time required to receive or schedule RLC SNs 21-1999, then the RLC may perform automatic repeat request (ARQ) recovery for the subset of RLC SNs 21-1999 before the subset has been transmitted to the UE, thereby introducing delay in receiving the subset. A BLER in the physical channel may exacerbate the delay since the retransmission may take additional attempts.

After the UE transmits the RLC status report, the UE may receive an initial transmission of RLC PDUs corresponding to the subset of RLC SNs indicated by the RLC status report. Thus, the UE may advance an RLC receive window, since an RLC hole corresponding to the subset of RLC SNs is considered filled. However, the network may respond to the RLC status report by retransmitting the RLC PDUs corresponding to the subset of RLC SNs, which the UE may drop upon receipt, since the RLC receive window has already been advanced past the subset of RLC SNs.

This sequence of events may use uplink bandwidth due to transmission of RLC status PDUs transmitted because of the configured reassembly timer value being unable to cover the inter-CC delay in network scheduling between the first carrier and the second carrier and/or HARQ recovery delay thereafter. Furthermore, downlink throughput may be reduced as the retransmitted packets may use bandwidth that could otherwise be used for newer packets, and may consequently be dropped at UE as duplicate packets at the expense of UE power and processor usage.

Furthermore, in some cases, the RLC timers (such as reassembly timers and the like) configured by the network may be applicable to all carriers, and may generally be configured to be sufficient for RLC hole recovery on either of the first carrier or the second carrier (that is, the RLC timers may be configured conservatively, as described elsewhere herein). In this case, the leading carrier, which is receiving data at a higher rate, could have a legitimate RLC hole due to BLER, and may wait for the longer period indicated by the RLC timers before sending a NACK to the network, since the RLC timers were configured by the network conservatively in view of all carrier. This can impact the latency of the recovered packets through RLC ARQ.

As indicated above, FIG. 12 is provided as an example. Other examples may differ from what is described with regard to FIG. 12.

Figure 13:
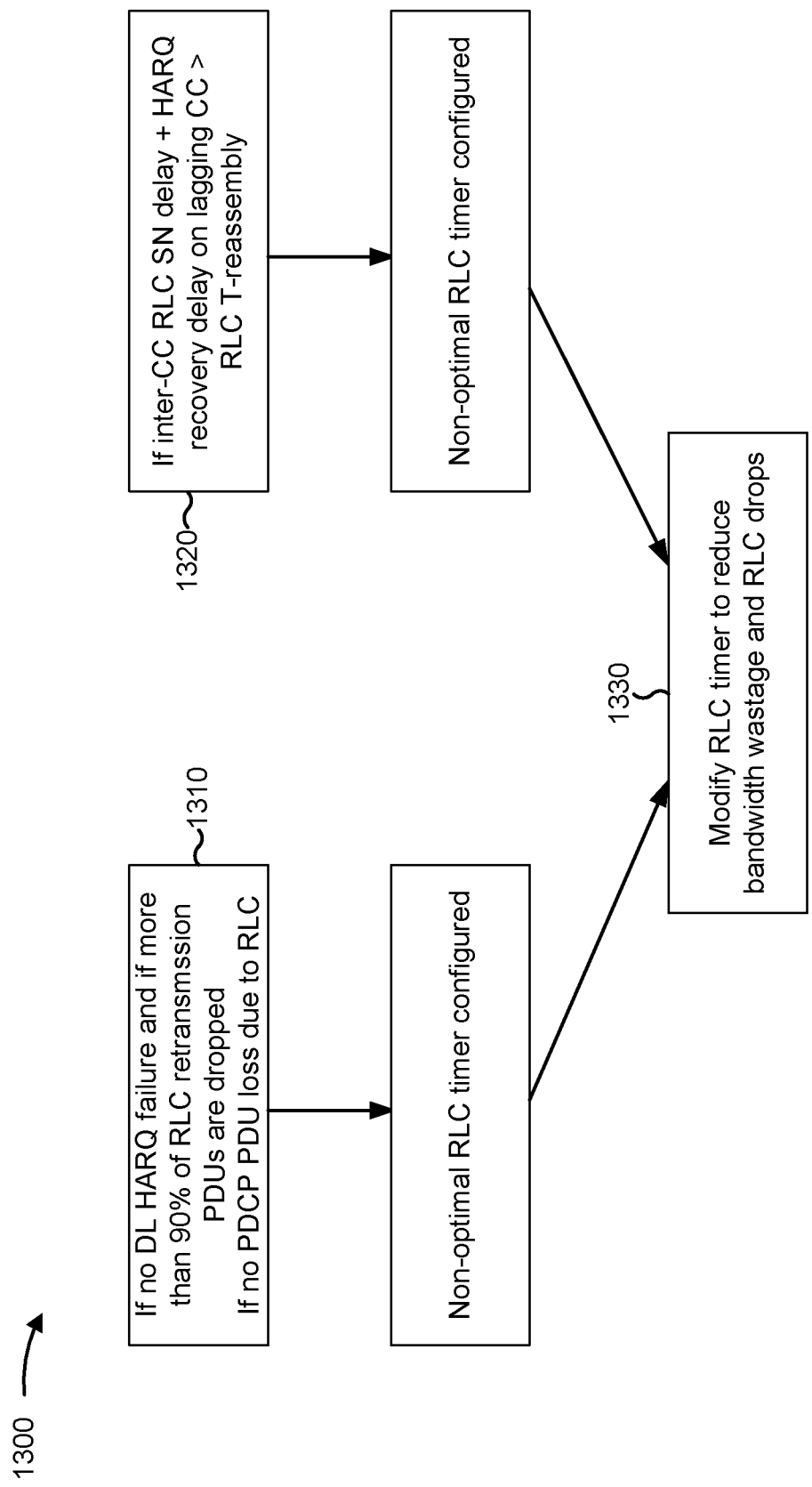
FIG. 13 is a diagram illustrating an example of RLC timer modification based at least in part on a HARQ latency, in accordance with the present disclosure.

FIG. 13 is a diagram illustrating an example 1300 of RLC timer modification based at least in part on a HARQ latency, in accordance with the present disclosure. Example 1300 illustrates a first trigger condition 1310 and a second trigger condition 1320 associated with modifying an RLC timer, such as a reassembly timer. The first trigger condition 1310 and the second trigger condition 1320 provide conditions that can be used to detect an RLC discontinuity. For example, detecting an RLC discontinuity may include determining that the first trigger condition 1310 is satisfied or that the second trigger condition 1320 is satisfied. The techniques described with regard to example 1300 may be performed by an RLC receiver, such as an RLC receiver of a UE (e.g., UE 120). The RLC receiver may be associated with multiple carriers (e.g., two or more carriers) associated with different sets of parameters, as described in more detail in connection with FIG. 12.

The RLC receiver may track information associated with the first trigger condition 1310 or the second trigger condition 1320. may track downlink HARQ failure metrics for the multiple carriers (e.g., a number of failed HARQ procedures). As another example, the RLC receiver may track PDCP PDU loss metrics. A PDCP PDU loss metric may indicate a number or ratio of PDCP PDUs considered lost (indicating that RLC layer recovery has failed). As yet another example, the RLC receiver may track a number of RLC PDUs retransmitted (indicating that a NACK was transmitted for the RLC PDUs via an RLC status report or a HARQ procedure). As still another example, the RLC receiver may track a number of RLC PDUs dropped due to being received outside of an RLC receive window or being a duplicate of a received RLC PDU.

The first trigger condition 1310 may relate to a number of downlink HARQ failures, a number of dropped retransmissions of RLC PDUs, and a rate of PDCP PDU loss. For example, if the number of downlink HARQ failures is lower than a threshold (in some examples, if there are no downlink HARQ failures), if the number of dropped retransmissions of RLC PDUs satisfies a threshold (in some examples, 90%), and if the rate of PDCP PDU loss is lower than a threshold (in some examples, if there are no PDCP PDU losses), then the RLC receiver may determine that a non-optimal RLC timer is configured. The first trigger condition 1310 may indicate that a reassembly timer (e.g., RLC timer) is not sufficiently long to take into account a difference between a leading carrier and a lagging carrier. For example, the number of downlink HARQ failures being lower than the threshold may indicate that RLC holes are unlikely to arise due to BLER in the physical layer. The number of dropped retransmissions of RLC PDUs satisfying the threshold may indicate that the RLC PDUs have already been successfully received (since an RLC status report NACK was already triggered for the RLC PDUs due to the reassembly timer), and that retransmission of the RLC PDUs was thus frivolous. The rate of PDCP PDU loss being lower than the threshold may indicate that the RLC holes associated with the lagging carrier are being successfully filled, indicating that the RLC holes are caused by the retransmission timer rather than poor channel quality.

The second trigger condition 1320 may relate to an inter-carrier RLC SN delay and a HARQ recovery delay. As used herein, a HARQ recovery delay refers to a length of time associated with HARQ recovery of a missed SN. The HARQ recovery delay may start at a first SN of a missed set of SNs, and may extend for a length of time. The HARQ recovery delay may take into account numerology of the carrier associated with the missed set of SNs, a configured number of HARQ retransmission attempts, a downlink/uplink configuration of the carrier associated with the missed set of SNs, or other factors. The inter-carrier RLC SN delay may indicate a time gap between convergence of RLC SNs of a first carrier and RLC SNs of a second carrier. For example, referring to FIG. 12, the inter-carrier RLC SN delay may indicate a delay between receiving RLC SN 2000 on the second carrier and receiving RLC SN 1999 on the first carrier. As shown, if the sum of the inter-carrier RLC SN delay and the HARQ recovery delay satisfies a threshold, then the RLC receiver may determine that a non-optimal RLC timer is configured. In some aspects, the threshold may be the length of the reassembly timer. In some other aspects, the threshold may be based at least in part on the length of the reassembly timer. In some aspects, the second trigger condition 1320 may be further based at least in part on a rate of PDCP PDU loss being lower than or equal to a threshold. In some examples, the threshold for the rate of PDCP PDU loss may be zero, such that the second trigger condition 1320 is satisfied if there is no PDCP PDU loss and if the sum of the inter-carrier RLC SN delay and the HARQ recover delay is greater than the reassembly timer.

In some aspects, the RLC receiver may determine that a non-optimal RLC timer is configured based at least in part on determining whether HARQ procedures are ongoing for one or more carriers, as described in more detail in connection with FIG. 16.

As shown by reference number 1330, the RLC receiver may adjust an RLC timer (such as a reassembly timer or a status prohibit timer) based at least in part on determining that a non-optimal RLC timer is configured (such as based at least in part on the first trigger condition 1310, the second trigger condition 1320, or determining whether HARQ procedures are ongoing for one or more carriers). For example, the RLC receiver may perform adaptive RLC timer upscaling. The RLC receiver may determine the RLC timer based at least in part on a number of RLC duplicates (e.g., such that the number of RLC duplicates or a rate of RLC duplication is lower than a threshold). Thus, the RLC receiver may improve bandwidth utilization and reduce the rate of RLC drops.

In some aspects, the RLC receiver may increase the length of the RLC timer. For example, the RLC receiver may increment the length of the RLC timer by a step size (in one example, 5 ms) until a trigger condition (such as the first trigger condition 1310 or the second trigger condition 1320) is no longer satisfied. In some aspects, the RLC receiver may increase the configured RLC reassembly timer or RLC status prohibit timer in steps of 5 ms until the rate of retransmitted RLC PDUs is minimized (e.g., below a first threshold) while maintaining the rate of PDCP PDU loss at minimum (e.g., below a second threshold).

In some aspects, the RLC receiver may determine the length of the RLC timer based at least in part on a model. In some aspects, the model may be trained using a machine learning algorithm. For example, the model may be trained with a set of parameters, and may be used to determine a suitable value for an RLC timer such that RLC holes are properly recovered without erroneously declaring an RLC hole due to a difference in RLC SN arrival time between carriers. In some aspects, the model may be trained to determine a suitable RLC timer value to recover an RLC hole in time, to avoid the dropping of RLC duplicates, to increase the bandwidth utilization, and to keep the PDCP PDU loss at minimum.

In some aspects, the set of parameters may include, for example, a length of a configured RLC timer, a length of a configured PDCP timer, an RLC retransmitted PDU count, an RLC PDU drop count, a rate of PDCP PDU loss, downlink HARQ failure information for each carrier, a downlink HARQ recovery timeline for each carrier, a downlink BLER for each carrier, a downlink throughput of each carrier, an inter-carrier RLC SN scheduling delay among carriers, or information indicating one or more carriers that are lagging carriers. In some aspects, the set of parameters may include additional parameters to those described above or alternative parameters to those described above. The model may receive, as input, the set of parameters. In some aspects, the model may output information indicating a modified length of a configured RLC timer. In some aspects, the model may output information indicating that a length of a configured RLC timer should be modified (such as in accordance with a step size. In some aspects, the model may be trained and used at the RLC receiver. In some aspects, the model may be trained externally to the RLC receiver, and may be provided to the RLC receiver for use.

As indicated above, FIG. 13 is provided as an example. Other examples may differ from what is described with regard to FIG. 13.

Figure 14:
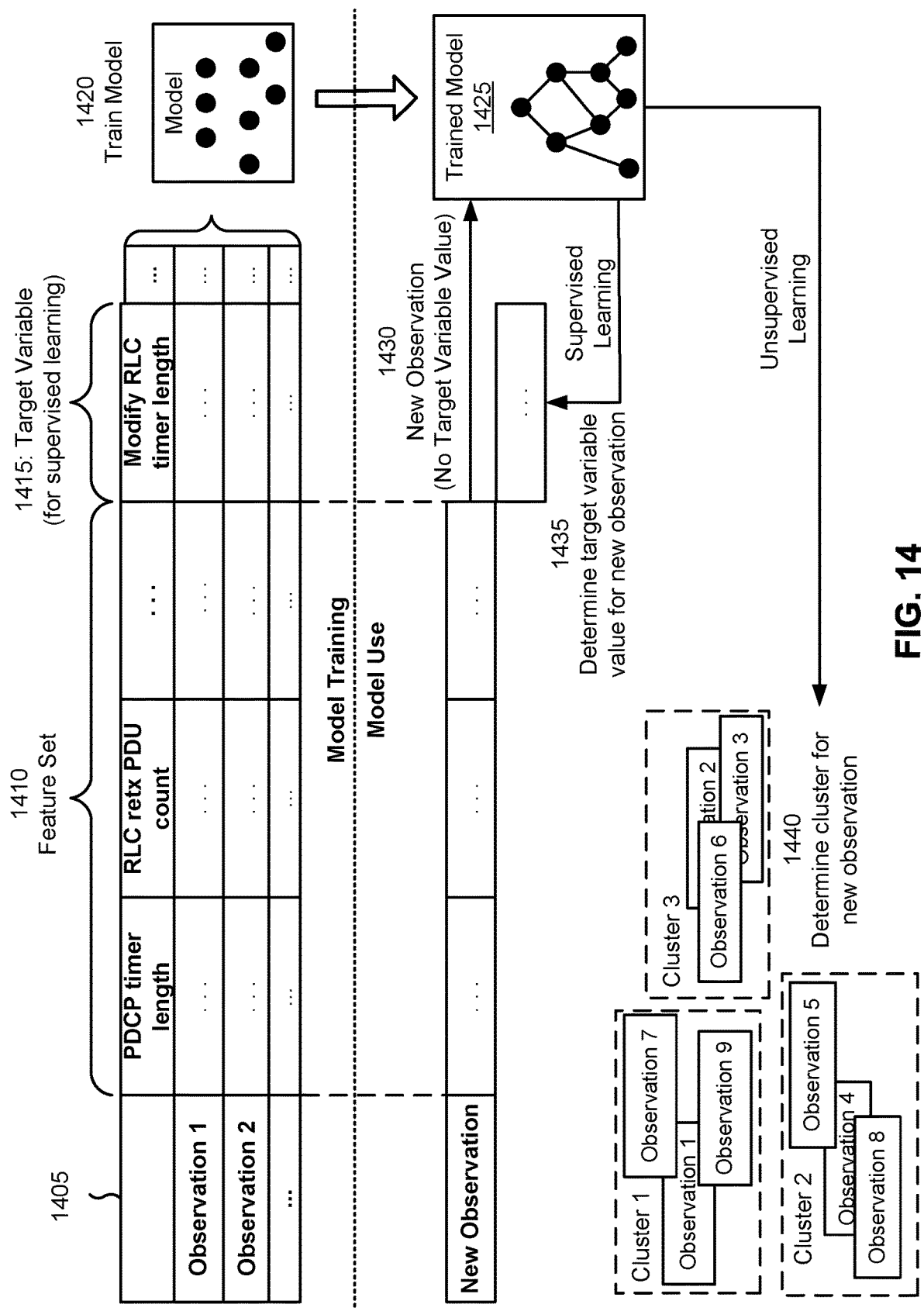
FIG. 14 is a diagram illustrating an example of training and using a machine learning model in connection with determining whether or how to modify an RLC timer length, in accordance with the present disclosure.

FIG. 14 is a diagram illustrating an example 1400 of training and using a machine learning model in connection with determining whether or how to modify an RLC timer length, in accordance with the present disclosure. The machine learning model training and usage described herein may be performed using a machine learning system. The machine learning system may include or may be included in a computing device, a server, a cloud computing environment, or the like.

As shown by reference number 1405, a machine learning model may be trained using a set of observations. The set of observations may be obtained from training data (e.g., historical data), such as data gathered during one or more processes described herein. In some implementations, the machine learning system may receive the set of observations (e.g., as input) from the computing system, as described elsewhere herein.

As shown by reference number 1410, the set of observations includes a feature set. The feature set may include a set of variables (sometimes referred to herein as parameters), and a variable may be referred to as a feature. A specific observation may include a set of variable values (or feature values) corresponding to the set of variables. In some implementations, the machine learning system may determine variables for a set of observations and/or variable values for a specific observation based on input received from computing system. For example, the machine learning system may identify a feature set (e.g., one or more features and/or feature values) by extracting the feature set from structured data, and/or by receiving input from an operator.

As an example, a feature set for a set of observations may include for example, a length of a configured RLC timer, a length of a configured PDCP timer, an RLC retransmitted PDU count, an RLC PDU drop count, a rate of PDCP PDU loss, downlink HARQ failure information for each carrier, a downlink HARQ recovery timeline for each carrier, a downlink BLER for each carrier, a downlink throughput of each carrier, an inter-carrier RLC SN scheduling delay among carriers, or information indicating one or more carriers that are lagging carriers.

As shown by reference number 1415, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 1400, the target variable is a modification of an RLC timer or an indication to modify an RLC timer.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 1420, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 1425 to be used to analyze new observations.

As shown by reference number 1430, the machine learning system may apply the trained machine learning model 1425 to a new observation, such as by receiving a new observation and inputting the new observation to the trained machine learning model 1425. The machine learning system may apply the trained machine learning model 1425 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 1425 may predict a value for the target variable, as shown by reference number 1435. Based on this prediction, the machine learning system may provide a first recommendation, may provide output for determination of a first recommendation, may perform a first automated action, and/or may cause a first automated action to be performed (e.g., by instructing another device to perform the automated action), among other examples. For example, the machine learning model may output a length of a modified RLC timer, or may output an indication to incrementally lengthen or shorten an RLC timer.

In some implementations, the trained machine learning model 1425 may classify (e.g., cluster) the new observation in a cluster, as shown by reference number 1440. The observations within a cluster may have a threshold degree of similarity. As an example, if the machine learning system classifies the new observation in a first cluster, then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

As indicated above, FIG. 14 is provided as an example. Other examples may differ from what is described in connection with FIG. 14.

Figure 15:
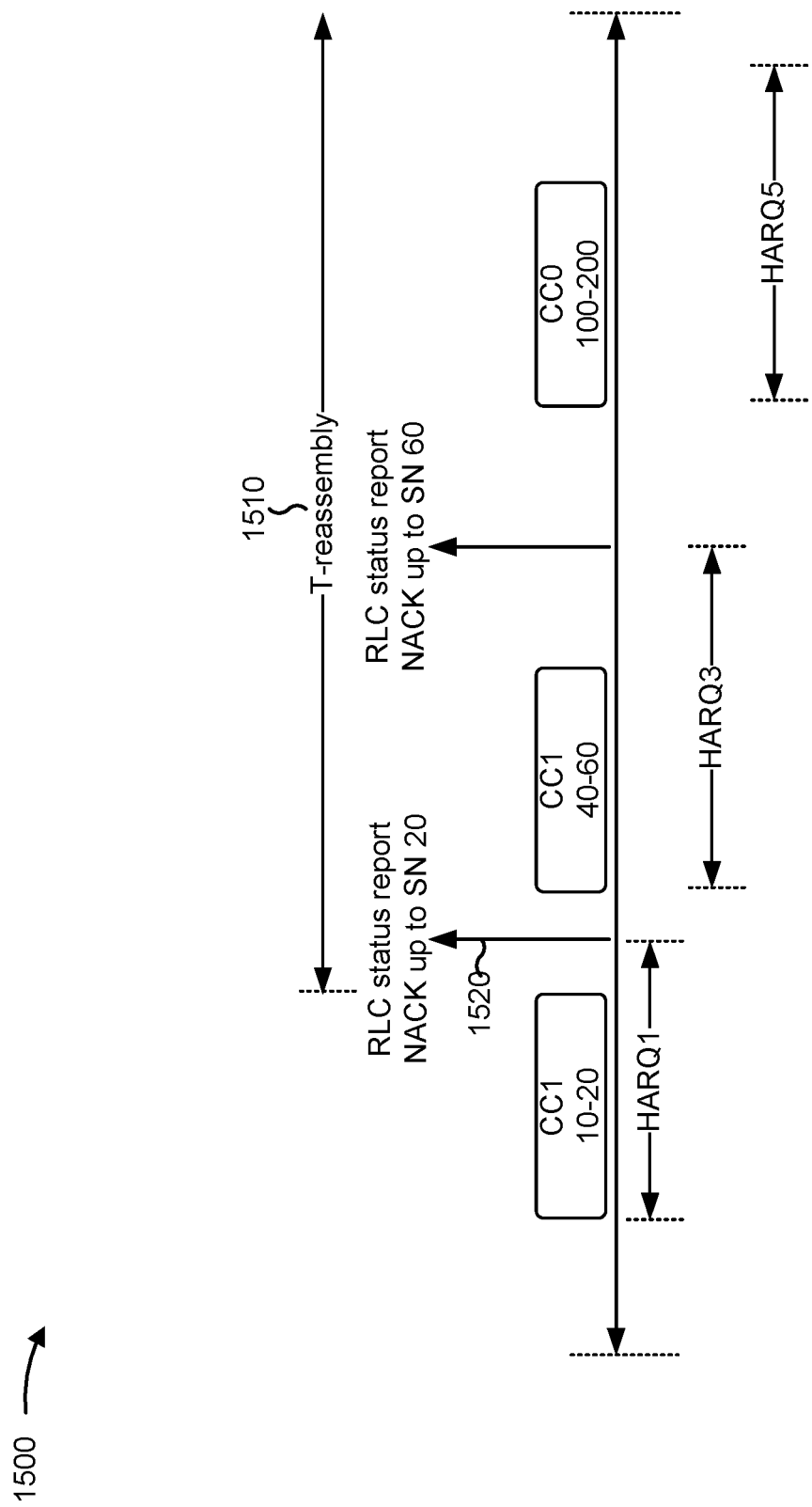
FIG. 15 is a diagram illustrating an example of RLC status reporting based at least in part on a HARQ latency associated with a carrier, in accordance with the present disclosure.

FIG. 15 is a diagram illustrating an example of RLC status reporting based at least in part on a HARQ recovery delay associated with a carrier, in accordance with the present disclosure. FIG. 15 is an example of selectively reducing a reassembly timer based at least in part of respective HARQ recovery delays associated with a set of carriers. FIG. 15 includes a carrier CC0 and a carrier CC1. A length of a configured reassembly timer is shown by reference number 1510. In FIG. 15, RLC SNs 0-9, 21-39, and 61-99 of CC1 are missed. If the RLC receiver started the configured reassembly timer after detecting that RLC SNs 1-9 were missed (that is, after successfully receiving RLC SNs 10-20), then the RLC receiver may wait until an end of the reassembly timer to transmit an RLC status report regarding each RLC hole experienced up until the RLC status report is transmitted. However, waiting for the length of the reassembly timer (which may be configured conservatively according to the parameters of CC0 and CC1) may delay the recovery of the RLC holes associated with RLC SNs 0-9, 21-39, and 61-99 of CC1.

Techniques described herein provide per-carrier determination of a reassembly timer such that delay associated with recovery of RLC holes is reduced. For example, the RLC receiver may determine a reassembly timer for a given carrier based at least in part on a HARQ recovery delay associated with the given carrier. The HARQ recovery delay may correspond to a length of time before a HARQ timeout occurs. For example, if the HARQ recovery delay for a given RLC hole has elapsed, the RLC receiver can determine that HARQ has either succeeded or failed for the given RLC hole. Examples of HARQ recovery delays are shown by "HARQ1" (corresponding to RLC SNs 0-9), "HARQ3" (corresponding to RLC SNs 21-39), and "HARQ5" (corresponding to RLC SNs 61-99). "HARQ2" (not shown) may correspond to RLC SNs 10-20, and may be moot since RLC SNs 10-20 were successfully received. "HARQ4" (not shown) may correspond to RLC SNs 40-60, and may be moot since RLC SNs 40-60 were successfully received.

The RLC receiver may use a reassembly timer that is based at least in part on the HARQ recovery delay associated with a given carrier. In some aspects, the reassembly timer may be equal to an average HARQ recovery delay associated with a given carrier. In some aspects, the reassembly timer may be configured such that the RLC status report for an RLC hole is transmitted at an end of a HARQ recovery delay associated with a given carrier on which the RLC hole is observed. In some aspects, the RLC receiver may identify the given carrier on which the RLC hole is observed by querying (e.g., querying the physical layer) whether a HARQ procedure is ongoing on the given carrier. In some aspects, the RLC receiver may identify the given carrier on which the RLC hole is observed using techniques described elsewhere herein, such as in connection with FIGS. 7A-10.

As shown by reference number 1520, the RLC receiver may transmit a first RLC status report in accordance with a modified reassembly timer. For example, the RLC receiver may transmit the first RLC status report after HARQ1 (corresponding to the RLC hole for RLC SNs 0-9) has elapsed. As shown, the first RLC status report may indicate a NACK up to RLC SN 20, meaning that the first RLC status report may indicate that a most recent successfully received RLC SN is RLC SN 20 and that RLC SNs 0-9 were not successfully received. As shown by reference number 1530, the RLC receiver may transmit a second RLC status report in accordance with the modified reassembly timer. For example, the RLC receiver may transmit the second RLC status report after HARQ3 (corresponding to the RLC hole for RLC SNs 21-39) has elapsed. As shown, the second RLC status report may indicate a NACK up to RLC SN 60, meaning that the first RLC status report may indicate that a most recent successfully received RLC SN is RLC SN 60 and that RLC SNs 21-39 (that is, missed RLC SNs after a most recently acknowledged RLC SN) were not successfully received. After HARQ5 has elapsed, the UE 120 may update the status report to include NACKs for any unreceived RLC SNs, and an ACK for RLC SNs 100-200.

As indicated above, FIG. 15 is provided as an example. Other examples may differ from what is described with regard to FIG. 15.

Figure 16:
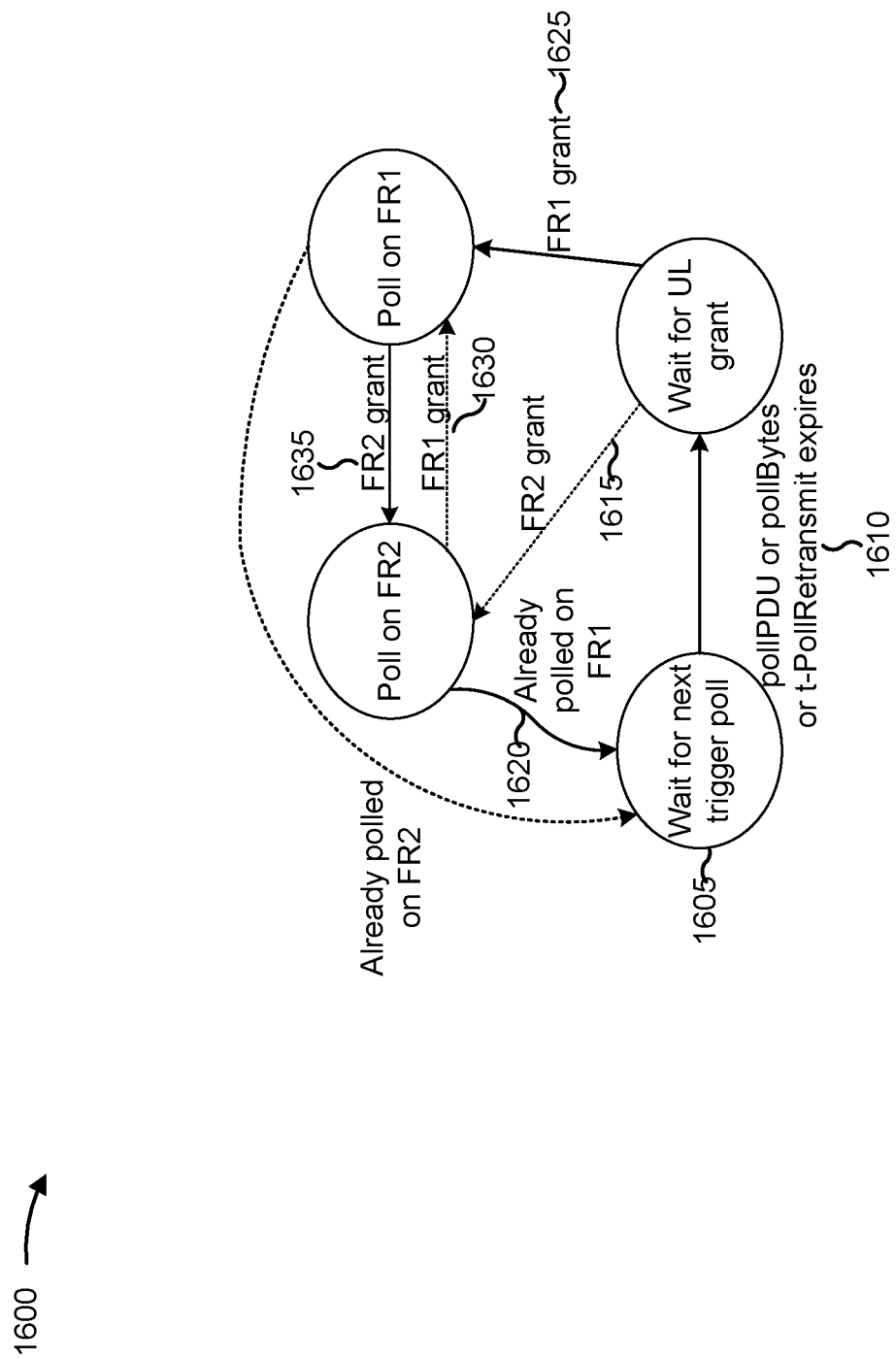
FIG. 16 is a diagram illustrating an example of transmitting a transport block with a poll bit on two or more numerologies, in accordance with the present disclosure.

FIG. 16 is a diagram illustrating an example 1600 of transmitting a transport block with a poll bit on two or more numerologies, in accordance with the present disclosure. Example 1600 illustrates a state diagram for selecting an uplink path. Example 1600 relates to a case where the UE 120 is an RLC transmitter and the BS 110 is an RLC receiver on the uplink. While FIG. 16 is primarily described with regard to a first numerology and a second numerology, the techniques described with regard to FIG. 16 can be applied for multiple configurations, which are described in more detail elsewhere herein. Example 1600 describes how to retransmit a communication, such as a transport block with a poll bit, on multiple numerologies. For example, when a poll request is triggered by a higher layer of the UE 120 (such as an RLC layer), the UE 120 may replicate the poll request on an uplink transport block of each active numerology. Thus, the UE 120 may improve the likelihood of the base station successfully receiving the poll request.

In some scenarios, an RLC retransmission (e.g., a PDU, a transport block) on a given uplink grant may fail. More generally, a communication on the given uplink grant may fail. The communication may be associated with a numerology referred to as a preferred numerology. A preferred numerology is a numerology in which an communication was originally to be performed. A preferred carrier is a carrier associated with the preferred numerology on which the communication was originally to be performed. In some cases, the UE 120 may prefer to retransmit the communication using the preferred numerology. In some aspects, the UE 120 may select a numerology as the preferred numerology, for example, based at least in part on the numerology having a lower block error rate than another numerology, a lower latency than another numerology, or the like.

Failure of an RLC retransmission may lead to downlink throughput loss. Waiting for a next uplink grant associated with the same numerology as the failed communication (e.g., the preferred numerology for the RLC retransmission) to perform retransmission may increase latency associated with the retransmission. In particular, if the BS 110 stops granting on CCs associated with the preferred numerology for a length of time, the latency may be indefinite. In some aspects, the UE 120 may allow a maximum delay of t after a retransmission is prepared, to wait for a grant on the preferred numerology associated with the retransmission. If the UE 120 does not receive the grant on the preferred numerology associated with the retransmission within t, then the UE 120 may transmit the retransmission on a next available uplink grant irrespective of numerology. This may be particularly beneficial when the FR2 block error rate is not worse than the FR1 block error rate. For example, with 16 HARQ processes, the round-trip time may be 8 ms for a 30 kHz subcarrier spacing and 2 ms for a 120 kHz subcarrier spacing, so waiting for a number of slots on FR2 may not significantly impact latency. In some aspects, the UE 120 may transmit an RLC retransmission on a first available uplink grant irrespective of the numerology associated with the first available uplink grant, and may transmit another RLC retransmission on an uplink grant associated with the preferred numerology of the RLC retransmission if the UE 120 does not receive an acknowledgment associated with the first available uplink grant. In this way, the UE 120 may provide for fast retransmission of a PDU on a first available numerology and subsequent retransmission on another numerology, which may reduce latency associated with retransmission when a preferred numerology is not immediately available for retransmission.

In some aspects, a UE 120 may select a numerology on which to transmit an RLC PDU (e.g., a transport block) with a poll bit. The state machine of example 1600 is an example of how to select a numerology in such a case. As shown by reference number 1605, the UE 120 may wait for a next poll trigger. As shown by reference number 1610, if the UE 120 detects a poll trigger (e.g., a pollPDU parameter being satisfied, a pollBytes parameter being satisfied, or a t-Poll-Retransmit timer expiring), the UE 120 may wait for an uplink grant. As shown by reference number 1615, if the UE 120 receives an FR2 grant, the UE 120 may transmit the PDU on FR2. As shown by reference number 1620, if the UE 120 transmits a PDU on FR2, and the UE 120 has already transmitted a PDU on FR1, the UE 120 may wait for a next poll trigger. Similarly, if the UE 120 transmits a PDU on FR1 and has already transmitted a PDU on FR2, the UE 120 may wait for a next poll trigger. As shown by reference number 1625, if the uplink grant is an FR1 grant, the UE 120 may transmit the PDU on FR1. Additionally, as shown by reference number 1630, if the UE 120 receives an FR1 grant after an FR2 grant, the UE 120 may transmit the PDU on FR1. As shown by reference number 1635, if the UE 120 receives an FR2 grant after an FR1 grant, the UE 120 may transmit the PDU on FR2. Thus, the UE 120 may make a note of a TB's numerology when a first poll PDU is sent. Upon receiving a grant on another numerology, the UE 120 may retransmit the PDU for the TB, thereby leveraging the fast polling framework. Thus, the UE 120 may transmit a transport block using a first numerology and a second numerology, which increases the likelihood of the base station 110 receiving the poll, since even if an uplink transmission on any one numerology fails due to a bad channel, the base station 110 can still receive the poll request from the transport block on another numerology.

In some aspects, the UE 120 may select an uplink path for a MAC communication. For example, a BS 110 may configure a physical uplink control channel scheduling request (PUCCH-SR) on a primary CC and a secondary CC, where the primary CC is a cell with a PUCCH-SR configured in a primary PUCCH group and the secondary CC is a cell with a PUCCH-SR configured in a secondary PUCCH group. The UE 120 may use an earliest SR occasion, of SR occasions on the primary CC and the secondary CC, to transmit an SR. Thus, the UE 120 may reduce delay from uplink data arrival to SR transmission. For example, if transmission of an SR on one CC fails, the UE 120 may transmit the SR on an earliest SR occasion on a second CC, hereby improving latency.

In some aspects, the primary CC and the secondary CC may have different numerologies and/or may be part of different connected-mode discontinuous reception (cDRX) groups. If at least one of the SR resources used to transmit the SR is associated with a sub6 numerology, then the likelihood of SR success is increased, as sub6 uplink transmissions tend to be more robust than mmW uplink transmissions. Furthermore, if the primary CC and the secondary CC are in different cDRX groups, then it is more likely that at least one CC is in a DRX ON period when the uplink data arrives. Thus, the UE 120 can skip delay associated with awakening outside of the DRX ON period. Furthermore, in some aspects, the BS 110 may configure a prescheduled grant for the SR, which eliminates a wait time for a next SR occasion and which reduces delay between the SR and a transmission of the data by the UE 120.

In some aspects, the UE 120 may transmit a buffer status report (BSR) or a power headroom report (PHR). A PHR indicates an amount of additional transmit power that the UE 120 can provide. A BSR indicates an amount of data buffered for the UE 120. For example, the UE 120 may transmit the BSR or PHR via a carrier associated with an FR1 numerology and a carrier associated with an FR2 numerology, which improves the likelihood of successful decoding of the BSR or PHR. In some aspects, the UE 120 may transmit the BSR or PHR on a first carrier associated with a first numerology at a time t0. The UE 120 may receive a grant on a second carrier associated with a second numerology for a transmission at a time t1. The UE 120 may retransmit the BSR or PHR at the time t1. In some aspects, the UE 120 may merge the BSR with any new BSR triggered between t0 and t1. Retransmitting the BSR or PHR at t0 and t1 may provide an increased number of sampling points to the base station 110. In some aspects, the UE 120 may skip retransmission of the PHR or the BSR based at least in part on a HARQ block error rate (BLER). For example, if the HARQ BLER satisfies a threshold, the UE 120 may skip retransmission of the PHR or BSR after a transmission.

Figure 17:
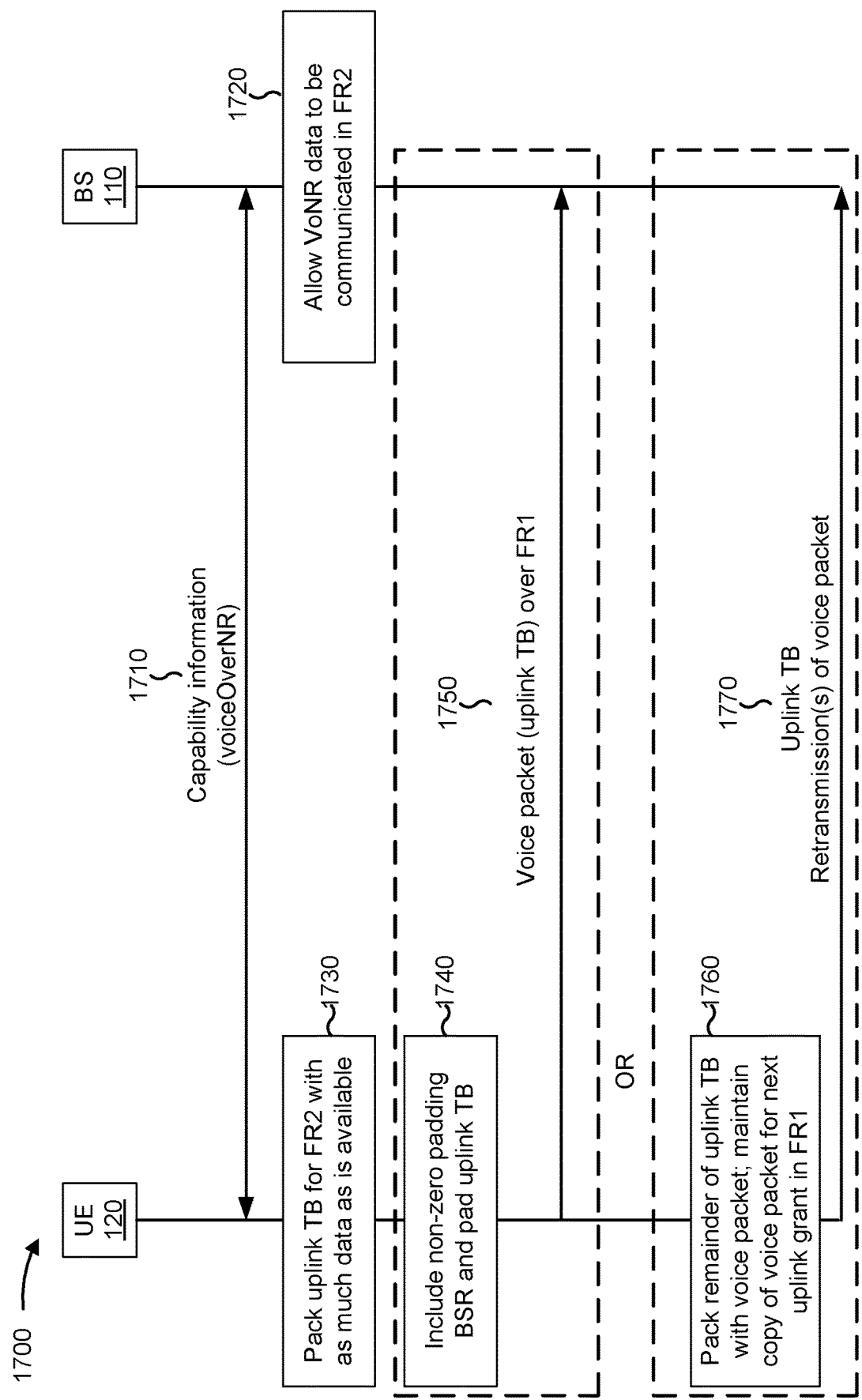
FIG. 17 is a diagram illustrating an example of signaling associated with transport block generation based at least in part on a Voice over NR (VoNR) call in FR2, in accordance with the present disclosure.

FIG. 17 is a diagram illustrating an example 1700 of signaling associated with TB generation based at least in part on a Voice over NR (VoNR) call in FR2, in accordance with the present disclosure. As shown, FIG. 17 includes a UE 120 and a BS 110.

As shown by reference number 1710, the UE 120 may transmit capability information to the BS 110. The capability information may indicate that the BS 110 is to avoid VoNR in FR2. For example, the capability information may include a voiceOverNR parameter that indicates to use logical channel prioritization (LCP) restriction to ensure that VoNR data is communicated in FR1. If the BS 110 adheres to the capability information, then the UE 120 may pack FR2 TBs with data only. However, in some cases, as shown by reference number 1720, the BS 110 may allow the VoNR data to be communicated in FR2. As shown by reference number 1730, the UE 120 may pack an uplink TB for FR2 with as much data as is available. If the uplink TB is not fully packed (e.g., filled), then in some aspects, the UE 120 may include a non-zero padding BSR (to account for voice data) and may pad (e.g., fill) the rest of the uplink TB, as shown by reference number 1740. If the UE 120 includes the non-zero padding BSR and pads the uplink TB, then the UE 120 may transmit a voice packet including the uplink TB on a next available grant in FR1, as shown by reference number 1750.

In some other aspects, the UE 120 may pack the remainder of the TB with the voice packet, and may maintain a copy of the voice packet to transmit on a next FR1 grant, as shown by reference number 1760. The UE 120 may note an RLC SN from acknowledged mode (AM) data radio bearers (DRBs) transmitted on the uplink TB. If an RLC ACK is received for the RLC SN before a next FR1 grant, the UE 120 may determine not to transmit the voice packet on the next FR1 grant. In some aspects, the UE 120 may track HARQ success for the uplink TB in FR2, and may skip duplication of the uplink TB based at least in part on whether HARQ indicates successful transmission of the uplink TB. As shown by reference number 1770, the UE 120 may transmit the uplink TB and/or one or more retransmissions of the voice packet.

As indicated above, FIG. 17 is provided as an example. Other examples may differ from what is described with regard to FIG. 17.

Figure 18:
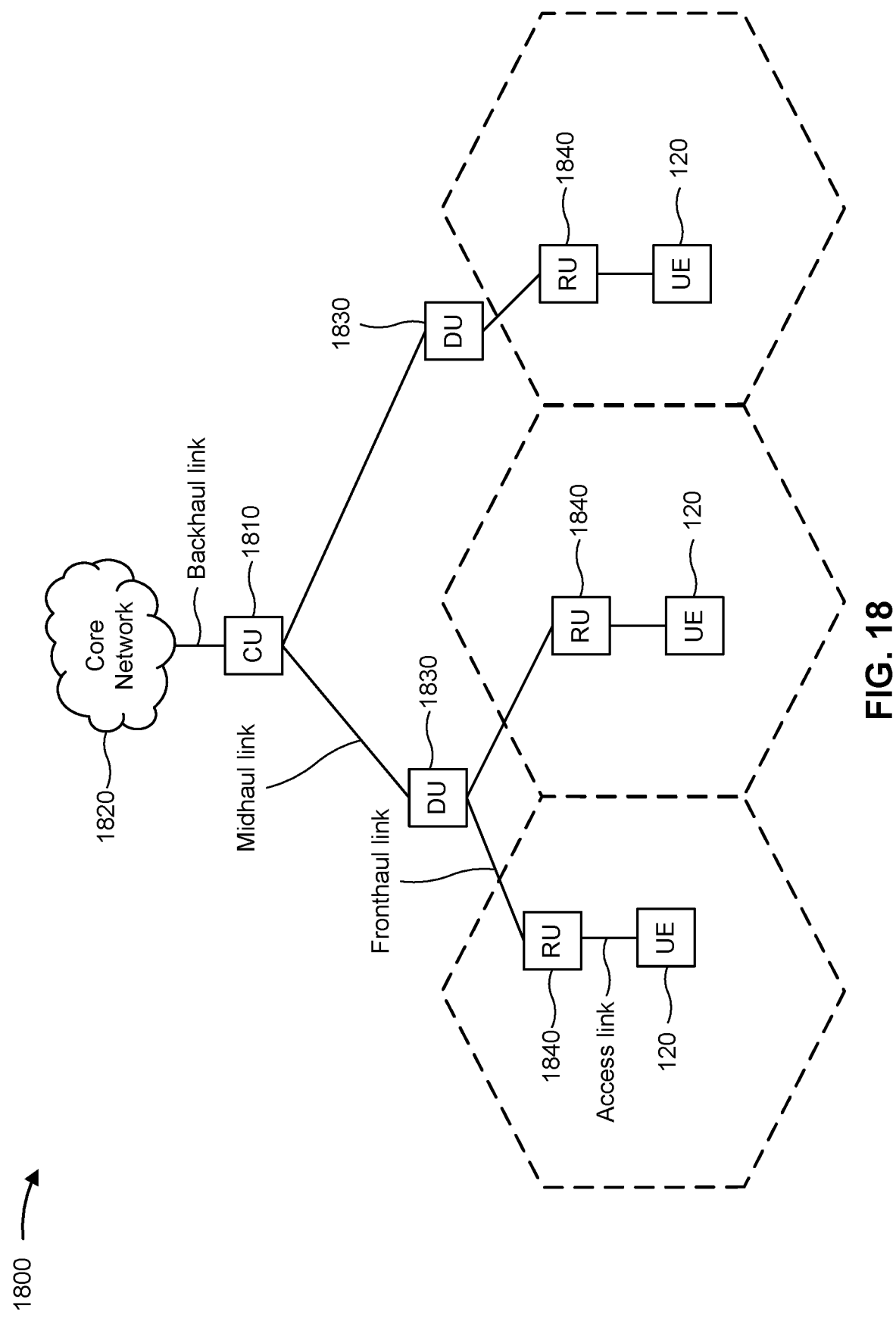
FIG. 18 is a diagram illustrating an example of an O-RAN architecture, in accordance with the present disclosure.

FIG. 18 is a diagram illustrating an example 1800 of an O-RAN architecture, in accordance with the present disclosure. As shown in FIG. 18, the O-RAN architecture may include a control unit (CU) 1810 that communicates with a core network 1820 via a backhaul link. Furthermore, the CU 1810 may communicate with one or more DUs 1830 via respective midhaul links. The DUs 1830 may each communicate with one or more RUs 1840 via respective fronthaul links, and the RUs 1840 may each communicate with respective UEs 120 via radio frequency (RF) access links. The DUs 1830 and the RUs 1840 may also be referred to as O-RAN DUs (O-DUs) 1830 and O-RAN RUs (O-RUs) 1840, respectively.

In some aspects, the DUs 1830 and the RUs 1840 may be implemented according to a functional split architecture in which functionality of a base station 110 (e.g., an eNB or a gNB) is provided by a DU 1830 and one or more RUs 1840 that communicate over a fronthaul link. Accordingly, as described herein, a base station 1810 may include a DU 1830 and one or more RUs 1840 that may be co-located or geographically distributed. In some aspects, the DU 1830 and the associated RU(s) 1840 may communicate via a fronthaul link to exchange real-time control plane information via a lower layer split (LLS) control plane (LLS-C) interface, to exchange non-real-time management information via an LLS management plane (LLS-M) interface, and/or to exchange user plane information via an LLS user plane (LLS-U) interface.

Accordingly, the DU 1830 may correspond to a logical unit that includes one or more base station functions to control the operation of one or more RUs 1840. For example, in some aspects, the DU 1830 may host a radio link control (RLC) layer, a medium access control (MAC) layer, and one or more high physical (PHY) layers (e.g., forward error correction (FEC) encoding and decoding, scrambling, and/or modulation and demodulation) based at least in part on a lower layer functional split. Higher layer control functions, such as a packet data convergence protocol (PDCP), radio resource control (RRC), and/or service data adaptation protocol (SDAP), may be hosted by the CU 1810. The RU(s) 1840 controlled by a DU 1830 may correspond to logical nodes that host RF processing functions and low-PHY layer functions (e.g., fast Fourier transform (FFT), inverse FFT (iFFT), digital beamforming, and/or physical random access channel (PRACH) extraction and filtering) based at least in part on the lower layer functional split. Accordingly, in an O-RAN architecture, the RU(s) 1840 handle all over the air (OTA) communication with a UE 1820, and real-time and non-real-time aspects of control and user plane communication with the RU(s) 1840 are controlled by the corresponding DU 1830, which enables the DU(s) 1830 and the CU 1810 to be implemented in a cloud-based RAN architecture. The techniques described with regard to FIGS. 1-24 can be applied in an O-RAN architecture.

As indicated above, FIG. 18 is provided as an example. Other examples may differ from what is described with regard to FIG. 18.

Figure 19:
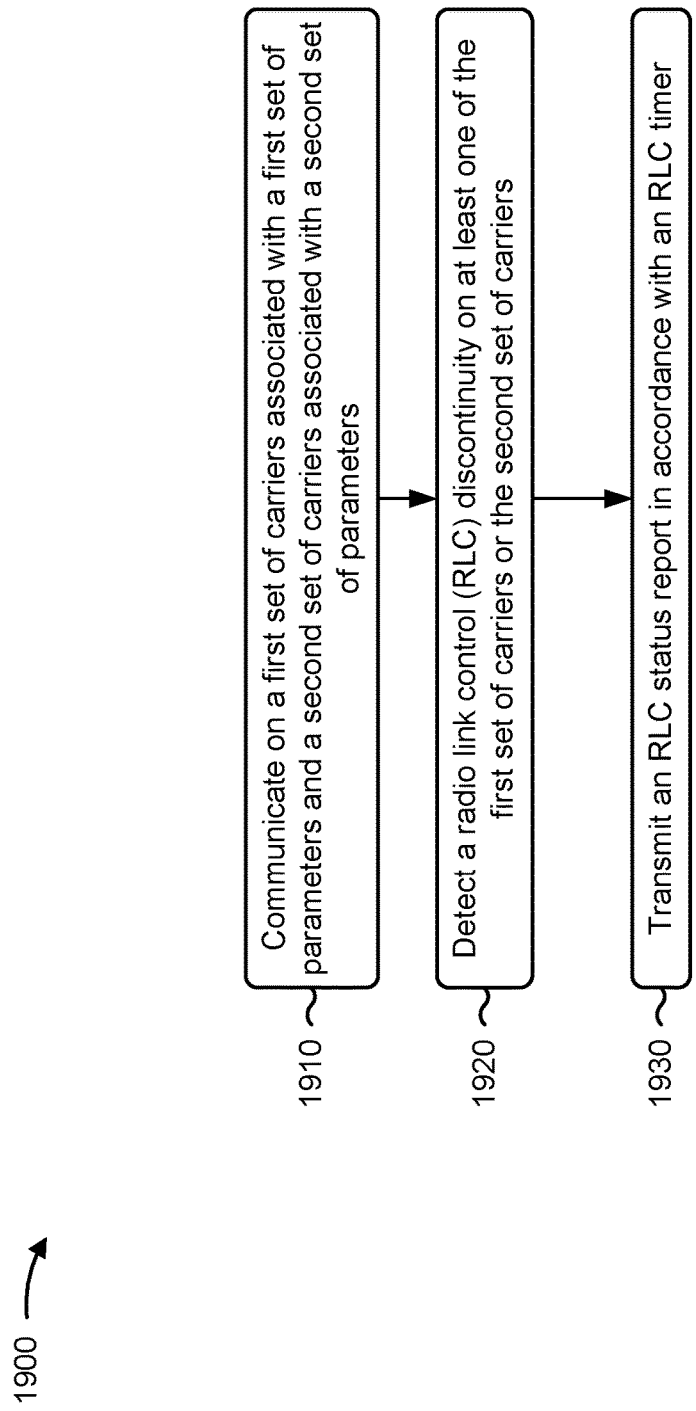
FIG. 19 is a diagram illustrating an example process performed by a UE, in accordance with the present disclosure.

FIG. 19 is a diagram illustrating an example process 1900 performed, for example, by a UE, in accordance with the present disclosure. Example process 1900 is an example where the UE (e.g., UE 120) performs operations associated with carrier aggregation for mixed frequency ranges. For example, FIG. 19 depicts operations of an RLC receiver, and these operations can be applied for any RLC receiver.

As shown in FIG. 19, in some aspects, process 1900 may include communicating on a first set of carriers associated with a first set of parameters and a second set of carriers associated with a second set of parameters (block 1910). For example, the UE (e.g., using communication manager 140 and/or reception component 2202, depicted in FIG. 22) may communicate on a first set of carriers associated with a first set of parameters and a second set of carriers associated with a second set of parameters, as described above.

As further shown in FIG. 19, in some aspects, process 1900 may include detecting a radio link control (RLC) discontinuity on at least one set of carriers, of the first set of carriers or the second set of carriers (block 1920). For example, the UE (e.g., using communication manager 140 and/or detection component 2208, depicted in FIG. 22) may detect a radio link control (RLC) discontinuity on at least one set of carriers, of the first set of carriers or the second set of carriers, as described above.

As further shown in FIG. 19, in some aspects, process 1900 may include transmitting an RLC status report in accordance with an RLC timer that is based at least in part on at least one of a first hybrid automatic repeat request (HARQ) parameter associated with the first set of parameters or a second HARQ parameter associated with the second set of parameters, wherein the RLC timer based at least in part on a number of RLC duplicates received by the UE (block 1930). For example, the UE (e.g., using communication manager 140 and/or transmission component 2204, depicted in FIG. 2) may transmit an RLC status report in accordance with an RLC timer that is based at least in part on at least one of a first hybrid automatic repeat request (HARQ) parameter associated with the first set of parameters or a second HARQ parameter associated with the second set of parameters, wherein the RLC timer based at least in part on a number of RLC duplicates received by the UE, as described above.

Process 1900 may include additional aspects, such as any single aspect or any combination of aspects described below and/or in connection with one or more other processes described elsewhere herein.

In a first aspect, the first set of parameters is associated with a first numerology and the second set of parameters is associated with a second numerology.

In a second aspect, alone or in combination with the first aspect, process 1900 includes identifying one or more numerologies, of the first numerology or the second numerology, in which the RLC discontinuity occurred, wherein the RLC timer is determined in accordance with a numerology of the identified one or more numerologies.

In a third aspect, alone or in combination with one or more of the first and second aspects, identifying the one or more numerologies is based at least in part on a HARQ transmission associated with a slot associated with the RLC discontinuity and a cyclic redundancy check (CRC) error associated with the slot associated with the RLC discontinuity.

In a fourth aspect, alone or in combination with one or more of the first through third aspects, identifying the one or more numerologies is based at least in part on one or more estimated transport block sizes associated with the RLC discontinuity and an amount of RLC bytes received in a slot associated with the RLC discontinuity.

In a fifth aspect, alone or in combination with one or more of the first through fourth aspects, the one or more estimated transport block sizes include a first estimated transport block size associated with the first numerology and a second estimated transport block size associated with the second numerology.

In a sixth aspect, alone or in combination with one or more of the first through fifth aspects, transmitting the RLC status report is based at least in part on receiving a poll protocol data unit associated with the identified one or more numerologies or determining that a reassembly timer for the identified one or more numerologies has expired, and wherein the identified one or more numerologies include a single numerology.

In a seventh aspect, alone or in combination with one or more of the first through sixth aspects, the identified one or more numerologies include only the first numerology, and wherein transmitting the RLC status report based at least in part on the identified one or more FRs further comprises transmitting, based at least in part on a poll protocol data unit or expiration of the RLC timer, a negative acknowledgment regarding the RLC discontinuity.

In an eighth aspect, alone or in combination with one or more of the first through seventh aspects, the identified one or more numerologies include only the first numerology and the RLC timer is a configured RLC timer associated with the first numerology.

In a ninth aspect, alone or in combination with one or more of the first through eighth aspects, the identified one or more numerologies include the first numerology and the second numerology, and wherein the RLC timer is determined as a longer RLC timer, of an RLC timer associated with the first numerology and an RLC timer associated with the second numerology.

In a tenth aspect, alone or in combination with one or more of the first through ninth aspects, the RLC timer is based at least in part on a HARQ parameter associated with a carrier, of the first set of carriers or the second set of carriers, on which the RLC discontinuity is detected.

In an eleventh aspect, alone or in combination with one or more of the first through tenth aspects, the HARQ parameter is at least one of a HARQ round trip time or a HARQ recovery delay.

In a twelfth aspect, alone or in combination with one or more of the first through eleventh aspects, the RLC timer is based at least in part on a combination of the first HARQ parameter and the second HARQ parameter, and based at least in part on a first numerology associated with the first set of carriers and a second numerology associated with the second set of carriers.

In a thirteenth aspect, alone or in combination with one or more of the first through twelfth aspects, the RLC discontinuity is an RLC discontinuity on a first carrier of the first set of carriers and a second carrier of the second set of carriers, and wherein the RLC timer is determined in accordance with a lower numerology of a first numerology of the first set of carriers and a second numerology of the second set of carriers.

In a fourteenth aspect, alone or in combination with one or more of the first through thirteenth aspects, the RLC status report indicates an RLC status up to a most recent RLC discontinuity.

In a fifteenth aspect, alone or in combination with one or more of the first through fourteenth aspects, detecting the RLC discontinuity further comprises detecting a plurality of RLC discontinuities, and wherein transmitting the RLC status report further comprises transmitting the RLC status report indicating an RLC status for all RLC discontinuities, of the plurality of RLC discontinuities and associated with the second set of carriers, up to a next RLC discontinuity of the first set of carriers, wherein the second set of carriers is associated with a second numerology that is higher than a first numerology of the first set of carriers.

In a sixteenth aspect, alone or in combination with one or more of the first through fifteenth aspects, detecting the RLC discontinuity further comprises detecting a plurality of RLC discontinuities, and wherein transmitting the RLC status report further comprises transmitting the RLC status report indicating an RLC status for all RLC discontinuities, of the plurality of RLC discontinuities, for which the UE estimates that HARQ recovery is complete.

In a seventeenth aspect, alone or in combination with one or more of the first through sixteenth aspects, process 1900 includes maintaining, for the first set of parameters and the second set of parameters, separate RLC sequence number tracking.

In an eighteenth aspect, alone or in combination with one or more of the first through seventeenth aspects, process 1900 includes maintaining, for the first set of parameters and the second set of parameters, a separate set of RLC timers.

In a nineteenth aspect, alone or in combination with one or more of the first through eighteenth aspects, the RLC discontinuity is associated with only the second set of carriers, and wherein the RLC status report indicates an RLC status of one or more RLC protocol data units on the second set of carriers after an unacknowledged RLC discontinuity on the first set of carriers.

In a twentieth aspect, alone or in combination with one or more of the first through nineteenth aspects, an acknowledgment sequence number of the RLC status is set to a most recently received sequence number on the second set of carriers.

In a twenty-first aspect, alone or in combination with one or more of the first through twentieth aspects, the first set of parameters or the second set of parameters indicates at least one of a duplexing configuration, a scheduling delay, a numerology, a frequency range, or an uplink/downlink slot allocation.

In a twenty-second aspect, alone or in combination with one or more of the first through twenty-first aspects, the first HARQ parameter or the second HARQ parameter includes at least one of a HARQ round-trip time, or a HARQ recovery delay.

In a twenty-third aspect, alone or in combination with one or more of the first through twenty-second aspects, detecting the RLC discontinuity further comprises detecting that a threshold number of retransmitted RLC protocol data units are dropped and that a number of HARQ failures is lower than a threshold.

In a twenty-fourth aspect, alone or in combination with one or more of the first through twenty-third aspects, detecting the RLC discontinuity further comprises detecting that a sum of an inter-carrier sequence number delay between the first set of carriers and the second set of carriers, and the HARQ parameter, is greater than a configured value of the RLC timer.

In a twenty-fifth aspect, alone or in combination with one or more of the first through twenty-fourth aspects, process 1900 includes determining the RLC timer.

In a twenty-sixth aspect, alone or in combination with one or more of the first through twenty-fifth aspects, the RLC timer is equal in length to a HARQ recovery delay indicated by the HARQ parameter.

In a twenty-seventh aspect, alone or in combination with one or more of the first through twenty-sixth aspects, determining the RLC timer is based at least in part on a model trained using machine learning.

In a twenty-eighth aspect, alone or in combination with one or more of the first through twenty-seventh aspects, the number of RLC duplicates received by the UE is based at least in part on a successful HARQ transmission following transmission of one or more negative acknowledgments.

Although FIG. 19 shows example blocks of process 1900, in some aspects, process 1900 may include additional blocks, fewer blocks, different blocks, or differently arranged blocks than those depicted in FIG. 19. Additionally, or alternatively, two or more of the blocks of process 1900 may be performed in parallel.

Figure 20:
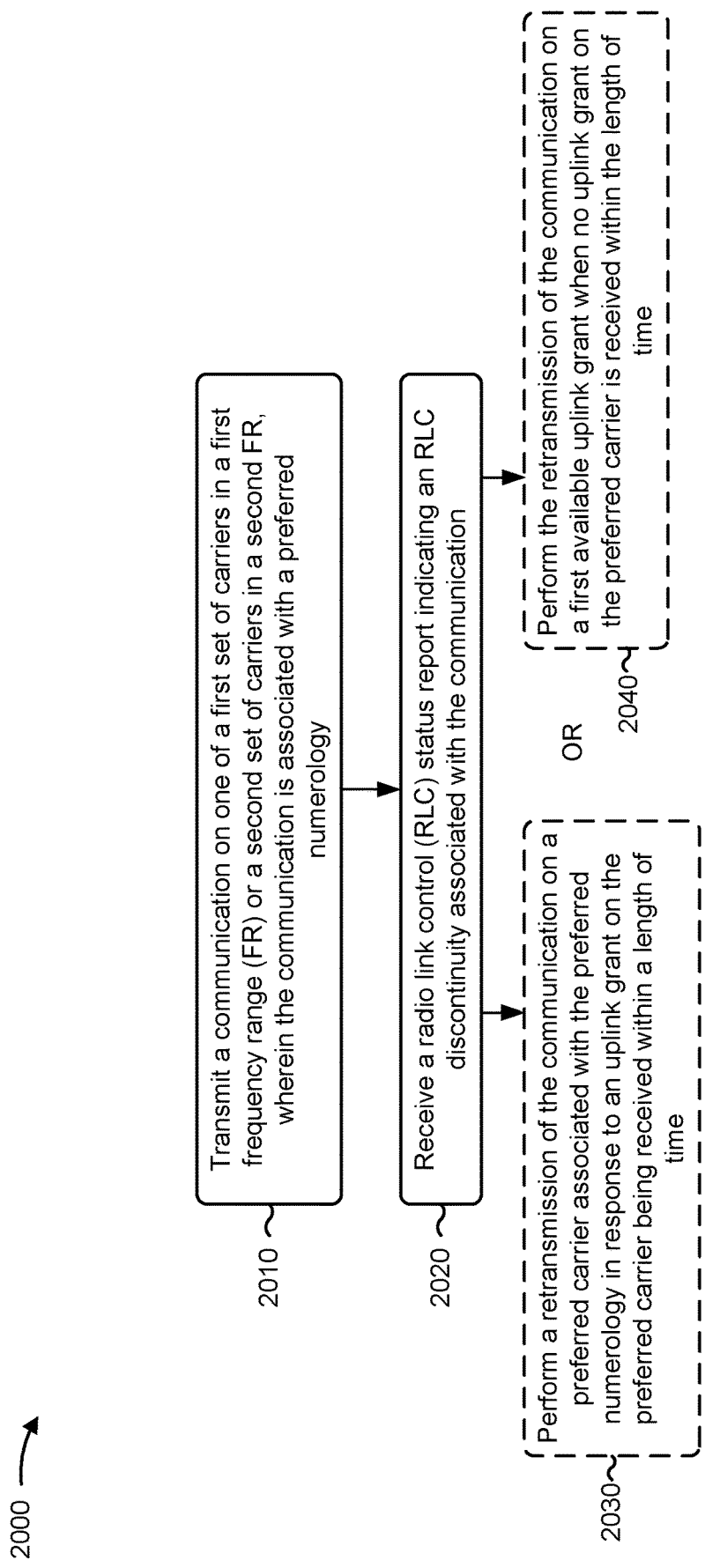
FIG. 20 is a diagram illustrating an example process performed by a UE, in accordance with the present disclosure.

FIG. 20 is a diagram illustrating an example process 2000 performed, for example, by an UE, in accordance with the present disclosure. Example process 2000 is an example where the UE (e.g., UE 120) performs operations associated with carrier aggregation for mixed frequency ranges. For example, FIG. 20 depicts operations of an RLC transmitter, and these operations can be applied for any RLC transmitter.

As shown in FIG. 20, in some aspects, process 2000 may include transmitting a communication on one of a first set of carriers in a first frequency range (FR) or a second set of carriers in a second FR, wherein the communication is associated with a preferred numerology (block 2010). For example, the UE (e.g., using communication manager 140 and/or transmission component 2204, depicted in FIG. 22) may transmit a communication on one of a first set of carriers in a first frequency range (FR) or a second set of carriers in a second FR, wherein the communication is associated with a preferred numerology, as described above.

As further shown in FIG. 20, in some aspects, process 2000 may include receiving a radio link control (RLC) status report indicating an RLC discontinuity associated with the communication (block 2020). For example, the UE (e.g., using communication manager 140 and/or reception component 2202, depicted in FIG. 22) may receive a radio link control (RLC) status report indicating an RLC discontinuity associated with the communication, as described above.

As further shown in FIG. 20, in some aspects, process 2000 may include performing a retransmission of the communication on a preferred carrier associated with the preferred numerology in response to an uplink grant on the preferred carrier being received within a length of time (block 2030). For example, the UE (e.g., using communication manager 140 and/or transmission component 2204, depicted in FIG. 22) may perform a retransmission of the communication on a preferred carrier associated with the preferred numerology in response to an uplink grant on the preferred carrier being received within a length of time, as described above.

As further shown in FIG. 20, in some aspects, process 2000 may include performing the retransmission of the communication on a first available uplink grant when no uplink grant on the preferred carrier is received within the length of time (block 2030). For example, the UE (e.g., using communication manager 140 and/or transmission component 2204, depicted in FIG. 22) may perform the retransmission of the communication on a first available uplink grant when no uplink grant on the preferred carrier is received within the length of time, as described above.

Process 2000 may include additional aspects, such as any single aspect or any combination of aspects described below and/or in connection with one or more other processes described elsewhere herein.

In a first aspect, the retransmission is on the first available uplink grant of the preferred numerology and the method further comprises retransmitting the retransmission on a carrier associated with another numerology if no acknowledgment of the retransmission has been received after performing the retransmission.

In a second aspect, alone or in combination with the first aspect, process 2000 includes transmitting a buffer status report and a power headroom report on a carrier of the first set of carriers, and transmitting the buffer status report and the power headroom report on a carrier of the second set of carriers.

In a third aspect, alone or in combination with one or more of the first and second aspects, the buffer status report as transmitted on the carrier of the second set of carriers is updated relative to the buffer status report as transmitted on the carrier of the first set of carriers.

In a fourth aspect, alone or in combination with one or more of the first through third aspects, the buffer status report as transmitted on the carrier of the second set of carriers is merged with another buffer status report triggered after transmission of the buffer status report on the carrier of the first set of carriers.

In a fifth aspect, alone or in combination with one or more of the first through fourth aspects, the communication is an RLC protocol data unit carrying a poll bit.

Although FIG. 20 shows example blocks of process 2000, in some aspects, process 2000 may include additional blocks, fewer blocks, different blocks, or differently arranged blocks than those depicted in FIG. 20. Additionally, or alternatively, two or more of the blocks of process 2000 may be performed in parallel.

Figure 21:
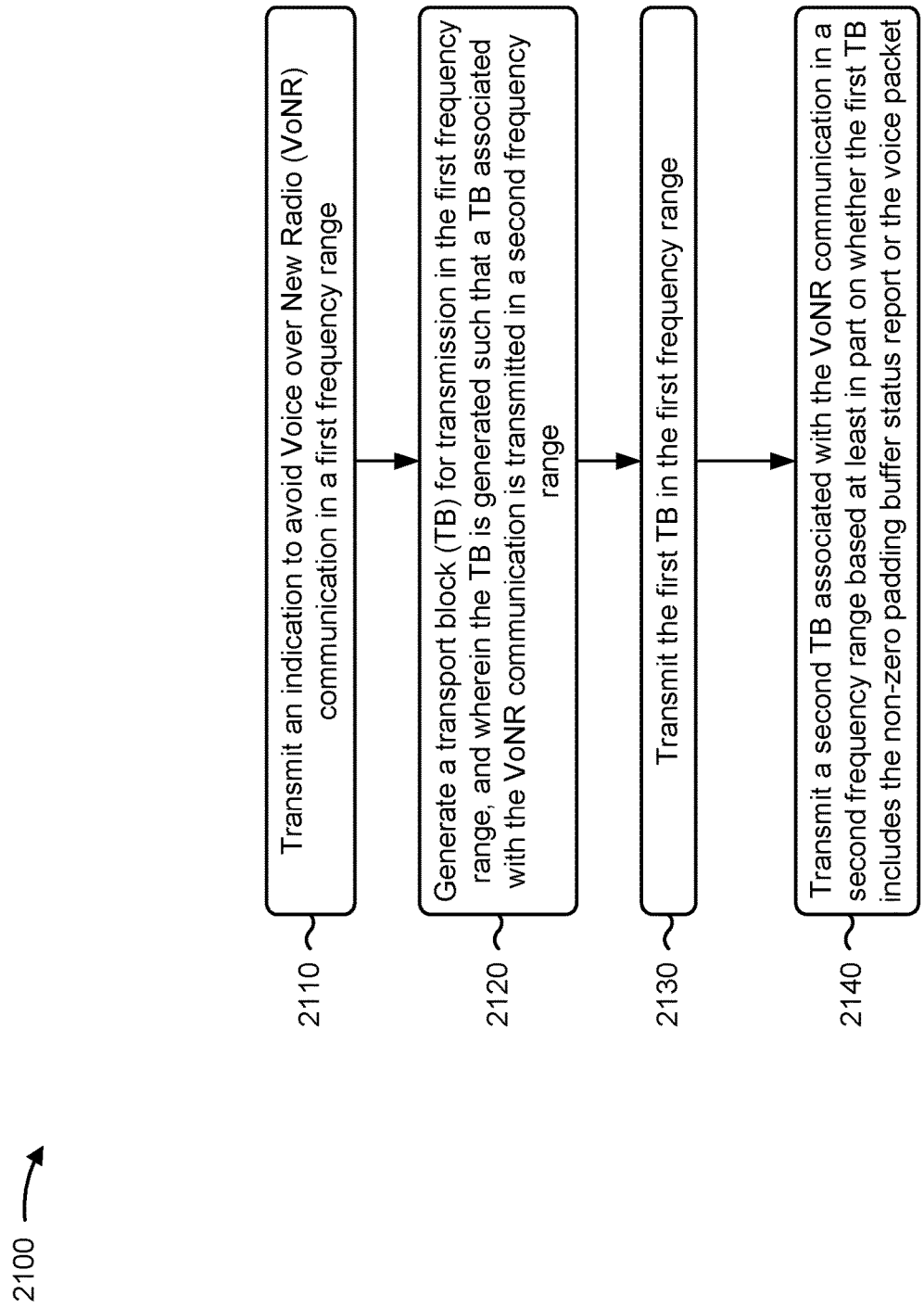
FIG. 21 is a diagram illustrating an example process performed by a UE, in accordance with the present disclosure.

FIG. 21 is a diagram illustrating an example process 2100 performed, for example, by a UE, in accordance with the present disclosure. Example process 2100 is an example where the UE (e.g., UE 120) performs operations associated with carrier aggregation for mixed frequency ranges.

As shown in FIG. 21, in some aspects, process 2100 may include transmitting an indication to avoid Voice over New Radio (VoNR) communication in a first frequency range (block 2110). For example, the UE (e.g., using communication manager 140 and/or transmission component 2204, depicted in FIG. 22) may transmit an indication to avoid Voice over New Radio (VoNR) communication in a first frequency range, as described above. In some aspects, the first frequency range is FR2.

As further shown in FIG. 21, in some aspects, process 2100 may include generating a first transport block (TB) for transmission in the first frequency range, wherein the first TB is generated including a non-zero padding buffer status report or a voice packet (block 2120). For example, the UE (e.g., using communication manager 140 and/or generation component 2212, depicted in FIG. 22) may generate a first transport block (TB) for transmission in the first frequency range, wherein the first TB is generated including a non-zero padding buffer status report or a voice packet, as described above.

As further shown in FIG. 21, in some aspects, process 2100 may include transmitting the first TB in the first frequency range (block 2130). For example, the UE (e.g., using communication manager 140 and/or transmission component 2204, depicted in FIG. 22) may transmit the first TB in the first frequency range, as described above.

As further shown in FIG. 21, in some aspects, process 2100 may optionally include transmitting a second TB associated with the VoNR communication in a second frequency range based at least in part on whether the first TB includes the non-zero padding buffer status report or the voice packet (block 2140). For example, the UE (e.g., using communication manager 140 and/or transmission component 2204, depicted in FIG. 22) may transmit a second TB associated with the VoNR communication in a second frequency range if the first TB includes the voice packet, as described above. In some aspects, the second frequency range is FR1.

Process 2100 may include additional aspects, such as any single aspect or any combination of aspects described below and/or in connection with one or more other processes described elsewhere herein.

In a first aspect, process 2100 includes transmitting the voice packet in the second TB.

In a second aspect, alone or in combination with the first aspect, transmitting the voice packet in the second TB is based at least in part on not having received an acknowledgment of the first TB.

Although FIG. 21 shows example blocks of process 2100, in some aspects, process 2100 may include additional blocks, fewer blocks, different blocks, or differently arranged blocks than those depicted in FIG. 21. Additionally, or alternatively, two or more of the blocks of process 2100 may be performed in parallel.

Figure 22:
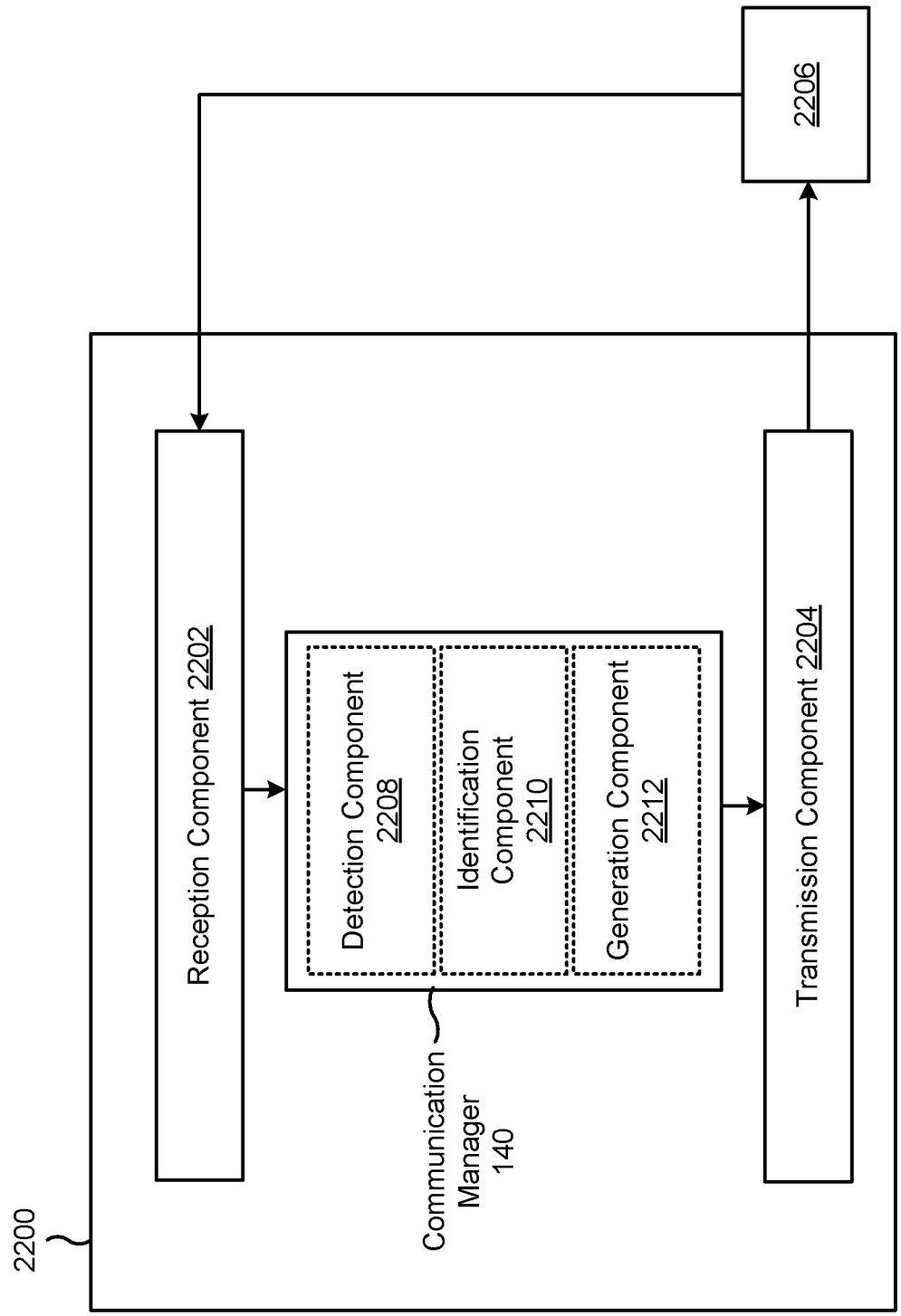
FIG. 22 is a diagram of an example apparatus for wireless communication, in accordance with the present disclosure.

FIG. 22 is a diagram of an example apparatus 2200 for wireless communication, in accordance with the present disclosure. The apparatus 2200 may be a UE, or a UE may include the apparatus 2200. In some aspects, the apparatus 2200 includes a reception component 2202 and a transmission component 2204, which may be in communication with one another (for example, via one or more buses and/or one or more other components). As shown, the apparatus 2200 may communicate with another apparatus 2206 (such as a UE, a base station, or another wireless communication device) using the reception component 2202 and the transmission component 2204. As further shown, the apparatus 2200 may include the communication manager 140. The communication manager 140 may include one or more of a detection component 2208, an identification component 2210, or a generation component 2212, among other examples.

In some aspects, the apparatus 2200 may be configured to perform one or more operations described herein in connection with FIGS. 3-18. Additionally, or alternatively, the apparatus 2200 may be configured to perform one or more processes described herein, such as process 1900 of FIG. 19, process 2000 of FIG. 20, process 2100 of FIG. 21, or a combination thereof. In some aspects, the apparatus 2200 and/or one or more components shown in FIG. 22 may include one or more components of the UE described in connection with FIG. 2. Additionally, or alternatively, one or more components shown in FIG. 22 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 2202 may receive communications, such as reference signals, control information, data communications, or a combination thereof, from the apparatus 2206. The reception component 2202 may provide received communications to one or more other components of the apparatus 2200. In some aspects, the reception component 2202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 2200. In some aspects, the reception component 2202 may include one or more antennas, a modem, a demodulator, a MIMO detector, a receive processor, a controller/processor, a memory, or a combination thereof, of the UE described in connection with FIG. 2.

The transmission component 2204 may transmit communications, such as reference signals, control information, data communications, or a combination thereof, to the apparatus 2206. In some aspects, one or more other components of the apparatus 2200 may generate communications and may provide the generated communications to the transmission component 2204 for transmission to the apparatus 2206. In some aspects, the transmission component 2204 may perform signal processing on the generated communications (such as filtering, amplification, modulation, digital-to-analog conversion, multiplexing, interleaving, mapping, or encoding, among other examples), and may transmit the processed signals to the apparatus 2206. In some aspects, the transmission component 2204 may include one or more antennas, a modem, a modulator, a transmit MIMO processor, a transmit processor, a controller/processor, a memory, or a combination thereof, of the UE described in connection with FIG. 2. In some aspects, the transmission component 2204 may be co-located with the reception component 2202 in a transceiver.

The transmission component 2204 may communicate on a first set of carriers associated with a first set of parameters and a second set of carriers associated with a second set of parameters. The detection component 2208 may detect a radio link control (RLC) discontinuity on at least one set of carriers, of the first set of carriers or the second set of carriers. The identification component 2210 may identify one or more FRs, of the first FR and the second FR, in which the RLC discontinuity occurred. The transmission component 2204 may transmitting an RLC status report in accordance with an RLC timer.

The transmission component 2204 may transmit a communication on one of a first set of carriers in a first frequency range (FR) or a second set of carriers in a second FR, wherein the communication is associated with a preferred numerology. The reception component 2202 may receive a radio link control (RLC) status report indicating an RLC discontinuity associated with the communication. The transmission component 2204 may perform a retransmission of the communication of the communication on a preferred carrier associated with the preferred numerology in response to an uplink grant on the preferred carrier being received within a length of time. The transmission component 2204 may perform the retransmission of the communication on a first available uplink grant when no uplink grant on the preferred carrier is received within the length of time.

The transmission component 2204 may transmit an indication to avoid VoNR communication in a first frequency range. The generation component 2212 may generating a first transport block (TB) for transmission in the first frequency range, wherein the first TB is generated including a non-zero padding buffer status report or a voice packet. The transmission component 2204 may transmit the first TB in the first frequency range. The transmission component 2204 may transmit a second TB associated with the VoNR communication in a second frequency range based at least in part on the first TB including the non-zero padding buffer status report or the voice packet.

The number and arrangement of components shown in FIG. 22 are provided as an example. In practice, there may be additional components, fewer components, different components, or differently arranged components than those shown in FIG. 22. Furthermore, two or more components shown in FIG. 22 may be implemented within a single component, or a single component shown in FIG. 22 may be implemented as multiple, distributed components. Additionally, or alternatively, a set of (one or more) components shown in FIG. 22 may perform one or more functions described as being performed by another set of components shown in FIG. 22.

Figure 23:
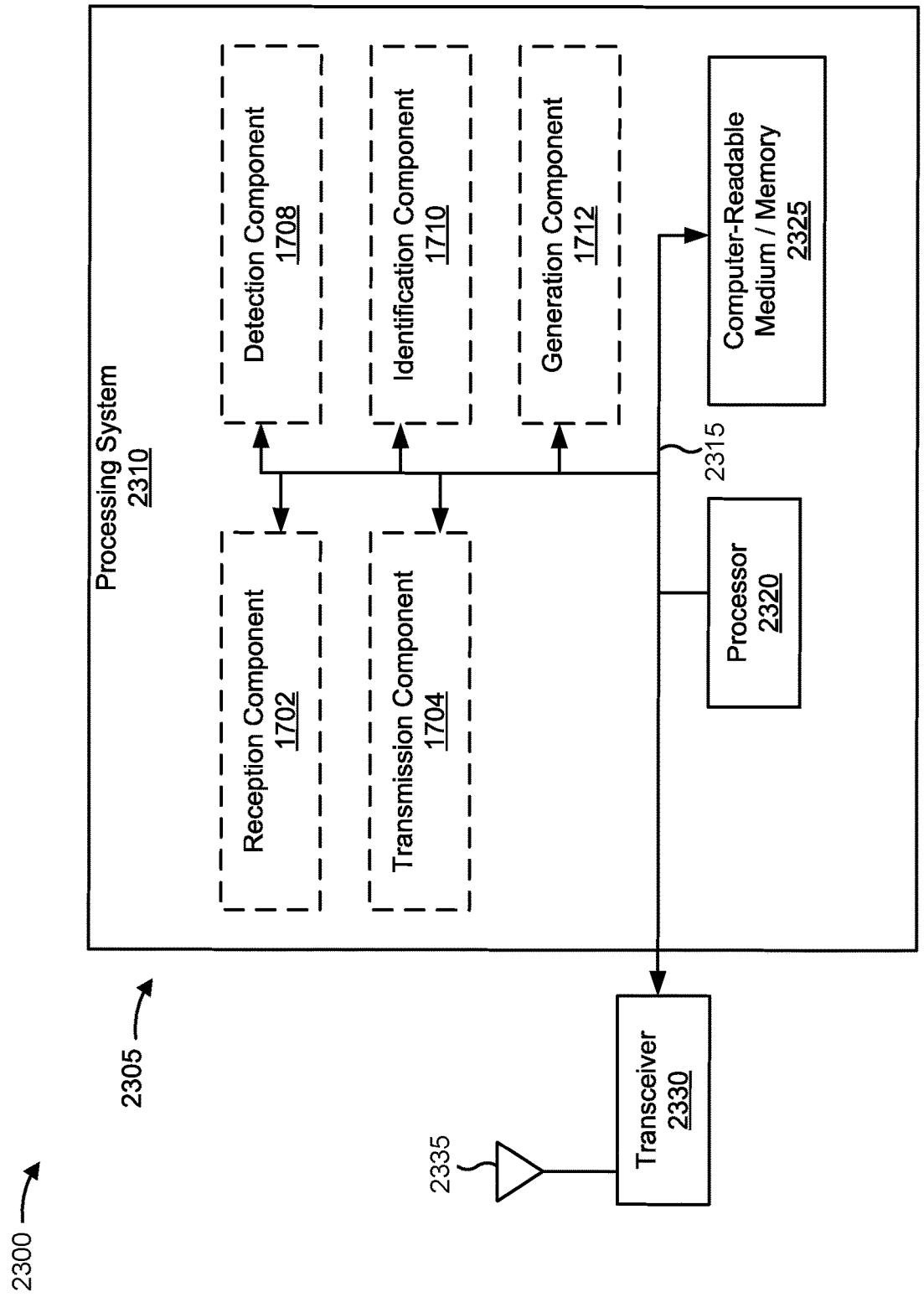
FIG. 23 is a diagram illustrating an example of a hardware implementation for an apparatus employing a processing system, in accordance with the present disclosure.

FIG. 23 is a diagram illustrating an example 2300 of a hardware implementation for an apparatus 2305 employing a processing system 2310, in accordance with the present disclosure. The apparatus 2305 may be a UE.

The processing system 2310 may be implemented with a bus architecture, represented generally by the bus 2315. The bus 2315 may include any number of interconnecting buses and bridges depending on the specific application of the processing system 2310 and the overall design constraints. The bus 2315 links together various circuits including one or more processors and/or hardware components, represented by the processor 2320, the illustrated components, and the computer-readable medium/memory 2325. The bus 2315 may also link various other circuits, such as timing sources, peripherals, voltage regulators, and/or power management circuits.

The processing system 2310 may be coupled to a transceiver 2330. The transceiver 2330 is coupled to one or more antennas 2335. The transceiver 2330 provides a means for communicating with various other apparatuses over a transmission medium. The transceiver 2330 receives a signal from the one or more antennas 2335, extracts information from the received signal, and provides the extracted information to the processing system 2310, specifically the reception component 1702. In addition, the transceiver 2330 receives information from the processing system 2310, specifically the transmission component 1704, and generates a signal to be applied to the one or more antennas 2335 based at least in part on the received information.

The processing system 2310 includes a processor 2320 coupled to a computer-readable medium/memory 2325. The processor 2320 is responsible for general processing, including the execution of software stored on the computer-readable medium/memory 2325. The software, when executed by the processor 2320, causes the processing system 2310 to perform the various functions described herein for any particular apparatus. The computer-readable medium/memory 2325 may also be used for storing data that is manipulated by the processor 2320 when executing software. The processing system further includes at least one of the illustrated components. The components may be software modules running in the processor 2320, resident/stored in the computer readable medium/memory 2325, one or more hardware modules coupled to the processor 2320, or some combination thereof.

In some aspects, the processing system 2310 may be a component of the UE 120 and may include the memory 282 and/or at least one of the TX MIMO processor 266, the RX processor 258, and/or the controller/processor 280. In some aspects, the apparatus 2305 for wireless communication includes means for communicating on a first set of carriers associated with a first set of parameters and a second set of carriers associated with a second set of parameters; means for detecting a radio link control (RLC) discontinuity on at least one set of carriers, of the first set of carriers or the second set of carriers; and/or means for transmitting an RLC status report in accordance with an RLC timer that is based at least in part on at least one of a first hybrid automatic repeat request (HARQ) parameter associated with the first set of parameters or a second HARQ parameter associated with the second set of parameters, wherein the RLC timer based at least in part on a number of RLC duplicates received by the UE; means for transmitting a communication on one of a first set of carriers in a first frequency range (FR) or a second set of carriers in a second FR, wherein the communication is associated with a preferred numerology; means for receiving a radio link control (RLC) status report indicating an RLC discontinuity associated with the communication; and/or one of: means for performing a retransmission of the communication on a preferred carrier associated with the preferred numerology in response to an uplink grant on the preferred carrier being received within a length of time, or means for performing the retransmission of the communication on a first available uplink grant when no uplink grant on the preferred carrier is received within the length of time; means for transmitting an indication to avoid Voice over New Radio (VoNR) communication in a first frequency range; means for generating a first transport block (TB) for transmission in the first frequency range, wherein the first TB is generated including a non-zero padding buffer status report or a voice packet; means for transmitting the first TB in the first frequency range; and/or means for transmitting a second TB associated with the VoNR communication in a second frequency range based at least in part on the first TB including the non-zero padding buffer status report or the voice packet. The aforementioned means may be one or more of the aforementioned components of the apparatus 2200 and/or the processing system 2310 of the apparatus 2305 configured to perform the functions recited by the aforementioned means. As described elsewhere herein, the processing system 2310 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 23 is provided as an example. Other examples may differ from what is described in connection with FIG. 23.

Figure 24:
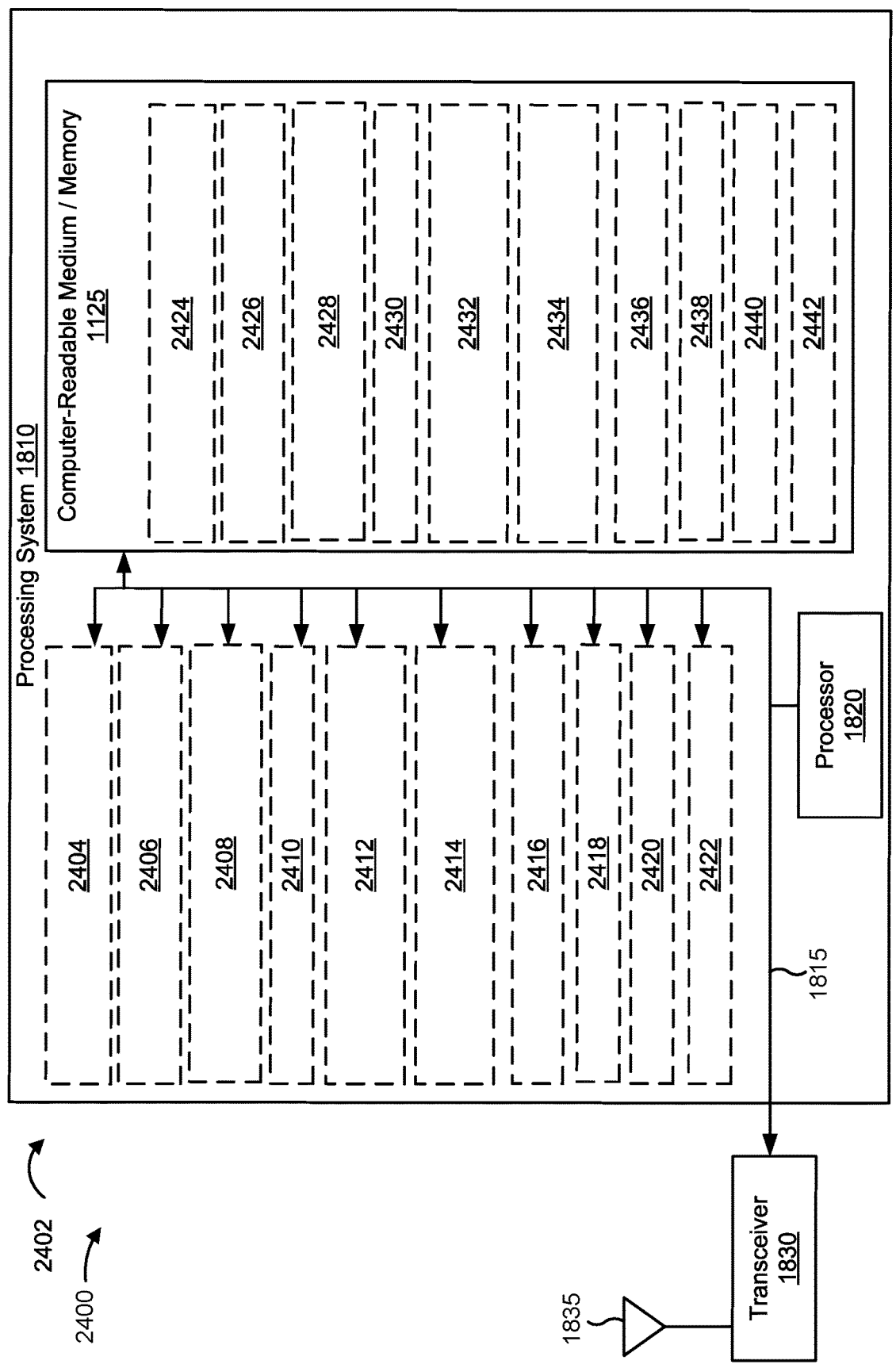
FIG. 24 is a diagram illustrating an example implementation of code and circuitry for an apparatus, in accordance with the present disclosure.

FIG. 24 is a diagram illustrating an example 2400 of an implementation of code and circuitry for an apparatus 2402. The apparatus 2402 may be a UE, such as UE 120a among other examples.

As further shown in FIG. 24, the apparatus may include circuitry for communicating on a first set of carriers associated with a first set of parameters and a second set of carriers associated with a second set of parameters (circuitry 2404). For example, the apparatus may include circuitry to enable the apparatus to communicate on a first set of carriers associated with a first set of parameters and a second set of carriers associated with a second set of parameters.

As further shown in FIG. 24, the apparatus may include circuitry for detecting an RLC discontinuity on at least one set of carriers, of the first set of carriers or the second set of carriers (circuitry 2406). For example, the apparatus may include circuitry to enable the apparatus to detect an RLC discontinuity on at least one set of carriers, of the first set of carriers or the second set of carriers.

As further shown in FIG. 24, the apparatus may include circuitry for identifying one or more FRs, of the first FR and the second FR, in which the RLC discontinuity occurred (circuitry 2408). For example, the apparatus may include circuitry to enable the apparatus to identify one or more FRs, of the first FR and the second FR, in which the RLC discontinuity occurred.

As further shown in FIG. 24, the apparatus may include circuitry for transmitting an RLC status report in accordance with an RLC timer that is based at least in part on at least one of a first hybrid automatic repeat request (HARQ) parameter associated with the first set of parameters or a second HARQ parameter associated with the second set of parameters, wherein the RLC timer is based at least in part on a number of RLC duplicates received by the UE (circuitry 2410). For example, the apparatus may include circuitry to enable the apparatus to transmit an RLC status report in accordance with an RLC timer that is based at least in part on at least one of a first hybrid automatic repeat request (HARQ) parameter associated with the first set of parameters or a second HARQ parameter associated with the second set of parameters, wherein the RLC timer is based at least in part on a number of RLC duplicates received by the UE.

As further shown in FIG. 24, the apparatus may include circuitry for transmitting a communication on one of a first set of carriers in a first frequency range (FR) or a second set of carriers in a second FR, wherein the communication is associated with a preferred numerology (circuitry 2412). For example, the apparatus may include circuitry to enable the apparatus to transmit a communication on one of a first set of carriers in a first frequency range (FR) or a second set of carriers in a second FR, wherein the communication is associated with a preferred numerology.

As further shown in FIG. 24, the apparatus may include circuitry for receiving an RLC status report indicating an RLC discontinuity associated with the communication (circuitry 2414). For example, the apparatus may include circuitry to enable the apparatus to receive an RLC status report indicating an RLC discontinuity associated with the communication.

As further shown in FIG. 24, the apparatus may include circuitry for performing a retransmission of the communication (circuitry 2416). For example, the apparatus may include circuitry to enable the apparatus to perform a retransmission of the communication.

As further shown in FIG. 24, the apparatus may include circuitry for transmitting an indication to avoid VoNR communication in a first frequency range (circuitry 2418). For example, the apparatus may include circuitry to enable the apparatus to transmit an indication to avoid VoNR communication in a first frequency range.

As further shown in FIG. 24, the apparatus may include circuitry for generating a first transport block (TB) for transmission in the first frequency range, wherein the first TB is generated including a non-zero padding buffer status report or a voice packet (circuitry 2420). For example, the apparatus may include circuitry to enable the apparatus to generate a first transport block (TB) for transmission in the first frequency range, wherein the first TB is generated including a non-zero padding buffer status report or a voice packet.

As further shown in FIG. 24, the apparatus may include circuitry for transmitting the first TB in the first frequency range and a second TB in a second frequency range (circuitry 2422). For example, the apparatus may include circuitry to transmit the first TB in the first frequency range and a second TB in a second frequency range.

As further shown in FIG. 24, the apparatus may include, stored in computer-readable medium 2325, code for communicating on a first set of carriers associated with a first set of parameters and a second set of carriers associated with a second set of parameters (code 2424). For example, the apparatus may include code that, when executed by the processor 2320, may cause the transceiver 2330 to communicate on a first set of carriers associated with a first set of parameters and a second set of carriers associated with a second set of parameters.

As further shown in FIG. 24, the apparatus may include, stored in computer-readable medium 2325, code for detecting an RLC discontinuity on at least one of the first set of carriers or the second set of carriers (code 2426). For example, the apparatus may include code that, when executed by the processor 2320, may cause the transceiver 2330 to detect an RLC discontinuity on at least one of the first set of carriers or the second set of carriers.

As further shown in FIG. 24, the apparatus may include, stored in computer-readable medium 2325, code for identifying one or more FRs, of the first FR and the second FR, in which the RLC discontinuity occurred (code 2428). For example, the apparatus may include code that, when executed by the processor 2320, may cause the transceiver 2330 to identify one or more FRs, of the first FR and the second FR, in which the RLC discontinuity occurred.

As further shown in FIG. 24, the apparatus may include, stored in computer-readable medium 2325, code for transmitting an RLC status report in accordance with an RLC timer that is based at least in part on at least one of a first hybrid automatic repeat request (HARQ) parameter associated with the first set of parameters or a second HARQ parameter associated with the second set of parameters, wherein the RLC timer is based at least in part on a number of RLC duplicates received by the UE (code 2430). For example, the apparatus may include code that, when executed by the processor 2320, may cause the transceiver 2330 to transmit an RLC status report in accordance with an RLC timer that is based at least in part on at least one of a first hybrid automatic repeat request (HARQ) parameter associated with the first set of parameters or a second HARQ parameter associated with the second set of parameters, wherein the RLC timer is based at least in part on a number of RLC duplicates received by the UE.

As further shown in FIG. 24, the apparatus may include, stored in computer-readable medium 2325, code for transmitting a communication on one of a first set of carriers in a first frequency range (FR) or a second set of carriers in a second FR, wherein the communication is associated with a preferred numerology (code 2432). For example, the apparatus may include code that, when executed by the processor 2320, may cause the transceiver 2330 to transmit a communication on one of a first set of carriers in a first FR or a second set of carriers in a second FR, wherein the communication is associated with a preferred numerology.

As further shown in FIG. 24, the apparatus may include, stored in computer-readable medium 2325, code for receiving an RLC status report indicating an RLC discontinuity associated with the communication (code 2434). For example, the apparatus may include code that, when executed by the processor 2320, may cause the transceiver 2330 to receive an RLC status report indicating an RLC discontinuity associated with the communication.

As further shown in FIG. 24, the apparatus may include, stored in computer-readable medium 2325, code for performing a retransmission of the communication (code 2436). For example, the apparatus may include code that, when executed by the processor 2320, may cause the transceiver 2330 to perform a retransmission of the communication.

As further shown in FIG. 24, the apparatus may include, stored in computer-readable medium 2325, code for transmitting an indication to avoid VoNR communication in a first frequency range (code 2438). For example, the apparatus may include code that, when executed by the processor 2320, may cause the transceiver 2330 to transmit an indication to avoid VoNR communication in a first frequency range.

As further shown in FIG. 24, the apparatus may include, stored in computer-readable medium 2325, code for generating a first transport block (TB) for transmission in the first frequency range, wherein the first TB is generated including a non-zero padding buffer status report or a voice packet (code 2440). For example, the apparatus may include code that, when executed by the processor 2320, may cause the transceiver 2330 to generate a first transport block (TB) for transmission in the first frequency range, wherein the first TB is generated including a non-zero padding buffer status report or a voice packet.

As further shown in FIG. 24, the apparatus may include, stored in computer-readable medium 2325, code for transmitting the first TB in the first frequency range and a second TB in a second frequency range (code 2442). For example, the apparatus may include code that, when executed by the processor 2320, may cause the transceiver 2330 to transmit the first TB in the first frequency range and a second TB in a second frequency range.

FIG. 24 is provided as an example. Other examples may differ from what is described in connection with FIG. 24.

The following provides an overview of some Aspects of the present disclosure:

Aspect 1: A method of wireless communication performed by a user equipment (UE), comprising: communicating on a first set of carriers associated with a first set of parameters and a second set of carriers associated with a second set of parameters; detecting a radio link control (RLC) discontinuity on at least one set of carriers, of the first set of carriers or the second set of carriers; and transmitting an RLC status report in accordance with an RLC timer that is based at least in part on at least one of a first hybrid automatic repeat request (HARQ) parameter associated with the first set of parameters or a second HARQ parameter associated with the second set of parameters, wherein the RLC timer based at least in part on a number of RLC duplicates received by the UE.

Aspect 2: The method of Aspect 1, wherein the first set of parameters is associated with a first numerology and the second set of parameters is associated with a second numerology.

Aspect 3: The method of Aspect 2, further comprising: identifying one or more numerologies, of the first numerology or the second numerology, in which the RLC discontinuity occurred, wherein the RLC timer is determined in accordance with a numerology of the identified one or more numerologies.

Aspect 4: The method of Aspect 3, wherein identifying the one or more numerologies is based at least in part on a HARQ transmission associated with a slot associated with the RLC discontinuity and a cyclic redundancy check (CRC) error associated with the slot associated with the RLC discontinuity.

Aspect 5: The method of Aspect 3, wherein identifying the one or more numerologies is based at least in part on one or more estimated transport block sizes associated with the RLC discontinuity and an amount of RLC bytes received in a slot associated with the RLC discontinuity.

Aspect 6: The method of Aspect 5, wherein the one or more estimated transport block sizes include a first estimated transport block size associated with the first numerology and a second estimated transport block size associated with the second numerology.

Aspect 7: The method of Aspect 3, wherein transmitting the RLC status report is based at least in part on receiving a poll protocol data unit associated with the identified one or more numerologies or determining that a reassembly timer for the identified one or more numerologies has expired, and wherein the identified one or more numerologies include a single numerology.

Aspect 8: The method of Aspect 3, wherein the identified one or more numerologies include only the first numerology, and wherein transmitting the RLC status report based at least in part on the identified one or more FRs further comprises: transmitting, based at least in part on a poll protocol data unit or expiration of the RLC timer, a negative acknowledgment regarding the RLC discontinuity.

Aspect 9: The method of Aspect 3, wherein the identified one or more numerologies include only the first numerology and the RLC timer is a configured RLC timer associated with the first numerology.

Aspect 10: The method of Aspect 3, wherein the identified one or more numerologies include the first numerology and the second numerology, and wherein the RLC timer is determined as a longer RLC timer, of an RLC timer associated with the first numerology and an RLC timer associated with the second numerology.

Aspect 11: The method of any of Aspects 1-10, wherein the RLC timer is based at least in part on a HARQ parameter associated with a carrier, of the first set of carriers or the second set of carriers, on which the RLC discontinuity is detected.

Aspect 12: The method of Aspect 11, wherein the HARQ parameter is at least one of a HARQ round trip time or a HARQ recovery delay.

Aspect 13: The method of any of Aspects 1-12, wherein the RLC timer is based at least in part on a combination of the first HARQ parameter and the second HARQ parameter, and based at least in part on a first numerology associated with the first set of carriers and a second numerology associated with the second set of carriers.

Aspect 14: The method of any of Aspects 1-13, wherein the RLC discontinuity is an RLC discontinuity on a first carrier of the first set of carriers and a second carrier of the second set of carriers, and wherein the RLC timer is determined in accordance with a lower numerology of a first numerology of the first set of carriers and a second numerology of the second set of carriers.

Aspect 15: The method of any of Aspects 1-14, wherein the RLC status report indicates an RLC status up to a most recent RLC discontinuity.

Aspect 16: The method of any of Aspects 1-15, wherein detecting the RLC discontinuity further comprises detecting a plurality of RLC discontinuities, and wherein transmitting the RLC status report further comprises: transmitting the RLC status report indicating an RLC status for all RLC discontinuities, of the plurality of RLC discontinuities and associated with the second set of carriers, up to a next RLC discontinuity of the first set of carriers, wherein the second set of carriers is associated with a second numerology that is higher than a first numerology of the first set of carriers.

Aspect 17: The method of any of Aspects 1-16, wherein detecting the RLC discontinuity further comprises detecting a plurality of RLC discontinuities, and wherein transmitting the RLC status report further comprises: transmitting the RLC status report indicating an RLC status for all RLC discontinuities, of the plurality of RLC discontinuities, for which the UE estimates that HARQ recovery is complete.

Aspect 18: The method of Aspect 17, further comprising: maintaining, for the first set of parameters and the second set of parameters, separate RLC sequence number tracking.

Aspect 19: The method of Aspect 17, further comprising: maintaining, for the first set of parameters and the second set of parameters, a separate set of RLC timers.

Aspect 20: The method of Aspect 17, wherein the RLC discontinuity is associated with only the second set of carriers, and wherein the RLC status report indicates an RLC status of one or more RLC protocol data units on the second set of carriers after an unacknowledged RLC discontinuity on the first set of carriers.

Aspect 21: The method of Aspect 17, wherein an acknowledgment sequence number of the RLC status is set to a most recently received sequence number on the second set of carriers.

Aspect 22: The method of any of Aspects 1-21, wherein the first set of parameters or the second set of parameters indicates at least one of: a duplexing configuration, a scheduling delay, a numerology, a frequency range, or an uplink/downlink slot allocation.

Aspect 23: The method of any of Aspects 1-22, wherein the first HARQ parameter or the second HARQ parameter includes at least one of: a HARQ round-trip time, or a HARQ recovery delay.

Aspect 24: The method of any of Aspects 1-23, wherein detecting the RLC discontinuity further comprises: detecting that a threshold number of retransmitted RLC protocol data units are dropped and that a number of HARQ failures is lower than a threshold.

Aspect 25: The method of any of Aspects 1-24, wherein detecting the RLC discontinuity further comprises: detecting that a sum of an inter-carrier sequence number delay between the first set of carriers and the second set of carriers, and the HARQ parameter, is greater than a configured value of the RLC timer.

Aspect 26: The method of any of Aspects 1-25, further comprising: determining the RLC timer.

Aspect 27: The method of Aspect 26, wherein the RLC timer is equal in length to a HARQ recovery delay indicated by the HARQ parameter.

Aspect 28: The method of Aspect 26, wherein determining the RLC timer is based at least in part on a model trained using machine learning.

Aspect 29: The method of any of Aspects 1-28, wherein the number of RLC duplicates received by the UE is based at least in part on a successful HARQ transmission following transmission of one or more negative acknowledgments.

Aspect 30: A method of wireless communication performed by a user equipment (UE), comprising: transmitting a communication on one of a first set of carriers in a first frequency range (FR) or a second set of carriers in a second FR, wherein the communication is associated with a preferred numerology; receiving a radio link control (RLC) status report indicating an RLC discontinuity associated with the communication; and one of: performing a retransmission of the communication on a preferred carrier associated with the preferred numerology in response to an uplink grant on the preferred carrier being received within a length of time, or performing the retransmission of the communication on a first available uplink grant when no uplink grant on the preferred carrier is received within the length of time.

Aspect 31: The method of Aspect 30, wherein the retransmission is on the first available uplink grant of the preferred numerology and the method further comprises: retransmitting the retransmission on a carrier associated with another numerology if no acknowledgment of the retransmission has been received after performing the retransmission.

Aspect 32: The method of any of Aspects 30-31, further comprising: transmitting a buffer status report and a power headroom report on a carrier of the first set of carriers; and transmitting the buffer status report and the power headroom report on a carrier of the second set of carriers.

Aspect 33: The method of Aspect 32, wherein the buffer status report as transmitted on the carrier of the second set of carriers is updated relative to the buffer status report as transmitted on the carrier of the first set of carriers.

Aspect 34: The method of Aspect 32, wherein the buffer status report as transmitted on the carrier of the second set of carriers is merged with another buffer status report triggered after transmission of the buffer status report on the carrier of the first set of carriers.

Aspect 35: The method of Aspect 32, wherein the communication is an RLC protocol data unit carrying a poll bit.

Aspect 36: A method of wireless communication performed by a user equipment (UE), comprising: transmitting an indication to avoid Voice over New Radio (VoNR) communication in a first frequency range; generating a first transport block (TB) for transmission in the first frequency range, wherein the first TB is generated including a non-zero padding buffer status report or a voice packet; transmitting the first TB in the first frequency range; and transmitting a second TB associated with the VoNR communication in a second frequency range based at least in part on the first TB including the non-zero padding buffer status report or the voice packet.

Aspect 37: The method of Aspect 36, further comprising: transmitting the voice packet in the second TB.

Aspect 38: The method of Aspect 37, wherein transmitting the voice packet in the second TB is based at least in part on not having received an acknowledgment of the first TB.

Aspect 39: An apparatus for wireless communication at a device, comprising a processor; memory coupled with the processor; and instructions stored in the memory and executable by the processor to cause the apparatus to perform the method of one or more of Aspects 1-38.

Aspect 40: A device for wireless communication, comprising a memory and one or more processors coupled to the memory, the one or more processors configured to perform the method of one or more of Aspects 1-38.

Aspect 41: An apparatus for wireless communication, comprising at least one means for performing the method of one or more of Aspects 1-38.

Aspect 42: A non-transitory computer-readable medium storing code for wireless communication, the code comprising instructions executable by a processor to perform the method of one or more of Aspects 1-38.

Aspect 43: A non-transitory computer-readable medium storing a set of instructions for wireless communication, the set of instructions comprising one or more instructions that, when executed by one or more processors of a device, cause the device to perform the method of one or more of Aspects 1-38.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    communicating on a first set of carriers associated with a first set of parameters and a second set of carriers associated with a second set of parameters;
    detecting a radio link control (RLC) discontinuity on at least one set of carriers, of the first set of carriers or the second set of carriers, wherein detecting the RLC discontinuity further comprises detecting that a sum of an inter-carrier sequence number delay between the first set of carriers and the second set of carriers, and a HARQ recovery delay, satisfies a threshold; and
    transmitting an RLC status report in accordance with an RLC timer that is based at least in part on at least one of a first hybrid automatic repeat request (HARQ) parameter associated with the first set of parameters or a second HARQ parameter associated with the second set of parameters, wherein the RLC timer is based at least in part on a number of RLC duplicates received by the UE.

2. The method of claim 1, wherein the RLC timer is based at least in part on a HARQ parameter associated with a carrier, of the first set of carriers or the second set of carriers, on which the RLC discontinuity is detected, wherein the HARQ parameter is at least one of a HARQ round trip time or a HARQ recovery delay.

3. The method of claim 1, wherein the RLC timer is based at least in part on a combination of the first HARQ parameter and the second HARQ parameter, and based at least in part on a first numerology associated with the first set of carriers and a second numerology associated with the second set of carriers.

4. The method of claim 1, wherein the RLC discontinuity is an RLC discontinuity on a first carrier of the first set of carriers and a second carrier of the second set of carriers, and wherein the RLC timer is determined in accordance with a lower numerology of a first numerology of the first set of carriers and a second numerology of the second set of carriers.

5. The method of claim 1, wherein detecting the RLC discontinuity further comprises detecting a plurality of RLC discontinuities, and wherein transmitting the RLC status report further comprises:
    transmitting the RLC status report indicating an RLC status for all RLC discontinuities, of the plurality of RLC discontinuities and associated with the second set of carriers, up to a next RLC discontinuity of the first set of carriers, wherein the second set of carriers is associated with a second numerology that is higher than a first numerology of the first set of carriers.

6. The method of claim 1, wherein detecting the RLC discontinuity further comprises detecting a plurality of RLC discontinuities, and wherein transmitting the RLC status report further comprises:
    transmitting the RLC status report indicating an RLC status for all RLC discontinuities, of the plurality of RLC discontinuities, for which the UE estimates that HARQ recovery is complete.

7. The method of claim 6, wherein the RLC discontinuity is associated with only the second set of carriers, and wherein the RLC status report indicates an RLC status of one or more RLC protocol data units on the second set of carriers after an unacknowledged RLC discontinuity on the first set of carriers.

8. The method of claim 6, wherein an acknowledgment sequence number of the RLC status is set to a most recently received sequence number on the second set of carriers.

9. The method of claim 1, wherein the first set of parameters or the second set of parameters indicates at least one of:
    a duplexing configuration,
    a scheduling delay,
    a numerology,
    a frequency range, or
    an uplink/downlink slot allocation.

10. The method of claim 1, wherein the first HARQ parameter or the second HARQ parameter includes at least one of:
    a HARQ round-trip time, or
    the HARQ recovery delay.

11. The method of claim 1, wherein determining the RLC timer is based at least in part on a model trained using machine learning.

12. The method of claim 1, wherein the number of RLC duplicates received by the UE is based at least in part on a successful HARQ transmission following transmission of one or more negative acknowledgments.

13. A method of wireless communication performed by a network entity, comprising:
communicating on a first set of carriers associated with a first set of parameters and a second set of carriers associated with a second set of parameters; and
receiving a radio link control (RLC) status report in accordance with an RLC timer that is based at least in part on at least one of a first hybrid automatic repeat request (HARQ) parameter associated with the first set of parameters or a second HARQ parameter associated with the second set of parameters, wherein the RLC timer is based at least in part on a HARQ recovery delay associated with a carrier, of the first set of carriers or the second set of carriers, on which an RLC discontinuity is detected, wherein the RLC discontinuity corresponds to an RLC discontinuity of a set of RLC discontinuities for which a user equipment (UE) estimates that HARQ recovery is complete, wherein the RLC status report indicates an RLC status for the set of RLC discontinuities.

14. The method of claim 13, wherein the RLC discontinuity is associated with only the second set of carriers, and wherein the RLC status report indicates an RLC status of one or more RLC protocol data units on the second set of carriers after an unacknowledged RLC discontinuity on the first set of carriers.

15. The method of claim 13, wherein the RLC timer is based at least in part on a combination of the first HARQ parameter and the second HARQ parameter, and based at least in part on a first numerology associated with the first set of carriers and a second numerology associated with the second set of carriers.

16. The method of claim 13, wherein an acknowledgment sequence number of the RLC status is set to a most recently received sequence number on the second set of carriers.

17. The method of claim 13, wherein the first set of parameters or the second set of parameters indicates at least one of:
a duplexing configuration,
a scheduling delay,
a numerology,
a frequency range, or
an uplink/downlink slot allocation.

18. The method of claim 13, wherein receiving the RLC status report further comprises:
receiving the RLC status report indicating an RLC status for all RLC discontinuities, of the set of RLC discontinuities and associated with the second set of carriers, up to a next RLC discontinuity of the first set of carriers, wherein the second set of carriers is associated with a second numerology that is higher than a first numerology of the first set of carriers.

19. The method of claim 13, wherein the RLC timer is equal in length to the HARQ recovery delay.

20. A non-transitory computer-readable medium that stores a set of instructions for wireless communication, the set of instructions comprising:
one or more instructions that, when executed by one or more processors of a user equipment (UE), cause the UE to:
communicate on a first set of carriers associated with a first set of parameters and a second set of carriers associated with a second set of parameters;
detect a radio link control (RLC) discontinuity on at least one set of carriers, of the first set of carriers or the second set of carriers, wherein detecting the RLC discontinuity further comprises detecting that a sum of an inter-carrier sequence number delay between the first set of carriers and the second set of carriers, and a HARQ recovery delay, satisfies a threshold; and
transmit an RLC status report in accordance with an RLC timer that is based at least in part on at least one of a first hybrid automatic repeat request (HARQ) parameter associated with the first set of parameters or a second HARQ parameter associated with the second set of parameters, wherein the RLC timer is based at least in part on a number of RLC duplicates received by the UE.

21. The non-transitory computer-readable medium of claim 20, wherein the RLC timer is based at least in part on a HARQ parameter associated with a carrier, of the first set of carriers or the second set of carriers, on which the RLC discontinuity is detected, wherein the HARQ parameter is at least one of a HARQ round trip time or a HARQ recovery delay.

22. The non-transitory computer-readable medium of claim 20, wherein the RLC timer is based at least in part on a combination of the first HARQ parameter and the second HARQ parameter, and based at least in part on a first numerology associated with the first set of carriers and a second numerology associated with the second set of carriers.

23. The non-transitory computer-readable medium of claim 20, wherein the RLC discontinuity is an RLC discontinuity on a first carrier of the first set of carriers and a second carrier of the second set of carriers, and wherein the RLC timer is determined in accordance with a lower numerology of a first numerology of the first set of carriers and a second numerology of the second set of carriers.

24. The non-transitory computer-readable medium of claim 20,
wherein to detect the RLC discontinuity, the one or more instructions, when executed by the one or more processors of the UE, cause the UE to:
detect a plurality of RLC discontinuities, and
wherein to transmit the RLC status report, the one or more instructions, when executed by the one or more processors of the UE, cause the UE to:
transmit the RLC status report indicating an RLC status for all RLC discontinuities, of the plurality of RLC discontinuities.

25. The non-transitory computer-readable medium of claim 24, wherein an acknowledgment sequence number of the RLC status is set to a most recently received sequence number on the second set of carriers.

26. The non-transitory computer-readable medium of claim 20, wherein the first set of parameters or the second set of parameters indicates at least one of:
a duplexing configuration,
a scheduling delay,
a numerology,
a frequency range, or
an uplink/downlink slot allocation.

27. The non-transitory computer-readable medium of claim 20, wherein the first HARQ parameter or the second HARQ parameter includes at least one of:

a HARQ round-trip time, or
the HARQ recovery delay.

28. The non-transitory computer-readable medium of claim 20, wherein the one or more instructions, when executed by the one or more processors of the UE, further cause the UE to:
   identify one or more numerologies in which the RLC discontinuity occurred, wherein the RLC timer is determined in accordance with a numerology of the identified one or more numerologies.

29. The non-transitory computer-readable medium of claim 20, wherein determining the RLC timer is based at least in part on a model trained using machine learning.

30. The method of claim 1, wherein detecting the RLC discontinuity further comprises:
   identifying one or more numerologies in which the RLC discontinuity occurred, wherein the RLC timer is determined in accordance with a numerology of the identified one or more numerologies.

* * * * *